US011403630B2

(12) United States Patent
Dua

(10) Patent No.: US 11,403,630 B2
(45) Date of Patent: Aug. 2, 2022

(54) METHOD, APPARATUS, AND SYSTEM FOR PERFORMING WIRELESS TRANSACTIONS WITH BIOMETRIC AUTHENTICATION

(71) Applicant: Samsung Electronics Co., Ltd., Suwon-si (KR)

(72) Inventor: Robin Dua, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 783 days.

(21) Appl. No.: 14/564,034

(22) Filed: Dec. 8, 2014

(65) Prior Publication Data

US 2015/0095235 A1 Apr. 2, 2015

Related U.S. Application Data

(63) Continuation of application No. 14/187,693, filed on Feb. 24, 2014, now abandoned, which is a (Continued)

(51) Int. Cl.
*G06Q 20/20* (2012.01)
*G06Q 20/32* (2012.01)
(Continued)

(52) U.S. Cl.
CPC ..... *G06Q 20/3821* (2013.01); *G06K 7/10297* (2013.01); *G06Q 20/32* (2013.01);
(Continued)

(58) Field of Classification Search
CPC . H04W 12/06; H04W 12/068; H04W 12/033; H04W 12/02; G06K 7/10297;
(Continued)

(56) References Cited

U.S. PATENT DOCUMENTS 5,878,138 A 3/1999 Yacobi
5,892,900 A 4/1999 Ginter et al.
(Continued)

FOREIGN PATENT DOCUMENTS

JP 2003-316796 A 11/2003

OTHER PUBLICATIONS

VIVOtech Product Overview and Press Release dated Sep. 15, 2003.
(Continued)

*Primary Examiner* — Mohammad A. Nilforoush
*Assistant Examiner* — Wodajo Getachew
(74) *Attorney, Agent, or Firm* — Jefferson IP Law, LLP

(57) ABSTRACT

An apparatus, system and methodology for conducting financial and other transactions using a wireless device are provided. A computing device includes a memory device that has stored therein a wallet application for completing transactions based on wireless data communications between the computing device and an external electronic device. The memory device further stores an electronic credential. The computing device includes a wireless transceiver configured to wirelessly communicate with the external electronic device. The computing device further includes a biometric characteristic reader for reading a biometric characteristic of a user. The computing device wirelessly transmits the electronic credential to the external electronic device based on comparing the biometric characteristic of the user with stored biometric information to initiate a transaction with the external electronic device.

31 Claims, 9 Drawing Sheets

Related U.S. Application Data continuation of application No. 11/040,847, filed on Jan. 21, 2005, now Pat. No. 8,700,729.

(51) Int. Cl.

| | | |
|---|---|---|
| *H04W 12/06* | (2021.01) | |
| *G06Q 20/40* | (2012.01) | |
| *G06Q 20/36* | (2012.01) | |
| *G06Q 20/42* | (2012.01) | |
| *G06K 7/10* | (2006.01) | |
| *H04B 5/00* | (2006.01) | |
| *G06Q 20/38* | (2012.01) | |
| *H04L 9/40* | (2022.01) | |
| *H04W 12/02* | (2009.01) | |
| *H04W 12/033* | (2021.01) | |

(52) U.S. Cl.
CPC ......... *G06Q 20/322* (2013.01); *G06Q 20/325* (2013.01); *G06Q 20/327* (2013.01); *G06Q 20/3278* (2013.01); *G06Q 20/3674* (2013.01); *G06Q 20/40* (2013.01); *G06Q 20/401* (2013.01); *G06Q 20/4012* (2013.01); *G06Q 20/40145* (2013.01); *G06Q 20/42* (2013.01); *H04B 5/0062* (2013.01); *H04W 12/06* (2013.01); *G06K 7/10415* (2013.01); *G06Q 20/20* (2013.01); *G06Q 20/3227* (2013.01); *G06Q 20/385* (2013.01); *G06Q 20/38215* (2013.01); *H04L 63/0428* (2013.01); *H04L 63/08* (2013.01); *H04L 63/083* (2013.01); *H04L 63/18* (2013.01); *H04L 2463/102* (2013.01); *H04W 12/02* (2013.01); *H04W 12/033* (2021.01); *H04W 12/068* (2021.01)

(58) Field of Classification Search
CPC .............. G06K 7/10415; H04B 5/0062; H04L 63/0428; H04L 63/08; H04L 63/083; H04L 63/18; H04L 2463/102
USPC .......................................................... 705/76
See application file for complete search history.

(56) References Cited

U.S. PATENT DOCUMENTS

| | | | |
|---|---|---|---|
| 5,943,423 A | 8/1999 | Muftic | |
| 5,991,749 A | 11/1999 | Morrill, Jr. | |
| 6,005,942 A | 12/1999 | Chan et al. | |
| 6,016,476 A | 1/2000 | Maes et al. | |
| 6,016,484 A | 1/2000 | Williams et al. | |
| 6,085,976 A | 7/2000 | Sehr | |
| 6,282,421 B1 | 8/2001 | Chatterjee et al. | |
| 6,282,522 B1 | 8/2001 | Davis et al. | |
| 6,367,011 B1 | 4/2002 | Lee et al. | |
| 6,415,271 B1 | 7/2002 | Turk et al. | |
| 6,434,159 B1 | 8/2002 | Woodward et al. | |
| 6,487,401 B2 | 11/2002 | Suryanarayana et al. | |
| 6,494,367 B1 | 12/2002 | Zacharias | |
| 6,606,663 B1 | 8/2003 | Liao et al. | |
| 6,715,679 B1 | 4/2004 | Infosino | |
| 6,755,342 B1 | 6/2004 | Jordan, Jr. | |
| 6,769,607 B1 | 8/2004 | Pitroda et al. | |
| 6,775,782 B1 | 8/2004 | Buros et al. | |
| 6,796,490 B1 | 9/2004 | Drummond et al. | |
| 6,826,395 B2 | 11/2004 | Lee et al. | |
| 6,839,437 B1 | 1/2005 | Crane et al. | |
| 6,955,299 B1 | 10/2005 | Pathmasuntharan et al. | |
| 7,024,390 B1 | 4/2006 | Mori et al. | |
| 7,159,770 B2 | 1/2007 | Onozu | |
| 7,162,219 B2 | 1/2007 | Wolf | |
| 7,284,266 B1 | 10/2007 | Morris et al. | |
| 7,376,629 B1 | 5/2008 | McIsaac | |
| 7,413,113 B1 | 8/2008 | Zhu | |
| 7,494,055 B2 | 2/2009 | Fernandes et al. | |
| 7,500,616 B2 | 3/2009 | Beenau et al. | |
| 7,512,567 B2 | 3/2009 | Bemmel et al. | |
| 7,587,196 B2 | 9/2009 | Hansen | |
| 7,801,827 B2 | 9/2010 | Bishop et al. | |
| 7,822,688 B2 | 10/2010 | Labrou et al. | |
| 7,945,511 B2 | 5/2011 | Gallant et al. | |
| 8,240,557 B2 | 8/2012 | Fernandes et al. | |
| 8,249,982 B1 | 8/2012 | Rolf | |
| 8,255,978 B2 | 8/2012 | Dick | |
| 8,285,641 B2 | 10/2012 | Cataline et al. | |
| 8,346,659 B1 | 1/2013 | Mohsenzadeh | |
| 8,639,621 B1 | 1/2014 | Ellis et al. | |
| 2001/0016800 A1 | 8/2001 | Koh et al. | |
| 2001/0027441 A1 | 10/2001 | Wankmueller | |
| 2001/0034720 A1 | 10/2001 | Armes | |
| 2002/0004783 A1 | 1/2002 | Paltenghe et al. | |
| 2002/0029342 A1 | 3/2002 | Keech | |
| 2002/0038287 A1 | 3/2002 | Villaret et al. | |
| 2002/0052841 A1 | 5/2002 | Guthrie et al. | |
| 2002/0065774 A1 | 5/2002 | Young et al. | |
| 2002/0073044 A1 | 6/2002 | Singhal | |
| 2002/0089410 A1 | 7/2002 | Janiak et al. | |
| 2002/0116341 A1 | 8/2002 | Hogan et al. | |
| 2002/0143634 A1 | 10/2002 | Kumar et al. | |
| 2002/0191816 A1 | 12/2002 | Maritzen et al. | |
| 2002/0194128 A1 | 12/2002 | Maritzen et al. | |
| 2002/0198849 A1 | 12/2002 | Piikivi | |
| 2003/0007482 A1 | 1/2003 | Khello et al. | |
| 2003/0023847 A1 | 1/2003 | Ishibashi et al. | |
| 2003/0028481 A1* | 2/2003 | Flitcroft | G06Q 20/342 705/39 |
| 2003/0051138 A1 | 3/2003 | Maeda et al. | |
| 2003/0074461 A1 | 4/2003 | Kang et al. | |
| 2003/0126094 A1 | 7/2003 | Fisher et al. | |
| 2003/0149662 A1* | 8/2003 | Shore | G06Q 20/202 705/39 |
| 2003/0163708 A1 | 8/2003 | Tang | |
| 2003/0167207 A1 | 9/2003 | Berardi et al. | |
| 2003/0172090 A1 | 9/2003 | Asunmaa et al. | |
| 2003/0191709 A1 | 10/2003 | Elston et al. | |
| 2003/0200184 A1 | 10/2003 | Dominguez et al. | |
| 2003/0220841 A1 | 11/2003 | Maritzen | |
| 2004/0029569 A1* | 2/2004 | Khan | G06Q 20/02 455/410 |
| 2004/0030601 A1 | 2/2004 | Pond et al. | |
| 2004/0039919 A1 | 2/2004 | Takayama et al. | |
| 2004/0044621 A1 | 3/2004 | Huang et al. | |
| 2004/0047341 A1 | 3/2004 | Staack et al. | |
| 2004/0049451 A1 | 3/2004 | Berardi et al. | |
| 2004/0065734 A1 | 4/2004 | Piikivi | |
| 2004/0097217 A1 | 5/2004 | McClain | |
| 2004/0098350 A1 | 5/2004 | Labrou et al. | |
| 2004/0098740 A1 | 5/2004 | Maritzen et al. | |
| 2004/0107170 A1 | 6/2004 | Labrou et al. | |
| 2004/0122768 A1 | 6/2004 | Creamer et al. | |
| 2004/0127286 A1 | 7/2004 | Fujimoto | |
| 2004/0156394 A1 | 8/2004 | Wesiman | |
| 2004/0159700 A1 | 8/2004 | Khan et al. | |
| 2004/0172566 A1 | 9/2004 | Greiger et al. | |
| 2004/0178261 A1 | 9/2004 | Potonniee et al. | |
| 2004/0186883 A1 | 9/2004 | Nyman et al. | |
| 2004/0188519 A1* | 9/2004 | Cassone | G06Q 20/40145 235/382 |
| 2004/0230536 A1 | 11/2004 | Fung et al. | |
| 2004/0236688 A1 | 11/2004 | Bozeman | |
| 2004/0243520 A1 | 12/2004 | Bishop et al. | |
| 2004/0255081 A1 | 12/2004 | Arnouse | |
| 2005/0002407 A1 | 1/2005 | Shaheen et al. | |
| 2005/0005168 A1 | 1/2005 | Dick | |
| 2005/0033689 A1 | 2/2005 | Bonalle et al. | |
| 2005/0035847 A1 | 2/2005 | Bonalle et al. | |
| 2005/0090226 A1 | 4/2005 | Wolf | |
| 2005/0093698 A1 | 5/2005 | Sakamoto et al. | |
| 2005/0137889 A1 | 6/2005 | Wheeler | |
| 2005/0137977 A1 | 6/2005 | Wankmueller | |
| 2005/0137986 A1 | 6/2005 | Kean | |
| 2005/0156026 A1 | 7/2005 | Ghosh et al. | |
| 2005/0165684 A1 | 7/2005 | Jensen et al. | |

(56) References Cited

U.S. PATENT DOCUMENTS

| | | |
|---|---|---|
| 2005/0165784 A1 | 7/2005 | Gomez et al. |
| 2005/0171898 A1 | 8/2005 | Bishop et al. |
| 2005/0193134 A1 | 9/2005 | Syrjala |
| 2005/0222961 A1* | 10/2005 | Staib .................. H04M 1/0254 705/64 |
| 2005/0269402 A1 | 12/2005 | Spitzer et al. |
| 2006/0000892 A1* | 1/2006 | Bonalle ............ G06Q 20/40145 235/382 |
| 2006/0000900 A1 | 1/2006 | Fernandes et al. |
| 2006/0006226 A1 | 1/2006 | Fitzgerald et al. |
| 2006/0071778 A1* | 4/2006 | Vesikivi ................ G06F 16/955 707/E17.112 |
| 2006/0087406 A1 | 4/2006 | Willins et al. |
| 2006/0095957 A1 | 5/2006 | Lundblade et al. |
| 2006/0105742 A1 | 5/2006 | Kim et al. |
| 2006/0109084 A1 | 5/2006 | Yarvis |
| 2006/0129838 A1 | 6/2006 | Chen et al. |
| 2006/0131390 A1 | 6/2006 | Kim |
| 2006/0165060 A1 | 7/2006 | Dua |
| 2006/0165371 A1 | 7/2006 | Zwart |
| 2006/0229998 A1 | 10/2006 | Harrison et al. |
| 2006/0249572 A1 | 11/2006 | Chen et al. |
| 2007/0011104 A1 | 1/2007 | Leger et al. |
| 2007/0194113 A1 | 8/2007 | Esplin et al. |
| 2007/0247315 A1 | 10/2007 | Nagai et al. |
| 2008/0046366 A1 | 2/2008 | Bemmel et al. |
| 2008/0207203 A1 | 8/2008 | Arthur et al. |
| 2009/0037982 A1 | 2/2009 | Wentker et al. |
| 2009/0048978 A1* | 2/2009 | Ginter .................... G06F 21/10 705/51 |
| 2009/0108064 A1* | 4/2009 | Fernandes .............. G06Q 20/12 235/380 |
| 2010/0217709 A1* | 8/2010 | Aabye .................. G06Q 20/322 705/44 |
| 2011/0131128 A1 | 6/2011 | Väänänen |
| 2011/0246317 A1 | 10/2011 | Coppinger |

OTHER PUBLICATIONS

Ron White, "How Computers Work, Seventh Edition," Illustrated by Timothy Edward Downs, Oct. 15, 2003, USA.

U.S. Office Action dated Feb. 25, 2019, issued in the U.S. Appl. No. 14/187,693.

U.S. Final Office Action dated May 15, 2019, issued in the U.S. Appl. No. 14/337,584.

U.S. Office Action dated Aug. 19, 2019, issued in U.S. Appl. No. 14/572,313.

U.S. Office Action dated Aug. 30, 2019, issued in U.S. Appl. No. 14/187,693.

U.S. Office Action dated Oct. 17, 2019, issued in U.S. Appl. No. 14/818,974.

U.S. Office Action dated Dec. 27, 2019, issued in U.S. Appl. No. 14/791,739.

U.S. Office Action dated Jul. 7, 2020, issued in U.S. Appl. No. 14/791,739.

U.S. Office Action dated Mar. 13, 2020, issued in U.S. Appl. No. 14/549,087.

U.S. Office Action dated Apr. 14, 2020, issued in U.S. Appl. No. 14/228,514.

U.S. Office Action dated Apr. 17, 2020, issued in U.S. Appl. No. 14/818,974.

U.S. Notice of Allowance dated Apr. 28, 2020, issued in U.S. Appl. No. 14/572,313.

U.S. Office Action dated Jul. 23, 2020, issued in U.S. Appl. No. 14/557,938.

U.S. Non-final Office Action dated Feb. 1, 2021, issued in U.S. Appl. No. 14/557,938.

U.S. Non-final Office Action dated Mar. 23, 2021, issued in U.S. Appl. No. 14/337,584.

U.S. Final Office Action dated Aug. 13, 2021, issued in U.S. Appl. No. 14/557,938.

U.S. Final Office Action dated Aug. 17, 2021, issued in U.S. Appl. No. 14/564,034.

* cited by examiner

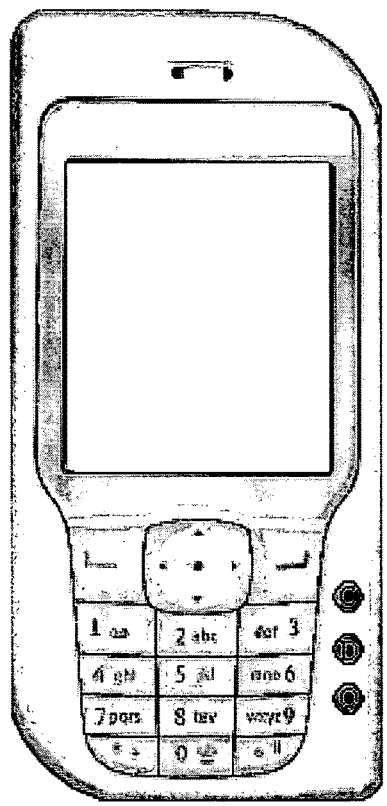 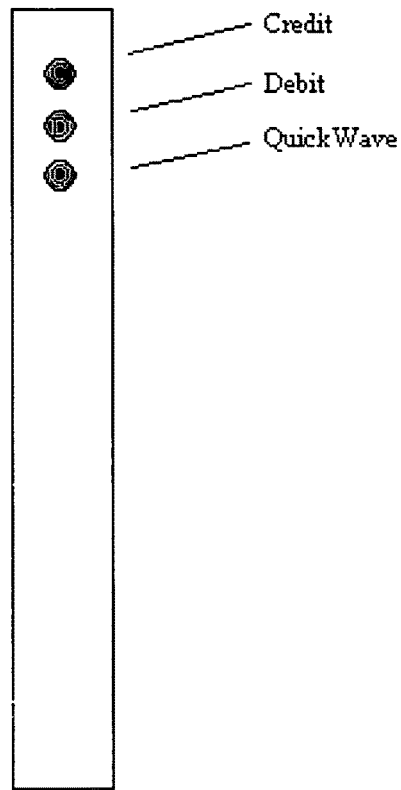
FIG. 7(a)  FIG. 7(b)

METHOD, APPARATUS, AND SYSTEM FOR PERFORMING WIRELESS TRANSACTIONS WITH BIOMETRIC AUTHENTICATION

CROSS-REFERENCE TO RELATED APPLICATIONS

The present invention is a continuation of and claims benefit of priority to co-pending U.S. patent application Ser. No. 14/187,693, filed on Feb. 24, 2014, which is a continuation of and claims benefit of priority of U.S. patent application Ser. No. 11/040,847, filed on Jan. 21, 2005, now issued as U.S. Pat. No. 8,700,729, the entire disclosure of which is hereby incorporated by reference herein.

BACKGROUND OF THE INVENTION

The present invention relates generally to systems and methodologies for conducting electronic commerce and more particularly to methods, apparatuses, and systems for conducting online and proximity transactions utilizing biometric authentication.

According to current practices, consumers typically carry multiple single-purpose cards, tags, passes, and tokens which allow them to identify themselves to or present account information to retailers, service providers, financial institutions, government agencies, and other organizations. These single-purpose devices may contain combinations of encoded personal, account, and/or security information in order to identify a user and to authorize the user to conduct a particular transaction. Data on these devices may be encoded on a variety of media types such as magnetic stripes, bar codes, chips, and/or embossed or printed data. The creation of standards for many encoding formats has contributed to the proliferation of certain card and device types.

For example, data may be encoded on magnetic stripe cards using a proprietary methodology or by employing an "open" or "standard" encoding pattern. Magnetic stripe cards have been embraced by financial institutions, merchants, and consumers ever since standards for such cards were adopted by the industry in the 1970s. A magnetic stripe is encoded with bit patterns, which correspond to three tracks of ASCII characters. Credit cards and other bank cards typically use only tracks 1 and 2. Track 3 is a read/write track, but its usage is not standardized among financial institutions and is seldom used. The majority of magnetic cards in circulation conform to International Standards Organization (ISO) standards for magnetic cards.

Magnetic stripe technology is widely used throughout the world and remains the dominant technology in the United States for transaction processing and access control. One drawback associated with magnetic stripe technology is the limited amount of information that it can hold. Other technologies such as bar code and smart chip cards are also widely used in large part because they can hold more information than magnetic stripe cards.

Another drawback of magnetic stripe technology is that it provides little in the way of card authentication. The data on the stripe can be easily read by a card reader and potentially "skimmed" and then copied onto a fraudulent card. Because of the static nature of the magnetic stripe, bank issuers are not able to distinguish card data originating from a genuine card from card data read from a copied (cloned) card during an "online" authorization.

Smart cards provide a distinct advantage in that they offer the ability to provide authentication in connection with a transaction. Card authentication can be performed by the reader terminal and/or the issuer's systems using dynamic techniques that distinguish genuine cards from clones. A smart card generally includes an embedded semi-conductor device which is programmed before issue with the account holder's information. This data is protected through secure encryption methods, making it difficult to fraudulently replicate a smart card. The integrated circuits within smart cards in general have continued to improve with miniaturization, low power requirements, the addition of strong encryption capability, and tamper-proof standards for crypto-processor chips There are three general categories of smart cards: contact, contactless, and hybrid smart cards. A contact smart card requires that the user insert the smart card into a smart card reader with a direct connection to a conductive micromodule on the surface of the card. It is via these physical contact points, that transmission of commands, data, and card status takes place.

A contactless smart card requires only close proximity to a reader. Both the reader and the card have antennas and it is via this contactless link that the two communicate via radio frequency (RF) when in close proximity. Most contactless cards typically receive power for on-card electronic functions via this electromagnetic signal. The range is typically two to three inches for non-battery powered cards, and this is ideal for applications such as mass transit which requires a very fast card interface.

The third category of smart cards is known as hybrid smart cards. These cards typically have a dual interface enabling both contact and contactless communication with the card's chip.

As stated, RF communication is used in connection with both contactless and hybrid smart cards. RF and Radio Frequency Identification (RFID) technologies come in a variety of forms, each of which may be tailored for use in different types of environments. These technologies differ in, for example, the frequency bands they employ, which in turn influences the rate of data transfer between the tag and reader. Consequently, different data transfer rate requirements influence the types of solutions that RFID services can and should be expected to provide. RFID technology is typically used for POS payments, electronic toll collection, access control, and numerous other applications.

Contactless applications are particularly attractive to the retail payments segment where speed, convenience, and security are essential. Contactless payment systems are used successfully around the globe and offer a number of advantages to issuers, retailers, and consumers. Contactless payments allow issuers to penetrate the cash payment market, enjoy increased customer transaction volume, reduce fraud, and utilize the existing transaction processing infrastructure. Retailers realize benefits due to improved operational efficiency and lower operating costs. Consumers enjoy the convenience of faster transaction times and the ability to integrate multiple payment and loyalty accounts on one device.

American Express, MasterCard, and Visa have agreed on a single contactless payment standard in the United States, ISO/IEC 14443, and are implementing a contactless payment approach that leverages the existing payments infrastructure. As a result, merchants can easily add a contactless RF reader to their existing POS systems and immediately begin accepting contactless payment. MasterCard and Visa have also been working jointly over the last few years to develop specifications that define a set of requirements for security and interoperability between chip cards and terminals on a global basis, regardless of the manufacturer, the financial institution, or where the card is used.

As a result of the increased move towards standardization, improving technology and more demanding security and authorization requirements, smart cards are slowly replacing the magnetic stripe card as the dominant technology for conducting financial transactions. The enhanced ability of smart cards to secure confidential information and the ability of POS systems to authenticate the chip cards makes them an attractive alternative to magnetic stripe cards. Also, the reduction of fraudulent transactions achieved by smart cards results in lower risk, and lower fees for the consumer and the merchant.

Another important trend in consumer-related electronics is the increased speed and the reduced size of available electronic components which has contributed to the proliferation of powerful wireless devices. Mobile devices including personal digital assistants (PDAs) and cellular phones now number over one billion worldwide. The capability of wireless devices has been augmented by their ability to connect to the Internet and also to exchange data over short ranges with other wireless devices or readers.

Common short-range communications network standards defined by the International Electrical and Electronic Engineers association (IEEE) include 802.11a, 802.11b, and 802.11g. Many mobile devices employ these IEEE network standards to establish wireless LAN (WLAN) connectivity. Various other short-range technologies currently in use for device-to-device communication include Bluetooth and infra-red. One major short-range infra-red (IR) communications network protocol is defined by the Infra-red Device Association (IrDA), and is known as the IrDA standard. Wireless devices with integrated RFID proximity chips or Near Field Communication (NFC) technology may also provide users the ability to transfer information to a reader device.

With reference to the aforementioned fraud concerns as well as the general inconvenience of having to carry a large number of cards, tags and tokens, it would be beneficial to be able to conduct consumer and other financial transactions in a different manner. Although a completely cashless society is unlikely at least for the foreseeable future, it would be desirable to provide consumers with the ability to conduct more transactions without the need for cash.

The short-range data transmission capability of wireless devices, coupled with electronic wallet software operating on the devices, could allow users to carry out various transactions using a personal trusted device (PTD) that is loaded with the user's payment, identification, and/or other credentials. Unfortunately, there remain various obstacles to solutions using PTDs or other portable devices for conducting financial transactions. One primary hurdle to the broad-based deployment of such a solution is the difficulty in providing for the convenient, efficient, and secure distribution of credentials into wireless devices such that only those authorized to conduct the transactions may do so and only to the extent of their authorization.

Various possible solutions present a variety of drawbacks. Allowing the user to manually enter his or her personal information or account data that was previously stored on magnetic stripe, bar code, or chip cards directly into the wireless device leaves open the possibility that the data could be lost or used by an unauthorized party to make fraudulent transactions. Banks and other organizations in turn are reluctant to allow manual importation of sensitive information into wireless devices, owing primarily to security risks. Accordingly, there is a need for a solution which provides for the secure importation of financial and other personal information into wireless devices.

Since there is such a large number of credential issuers, mobile operators, and wireless end-users world-wide, there is also a need for a credential issuance and management system that is readily accessible by such a broad and diverse set of users. There is also a need for a system and method through which credential issuers can securely and rapidly target specific wireless devices for the distribution of the appropriate credentials over public and private networks.

SUMMARY OF THE INVENTION

According to one embodiment of the present invention, a computing device includes a display screen, a user input interface, and one or more processors. At least one memory device has stored therein a plurality of applications to be executed by the one or more processors, the plurality of applications including at least one wallet application for completing transactions based on wireless data communications between the computing device and at least one external electronic device. The at least one memory device further stores at least one electronic credential. The computing device includes a wireless transceiver configured to wirelessly communicate with the at least one external electronic device. The computing device further includes a biometric characteristic reader for reading a biometric characteristic of a user. The computing device is configured to wirelessly transmit the at least one electronic credential to the at least one external electronic device based on comparing the biometric characteristic of the user with stored biometric information to initiate one or more transactions with the at least one external electronic device.

According to another embodiment, a method includes storing in at least one memory device of a computing device at least one electronic credential and one or more applications configured to be executed by one or more processors of the computing device. The computing device includes a display screen, a user input interface, and at least one wireless transceiver. The method includes communicating wirelessly, by the at least one wireless transceiver, with at least one external electronic device. The method further includes reading, by a biometric characteristic reader, a biometric characteristic of a user. The method further includes transmitting the at least one electronic credential to the at least one external electronic device based on comparing the biometric characteristic of the user with stored biometric information to initiate one or more transactions with the at least one external electronic device.

According to yet another embodiment, a computing system includes a merchant system including one or more computers configured for processing information regarding one or more transactions to be performed with devices external to the merchant system. The computer system includes a computing device including a display screen, a user input interface, one or more processors, at least one memory device having stored therein at least one electronic credential and a plurality of applications to be executed by the one or more processors, and at least one wireless transceiver. The plurality of applications include at least one wallet application for completing transactions based on wireless data communications between the computing device and at least one external electronic device of the merchant system. The computing device is configured to transmit the at least one electronic credential to the at least one external electronic device based on comparing the biometric characteristic of the user with stored biometric information These and other advantages and features of the present invention are described herein with specificity so as to make the present invention understandable to one of ordinary skill in the art.

BRIEF DESCRIPTION OF THE DRAWINGS

FIGS. 7(a) and 7(b) are graphical representations showing examples of where "hot buttons" might be situated on a wireless device according to a preferred embodiment of the present invention;

DETAILED DESCRIPTION OF THE PREFERRED EMBODIMENTS

The present invention for transaction processing and related credential management and distribution is now described in specific terms sufficient to teach one of skill in the practice the invention herein. In the description that follows, numerous specific details are set forth by way of example for the purposes of explanation and in furtherance of teaching one of skill in the art to practice the invention. It will, however, be understood that the invention is not limited to the specific embodiments disclosed and discussed herein and that the invention can be practiced without such specific details and/or substitutes therefor. The present invention is limited only by the appended claims and may include various other embodiments which are not particularly described herein but which remain within the scope and spirit of the present invention.

Figure 1:
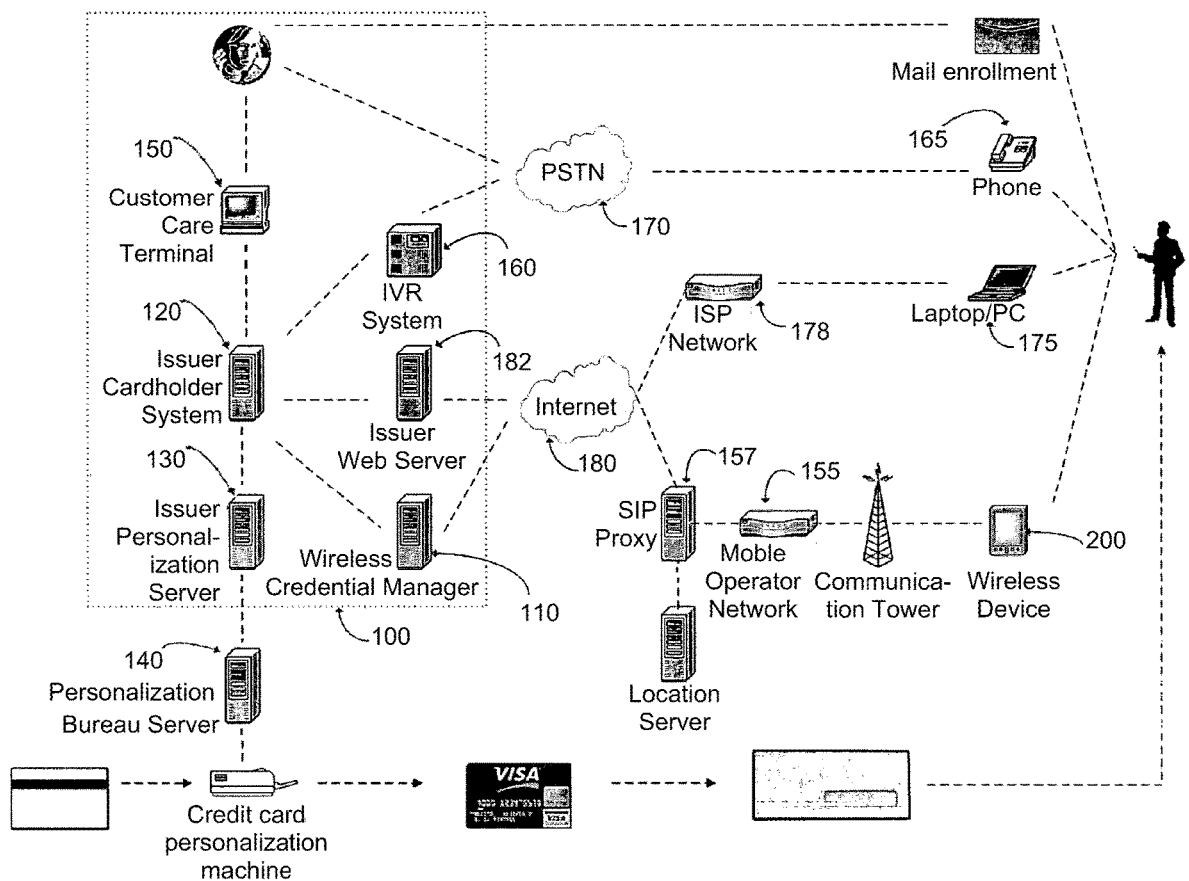
FIG. 1 is a overall view of the components of the present system and their relationship to one another according to a preferred embodiment of the present invention.

A general discussion of the present invention is now provided and is thereafter followed by a detailed description of each of the components and functions of the invention according to specific preferred embodiments. FIG. 1 is an overall system diagram illustrating some of the key components of the credential distribution system of the present invention in a preferred embodiment thereof. The ultimate goal of the present invention is to securely, accurately and rapidly distribute credentials to the proper wireless devices based upon the actions of credential issuers. It is also important that these credential issuers have the ability to securely, accurately and rapidly update credentials as required. In furtherance of this, wireless credential manager 110 of the present invention functions to manage, distribute and update credentials so that they are contained as desired in a wallet software application running on wireless device 200. A set of components 100 collectively comprise a subsystem capable of, among other things, causing the issuance of a credential to wireless device 200 according to the teachings of the present invention.

Although FIG. 1 shows only a single wireless device 200 it will be readily understood that in deploying the present invention, credential issuers obtain the ability to selectively control credentials held by a practically unlimited number of wireless devices. The teachings of the present invention illustrate techniques for ensuring that the proper credentials are made available only to the proper wireless device or set of wireless devices. Various addressing and other techniques are used in the present invention to ensure secure control over the distribution of credentials to the wireless devices.

In a preferred embodiment of the present invention, distribution of credentials is made via a transmission initiated by Issuer Cardholder System 120 to Wireless Credential Manager 110 which causes the credential or set of credentials to be transmitted to wireless device 200 via the Internet and/or one or more alternative public or private networks. Based upon the specific addressing schemes employed herein, the credential may then ultimately make its way to the targeted wireless device via an over-the-air wireless link.

As stated above, the present invention preferably involves the distribution of credentials to a "wireless device". As used herein, wireless device 200 is preferably a device that is capable of wirelessly connecting to the Internet using network protocols such as GSM/GPRS, CDMA2000, W-CDMA, EDGE, HDR, 1×RTT, UMTS, IMT-2000, 802.11a, 802.11b, 802.11g, or BLUETOOTH or other relevant protocols developed hereinafter. Preferably, wireless device 200 has a display screen and a key pad for alphanumeric and special character data input. It is further preferred that wireless device 200 has processing and secure storage capabilities allowing it to host and operate a wallet application capable of receiving, storing, managing and transmitting multiple payment, identification, and other confidential information electronically. Wireless device 200 also preferably has an integrated short-range communication capability for transmitting confidential information and exchanging other data between the wallet application and an external reader that is in proximity to the wireless device.

Wireless device 200 further preferably is of a type that has an assigned E.164 phone number, Uniform Resource Identifier (URI), or other type of unique address that can be resolved over the Internet. In a preferred embodiment, wireless device 200 also has a Session Initiation Protocol (SIP) Application Programming Interface (API) framework embedded in or running on top of a resident operating system, which allows for multiple SIP-based applications, such as the wallet application discussed herein, to function. The wallet application may also rely on its own SIP architecture, alleviating the need for a SIP API framework that could be used by multiple SIP applications.

Wireless Credential Manager (WCM) 110 maintains, controls and distributes credentials in accordance with the teachings herein. In a preferred embodiment, WCM 110 is able to interface with a payment, identification, and/or other existing user management or card management systems such as issuer cardholder system 120. An issuer representative may interface with issuer cardholder system 120 through the use of customer care terminal 150. The process for issuing a credential according to the present invention may be initiated manually by an issuer representative via terminal 150. Alternatively, the customer himself may initiate the process through interactive voice response (IVR) system 160 by calling in through wireline phone 165 via PSTN network 170.

Other alternatives for initiating the process include the use of computer via the requesting party's ISP 178, the Internet 180 and through the issuer's web server 182 to issuer cardholder system 120. Still another alternative for initiating the credential issuing process is through wireless device 200 via mobile operator network 155, SIP proxy 157, Internet 180 and issuer's web server 182. The wireless device used to initiate the credential issuance process may be either the device to receive the credential or another wireless device.

The bottom of FIG. 1 including a credit card personalization machine, a credit card and an envelope indicates that in connection with the delivery of a wireless device credential according to the teachings of the present invention, it is also possible to deliver a conventional credit card or other physical form of the credential for use by the customer.

WCM 110 provides for the secure Internet delivery of electronic credentials to wireless device 200 which is loaded with a wallet application. WCM 110 provides a secure and robust means of issuing, canceling, and managing electronic credentials on wireless devices via the Internet. WCM 110 leverages existing Internet protocols and technologies, making it easy for issuers to integrate with their existing systems, and alleviating the need to establish direct links with multiple mobile operators.

E.164 is the name of the international telephone numbering plan administered by the International Telecommunication Union (ITU), which specifies the format, structure, and administrative hierarchy of telephone numbers. "E.164" refers to the ITU document that describes the structure of telephone numbers. The ITU issues country codes to sovereign nations, but administration of telephone numbers within each country is governed by that country's telecommunications regulatory agency. A fully qualified E.164 number is designated by a country code, an area or city code, and a phone number. For example, a fully qualified, E.164 number for the phone number 555-1234 in Washington, D.C. (area code 202) in the United States (country code 1) would be +1-202-555-1234.

According to the teachings of the present invention, an E.164 phone number is used to target a user's wallet application on Internet-enabled wireless device 200 for the delivery of credentials and confidential data, including but not limited to credit card, debit card, ATM card, loyalty card, driver's license, electronic ticket, coupons and other information. In addition, an E.164 phone number is used according to the present invention to target a user's wallet application residing on wireless device 200 for the remote cancellation or updating of credentials. Also, E.164 phone numbers may be used as described herein to make person-to-person, person-to-company, or company-to-company electronic payments or fund transfers using wireless device 200. Although a preferred embodiment, this invention is not necessarily limited to the use of E.164 phone numbers. Rather, the use of URIs and other address types that are capable of being translated to an Internet address is also possible for the purposes mentioned above.

In a preferred embodiment, WCM 110 of the present invention uses the Electronic Numbering (ENUM) protocol to resolve a fully qualified E.164 telephone number for the particular wireless device 200 (with a loaded wallet application) to a fully qualified domain name address corresponding to the same device using a DNS-based architecture. ENUM (E.164 Number Mapping, RFC 3761) is a system that uses DNS (Domain Name Service, RFC 1034) in order to translate certain telephone numbers, like '+12025551234', into URIs (Uniform Resource Identifiers, RFC 2396) like 'sip:user@sipcarrier.com'. ENUM exists primarily to facilitate the interconnection of systems that rely on telephone numbers with those that use URIs to route transactions. E.164 is the ITU-T standard international numbering plan, under which all globally reachable telephone numbers are organized.

The use of ENUM presupposes the collection of these records into a central or hierarchical service. According to a preferred embodiment, the resolved Internet address is used to establish secure real-time communication between WCM 110 and the wallet application on wireless device 200 using the Session Initiation Protocol (SIP) (for example, according to the RFC 3261 standard) to transfer encrypted credentials. The issuer WCM 110 may also be used to update credentials or update the status of credentials on wireless device 200. WCM 110 may also be used to authenticate a mobile user's identity in real-time during a transaction. While the use of SIP for such purposes is preferred, alternative application protocols may be used in lieu of SIP while still remaining within the spirit and scope of the present invention.

The use of SIP for transmitting and managing credentials on wireless device 200 is preferred as mobile operators and fixed line operators are moving towards a SIP-based architecture for voice and other multimedia services. It is envisioned that the use of SIP for communication between a credential issuer and a wallet application resident on wireless device 200 could leverage the same SIP registrar, proxy, and presence servers used to deliver real-time interactive converged communication services within a mobile operator's network.

According to a preferred embodiment, ENUM is used as follows. The E.164 number is first converted into a query in the e164.arpa domain. The domain "e164.arpa" is being populated in order to provide the infrastructure in DNS for storage of E.164 numbers. In order to facilitate distributed operations, this domain is divided into sub-domains. The resultant set of services is specified by the returned collection of NAPTR (Naming Authority Pointer) records. The agent (the WCM in this case) selects a service that matches the service characteristics of the original request, and takes the corresponding URI for further resolution by DNS. The elements of this URI are further decomposed as per any rewrite rules in the NAPTR record. DNS queries are generated as per the sequence of preferred NAPTR rewrite operations. The ultimate result of this sequence of DNS queries is the specification of a protocol, an associated port address, and the IP address for a preferred server for the service.

In order to take advantage of ENUM, the mobile telephone number must first be assigned to a user by a telecom operator for services. The number can then be registered for one or more ENUM services. For example, a subscriber might wish to install a wallet application on wireless device 200 and register the telephone number as the identifier for the wallet application. Multiple issuers can in turn deliver payment methods, identification, or other types of electronic credentials to the wallet application on the wireless device 200 via the Internet using the phone number as the destination address. Additionally, that subscriber might wish to register an e-mail address or fax number to be associated with the same phone number. However the user chooses to set up these services, the information for the registered services, including the wallet application, is saved in NAPTR (Naming Authority Pointer) Resource Records.

Today, there exists an issue as to ownership of these ENUM DNS zones. In other words, it has not yet been decided which entity or entities will have the right to populate the e164.arpa domain with the URIs. For purposes of illustration, the discussion herein assumes that mobile operators will have the right to populate a collection of resource records associated with a DNS name. Furthermore, while e164.arpa appears to have been selected as the common international DNS root for ENUM DNS entries, there is a chance that once ENUM moves beyond the trial phase in many countries, a different domain could become the new standard. As such, references to e164.arpa throughout this document are not limiting and could be replaced with another root while still remaining within the scope of the present invention.

Credential Issuance Process

According to the present invention, electronic credentials may be issued to a wallet application on a wireless device 200 held (owned, rented or otherwise controlled) by a user that already has a physical card or token-based credential. For example, an existing bank customer that has a magnetic-stripe credit card may also request a digital card for use with the wallet application on his or her wireless device 200. The bank customer could request the new credential over the phone by first validating his or her identity with the issuer, by logging into the issuer's secure web site using a valid username and password, or in person at a branch.

Credentials may alternatively be issued to a wireless device held by a user that is applying for a new credential for the first time. For example, a user may be applying for a credit card for the first time, and may wish to only request the credential on his or her mobile phone. According to the teachings of this invention, credential issuers may request from applicants (e.g. over the telephone) a properly formatted E.164 phone number in order to target the delivery of credential(s) to a wallet application on wireless device 200. The request for a E.164 wireless device number on an application for a credit card, debit card, ATM card, loyalty card, driver's license, security pass, coupons, certificates, or other credential type is made by the issuer. The E.164 phone number may be obtained on paper, via a web-based application, via an electronic kiosk, via telephone or it may be captured through other means.

Figure 2:
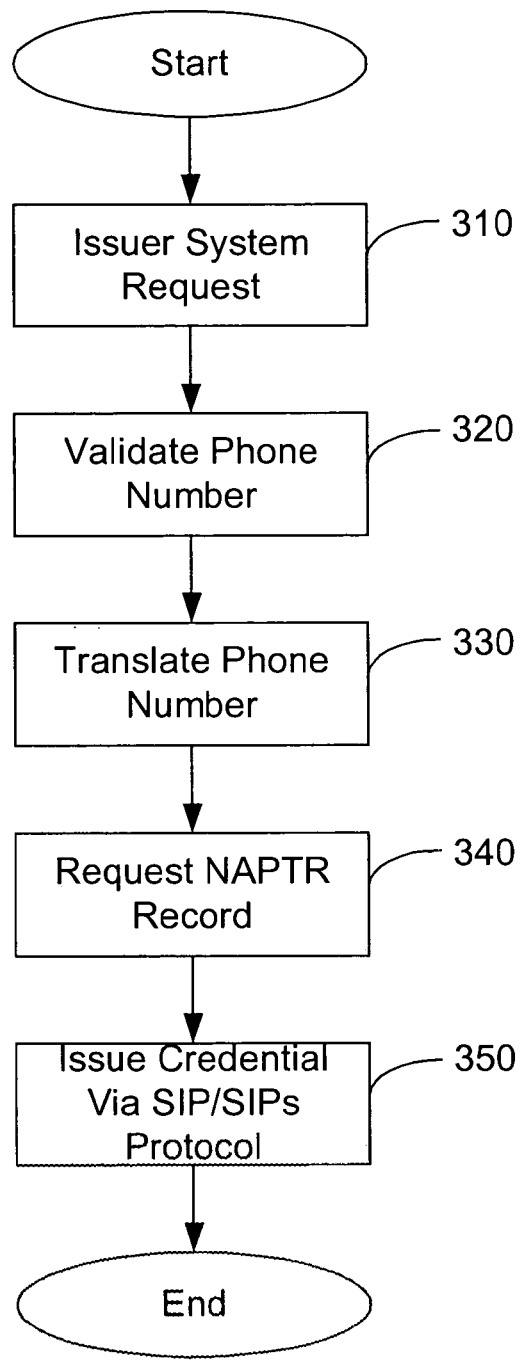
FIG. 2 is a flowchart illustrating the steps in the process for issuing a credential according to a preferred embodiment of the present invention.

Turning now to FIG. 2, an overview of the credential issuance process of the present invention, in a preferred embodiment thereof, is now described. The credential issuance process begins with WCM 110 receiving a request from the issuer's card or user management system 120 to issue electronic credentials to an individual user (see step 310). The request is forwarded to WCM 110 along with the user's mobile (E.164) number, the credentials to be issued, encryption keys, and other information contained in the Personalization File for the specific request. The Personalization File may be a batch file that contains numerous records of credentials that are to be issued to individuals on their wireless device 200, or could be a separate file record for each credential to be issued. In another embodiment, the Personalization File is transmitted to WCM 110 by issuer personalization server 130 which is in communication with issuer cardholder system 120. Issuer personalization server communicates with personalization bureau server 140 which is typically maintained by the personalization bureau.

The Personalization File is preferably similar to the Personalization File that credit card issuers send to personalization bureaus responsible for manufacturing, personalizing, and fulfilling magnetic-stripe cards for issuance to customers. The Personalization File received by personalization bureaus from credit card companies contains all the necessary account and consumer data required to emboss a card, encode the magnetic stripe, and fulfill the issued card via mail. Other information is sometimes also included in the Personalization File depending on the additional services performed by the Personalization Bureau. For example, the file may contain data indicating a request of the Personalization Bureau to generate a personal identification number (PIN) which may be mailed to the customer. This information or a subset thereof makes up the personalization file record that is transmitted by issuer cardholder system 120 to WCM 110 in connection with a credential issuance request according to the present invention.

In the case where a user already has one or more credentials from the issuer, such as a magnetic-stripe credit card, and wishes to supplement the card with a digital version of the credential on his or her wireless device 200, the issuer can provide the user with a digital credential linked to the same magnetic-stripe account, but that bears a different account number.

The full account number of the electronic credential issued to wireless device 200 may not be visible to the user through the wallet application (discussed later), since the credential may have been issued for "device present" transactions only as may be the case with certain credit cards that are issued. Account numbers and other information could also be partially masked for security reasons with other credential types. In all such cases, the issuer may specify in the security characteristics such as the visibility of account numbers or other information in the Personalization File. For example, the issuer may specify that the wallet application should only make the last four digits of the account number visible to the user on wireless device 200.

According to a preferred embodiment, WCM 110 will by default be configured to receive the mobile phone number (in the Personalization File Record) in the format specified in section 2.1 of RFC 3761. This format is herein referred to as the Application Unique String (AUS). The AUS is a fully qualified E.164 number minus any non-digit characters except for the "+" character which appears at the beginning of the number. The "+" is kept to provide a well understood anchor for the AUS in order to distinguish it from other telephone numbers that are not part of the E.164 namespace. For example, the E.164 number could be stored in issuer's card management system 120 as "+1-202-555-1234". To ensure consistent syntactic form, all non-digits except for "+" are removed in the Personalization File sent to WCM 110, yielding "+12025551234".

In order for an issuer to send confidential information to an approved user's wireless device 200, WCM 110 must first validate that the phone number is a syntactically correct E.164 number and then translate the number into an address that can be used by a DNS resolver (see step 320).

ENUM is only applicable for E.164 numbers. As an ENUM compliant application, WCM 110 will only query DNS for what it believes is an E.164 number. WCM 110 could in turn apply validation routines to ensure that the number received from the issuer's card management system 120 (and indirectly received from the user) is a syntactically correct E.164 number. WCM 110 can perform basic formatting on phone numbers received in the Personalization File. While it is preferred that issuer's card management system 120 populate phone numbers in the Personalization File in the AUS format mentioned above, WCM 110 may also have the ability to make edits in order to ensure proper formatting.

The WCM validation routine may further be customized by the issuer to be region specific; for example, an issuer in the United States that only wants to issue electronic credentials to domestic users, may set the validation routine to reject all numbers that do not match the US numbering format of +12025551234. While rules like this are preferably enforced in the card issuer's user management system 120, they can be also enforced by WCM 110. WCM 110 is preferably flexible to allow other types of validation routines to be programmed. WCM 110 of course cannot ensure that a particular number is valid until it tries it.

After WCM 110 validates the E.164 number, it must translate the mobile phone number into an address that can be used by a DNS resolver integrated into WCM 110 (see step 330). Because this address is based on a complete, international telephone number (for example, +12025551234), a unique Internet address exists for every unique phone number (once the ENUM database is completely populated). To determine if the number and address are registered in ENUM, the telephone number is translated in the following manner by WCM 110:

1) All characters with the exception of the digits are removed. For example, WCM 110 starts with the Application Unique String "+12025551234". This step would simply remove the leading "+", producing "12025551234".

2) Dots (".") are added between each digit. Example: 1.2.0.2.5.5.5.1.2.3.4

3) The order of the digits are reversed. Example: 4.3.2.1.5.5.5.2.0.2.1

4) The string ".e164.arpa" is appended to the end. Example: 4.3.2.1.5.5.5.2.0.2.1.e164.arpa This domain-name is used to request Naming Authority Pointer (NAPTR) resource records which may contain the end result or, if the flags field is blank, produces new keys in the form of domain-names from the DNS. WCM 110 interacts with the domain name space through its built in resolver. The resolver must have knowledge of at least one name server (likely on the issuer's network). The WCM resolver can be configured with multiple name servers.

When the resolver processes an ENUM query it asks a known name server for the information; in return, the resolver either receives the desired information or a referral to another name server. Using these referrals, the resolver learns the identities and contents of other name servers. Resolvers in general are responsible for dealing with the distribution of the domain space and dealing with the effects of name server failure by consulting redundant databases in other servers. Note that the resolver may have to make several queries to several different external name servers to answer a particular user query, and hence the resolution of a ENUM query may involve several network accesses and an arbitrary amount of time.

The next step in the overall process of the present invention in a preferred embodiment calls for the retrieval of a NAPTR record (see step 340). According to RFC 3761, the domain naming system uses the ENUM query to retrieve a NAPTR record associated with the E.164 number. The DNS response to the ENUM query contains one or more NAPTR records corresponding to the E.164 number, and each NAPTR record contains one or more service-specific Uniform Resource Identifiers (URIs).

Thus, for the example ENUM name query given above, the following NAPTR records might be received:
$ORIGIN 4.3.2.1.5.5.5.2.0.2.1.e164.arpa.
IN NAPTR 100 10 "u" "E2U+sip" "!^{circumflex over ( )}.*$!sip:bob@MobileCo.com!".
IN NAPTR 103 10 "u" "E2U+wallet" "!^{circumflex over ( )}.$!sips:bob@wallet.MobileCo.com!".

WCM 110 will look for a NAPTR record associated with the "wallet" service. The registered 'E2U+wallet' enum service will function as a selection mechanism for WCM 110 when choosing one NAPTR resource record from another. WCM 110 can select the corresponding URI and use the resolver a second time to translate the domain name part of the URI to an IP address using the URI-specific DNS resource record as a query term. WCM 110 can then use the full URI specification to open a session with the selected service port and complete the service transaction with the wallet application on the user's mobile device.

The packet format of the NAPTR RR is found in section 4 of RFC 4303. Examples of NAPTR records are shown below:
Order Pref. Flags Services Regexp Replacement
IN NAPTR 100 10 "u" "E2U+sip" "!^{circumflex over ( )}.*$sip:bob@mobileco.com!". IN NAPTR 103 10 "u" "E2U+wallet" "!^{circumflex over ( )}.*$!sips:bob@wallet.mobileco.com!".

NAPTR fields contain numerous components:
An Order field to specify the order in which multiple NAPTR records must be processed
A Preference field to determine the processing order when multiple records have the same order value
A Service field to specify the resolution protocol and service
Flags to modify the actions of further DNS lookups
A Regular Expression to allow the query client to rephrase the original request in a DNS format
A Replacement field to define the next DNS query object
The Order field in the NAPTR record for the wallet service can be set with the highest value since WCM 110 will be selecting a single record that contains the wallet enum service. The high value in the Order field will also reduce the likelihood of other SIP applications cycling through the records and incorrectly trying to communicate with the wallet application.

The flag "u" denotes a terminal lookup that will result in the production of a URI by the regular expression substitution specified. The "E2U+wallet" specifies a service to be contacted by SIP through the use of an E.164 to URI (E2U) translation. The substitution "!.*$!sips:bob@wallet.mobileco.com!" is then applied to the original phone number (such as +12025551234) to yield the result sips:bob@wallet.mobileco.com, which is used to resolve SIP addresses.

The replacement string is the resultant string ("sips:bob@wallet.mobileco.com"), which is to be used to initiate the SIP communication for issuing the credential to the specified wireless device 200 (see step 350). The NAPTR format also specifies a method for various matches in the regular expression to be substituted into the replacement string. This simple example does not require that although in actual operation, this feature may be used.

Enumservice registrations must be made with the IANA. A complete registration will include the proposed "enum-service" field, the URI schemes, a functional specification, security considerations, intended usage, and any other information intended to allow for the interoperability within ENUM. Service Registration requirements are outlined in RFC 3761.

According to the teachings of the present invention, the "enumservice" field is used to represent an electronic wallet application or service associated with the E.164 phone number. Traditionally, the services field of a NAPTR record (as defined in RFC 3403) contains a string that is composed of two subfields: a 'protocol' subfield and a 'resolution service' subfield. ENUM in particular defines an 'E2U' (E.164 to URI) resolution service and a service 'Type' that is registered with the IANA. Note that the token "sip" that is shown as an example above is a Type registered with the IANA. The Type "wallet" however, is shown for illustrative purposes. The Types have no implicit connection with the protocols or URI schemes even though they can bear the same name.

According to the teachings of the present invention the 'E2U' resolution service is used in conjunction with a Type that represents an electronic wallet application or service. For example, an 'E2U+wallet' enumservice that indicates the presence of an electronic wallet application running on a mobile phone or on other systems connected to the Internet may be used. While the example above uses the theoretical "wallet" Type, the actual label that is registered with the IANA for this purpose could be different. The service parameters including guidelines for the Type field can be found in section 2.4.2 of RFC 3761. The 'type' must be unique and comply with other naming requirements outlined in section 3.1.2 of RFC 3761.

The scheme of the URI that will appear in a NAPTR record using the 'E2U+wallet' enumservice may be either 'SIP' or 'SIPS'. While SIPS offers greater security, there may be reasons for using SIP that are not contemplated herein. Furthermore, the use of application protocols other than SIP and SIPs in conjunction with the 'E2U+wallet' enumservice in the NAPTR records is also possible. The ability to support another enumservice in addition to the 'E2U+wallet' enumservice in the same NAPTR RR is also possible (reference section 8, RFC 3761).

As ENUM uses DNS, which in its current form is an insecure protocol, there is no mechanism for ensuring that the data one gets back is authentic. As ENUM is deployed on the global Internet, it is expected to be a popular target for various kinds of attacks, and attacking the underlying DNS infrastructure is one way of attacking the ENUM service itself. There are multiple types of attacks that can happen against DNS that ENUM implementations should be aware of. Section 6.1 of RFC 3761 lists threats that are taken from Threat Analysis of the Domain Name System.

Because of those threats, WCM 110 preferably includes mechanisms which ameliorate these threats. For example, some of these threats can be solved by verifying the authenticity of the data via mechanisms such as DNSSEC, which will be supported by WCM 110. WCM 110 will be prepared to receive DNSSEC and other standardized DNS security responses, including large responses, EDNSO signaling, and unknown RRs.

SIP (Session Initiation Protocol, RFC 3261) is a text-based application protocol that allows two endpoints in the Internet to discover one another in order to exchange context information about a session they would like to share. Common applications for SIP include Internet telephony, instant messaging, video, Internet gaming, and other forms of real-time communications. SIP is a multi-service protocol capable of initiating sessions involving different forms of real-time communications simultaneously.

SIP is an application-layer control protocol that can establish, modify, and terminate multimedia sessions such as Internet telephony calls. SIP can also invite participants to already existing sessions such as multicast conferences. SIP transparently supports name mapping and redirection services, which supports personal mobility—users can maintain a single externally visible identifier regardless of their network location.

SIP supports five facets of establishing and terminating multimedia communications:

1. User Location: Determination of the end system to be used for communication;
2. User Availability: Determination of the willingness of the called party to engage in communications;
3. User capabilities: Determination of the media and media parameters to be used;
4. Session Setup: "Ringing", Establishment of session parameters at both called and calling party;
5. Session Management: Including transfer and termination of sessions, modifying session parameters, and invoking services.

SIP was developed by the IETF as part of the Internet Multimedia Conferencing Architecture, and was designed to dovetail with other Internet protocols such as Transmission Control Protocol (TCP), Transmission Layer Security (TLS), User Datagram Protocol (UDP), Internet Protocol (IP), Domain Name System (DNS), and others. SIP works with both IPv4 and IPv6.

SIP is based on an HTTP-like request/response transaction model. Each transaction consists of a request that invokes a particular method, or function, on the server and at least one response. SIP uses most of the header fields, encoding rules, and status codes of HTTP. This provides a readable text-based format for displaying information. SIP incorporates the use of Session Description Protocol (SDP), which defines session content using a set of types similar to those used in Multipurpose Internet Mail Extensions (MIME). Technically, SIP will function across both IPv4 and IPv6 networks.

SIP can provide a set of services that is more diverse, compelling and profitable than any of the contemporary wireless protocols including WAP, SMS and MMS. SIP allows the development of services that can blend voice, presence, the Web, instant messaging, unified messaging and many others. Carriers who deploy SIP-based infrastructure will be able to offer more differentiated and profitable services than their counterparts, which will correspondingly allow them to realize higher revenues, higher profits and lower churn.

The present invention, in a preferred embodiment provides for using some of the SIP-network infrastructure that mobile operators will have in place to deliver credentials from SIP-based Wireless Credential Manager (WCM) 110 at an issuer site to a SIP-based wallet application on a wireless device 200. The system disclosed herein is designed to interoperate with mobile 2.5G, 3G, and Wi-Fi networks among others.

It will be understood that the components shown in FIG. 1 are merely exemplary of one embodiment of the present invention and the invention is not necessarily limited thereto.

Figure 3:
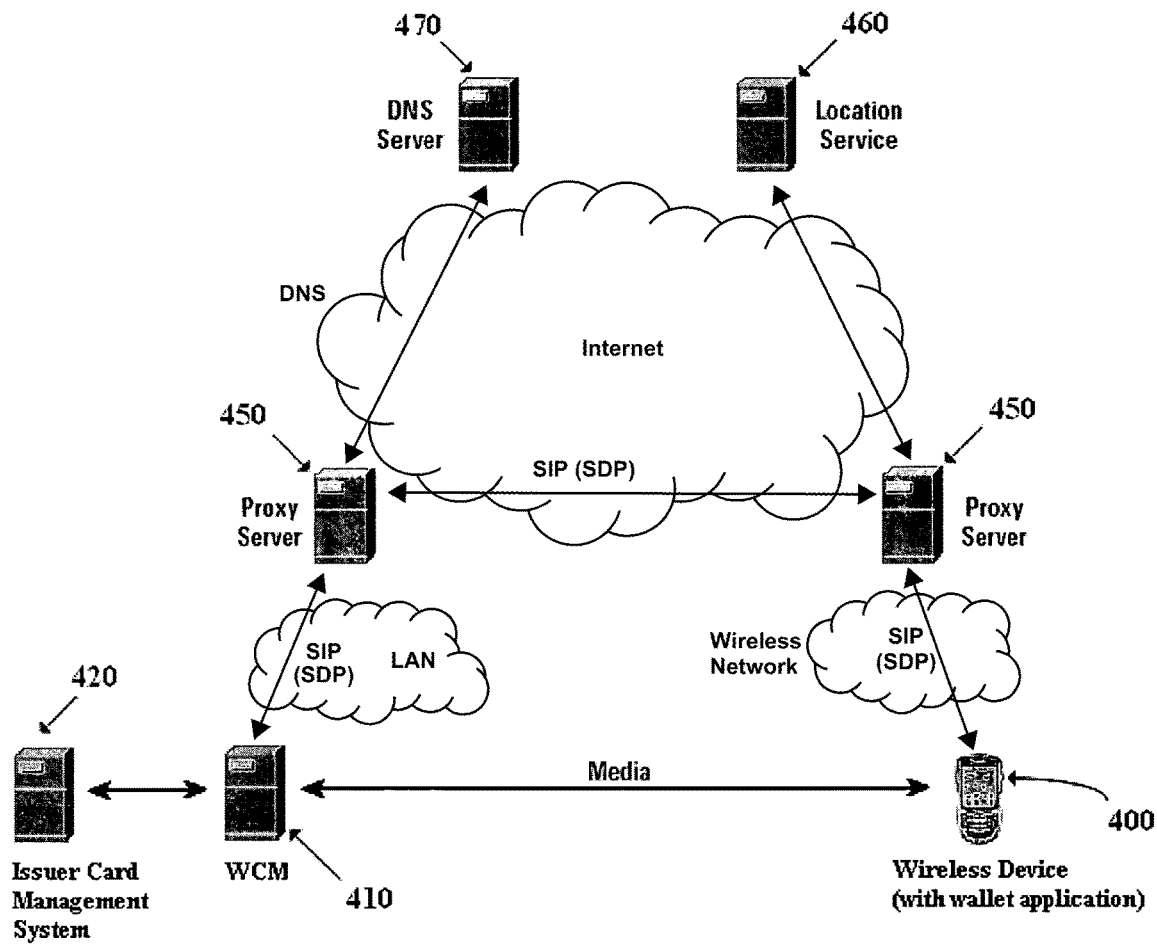
FIG. 3 illustrates some of the SIP components, their relationship to one another and the protocols that are employed in a preferred embodiment of the present invention.

Turning now to FIG. 3, a discussion of the present invention in the context of SIP and related functionality is now provided. As stated above, although the present invention is disclosed in the context of SIP, other protocols and related components may be used while still remaining within the scope and spirit of the present invention.

FIG. 3 illustrates some of the SIP components, their relationship to one another and the protocols that are employed. A user agent acting as a client (in this case the issuer WCM 410 which is in communication with issuer card management system 420) uses SIP to set up a session with a user agent that acts as a server (in this case a wallet application operating on user's wireless device 400). The session initiation dialogue uses SIP and involves one or more proxy servers to forward requests and responses between the two user agents. The user agents also make use of the SDP, which is used to describe the media session.

The proxy servers 450 may also act as redirect servers as needed. If redirection is done, the proxy server 450 needs to consult the location service database 460, which may or may not be colocated with the proxy server 450. The Domain Name System (DNS) 470 is also an important part of SIP operation. Typically, a user agent client (UAC) makes a request using the domain name of the user agent server (UAS), rather than an IP address. Proxy server 450 thus needs to consult DNS server 470 to find a proxy server 450 for the target domain.

SIP often runs on top of the User Datagram Protocol (UDP) for performance reasons, and provides its own reliability mechanisms, but may also use TCP. If a secure, encrypted transport mechanism is desired, SIP messages may alternatively be carried over the Transport Layer Security (TLS) protocol.

Associated with SIP is the SDP, defined in RFC 2327. SIP is used to invite one or more participants to a session, while the SDP-encoded body of the SIP message contains information about what media encodings (for example, voice, video) the parties can and will use. After this information is exchanged and acknowledged, all participants are aware of the participants' IP addresses, available transmission capacity, and media type. Then, data transmission begins, using an appropriate transport protocol. Typically, the RTP is used. Throughout the session, participants can make changes to session parameters, such as new media types or new parties to the session, using SIP messages.

The Session Description Protocol (SDP), defined in RFC 2327, describes the content of sessions, including telephony, Internet radio, and multimedia applications. SDP includes information about:

Media streams: A session can include multiple streams of differing content. SDP currently defines audio, video, data, control, and application as stream types, similar to the MIME types used for Internet mail.
Addresses: SDP indicates the destination addresses, which may be a multicast address, for a media stream.
Ports: For each stream, the UDP port numbers for sending and receiving are specified.
Payload types: For each media stream type in use (for example, telephony), the payload type indicates the media formats that can be used during the session.
Start and stop times: These apply to broadcast sessions, for example, a television or radio program. The start, stop, and repeat times of the session are indicated.
Originator: For broadcast sessions, the originator is specified, with contact information. This may be useful if a receiver encounters technical difficulties.

Although SDP provides the capability to describe multimedia content, it lacks the mechanisms by which two parties agree on the parameters to be used. RFC 3264 remedies this lack by defining a simple offer/answer model, by which two parties exchange SDP messages to reach agreement on the nature of the multimedia content to be transmitted.

A resource within a SIP configuration is identified by a URI. Examples of communications resources include the following:
A user of an online service
An appearance on a multiline phone
A mailbox on a messaging system
A telephone number at a gateway service
A group (such as "sales" or "help desk") in an organization SIP URIs have a format based on e-mail address formats, namely user@domain. There are two common schemes. An ordinary SIP URI is of the form: sip:bob@biloxi.com. The URI may also include a password, port number, and related parameters. If secure transmission is required, "sip:" is replaced by "sips:". In the latter case, SIP messages are transported over TLS.

Now that a general description of the methodology and components of the present invention has been provided, the following discussion provides examples of the use of the SIP protocol for issuing, canceling and updating credentials on a wireless device according to the teachings of the present invention.

The first example shows the basic functions of SIP: location of an end point, signal of a desire to communicate, negotiation of session parameters to establish the session, and teardown of the session once established.

Figure 4:
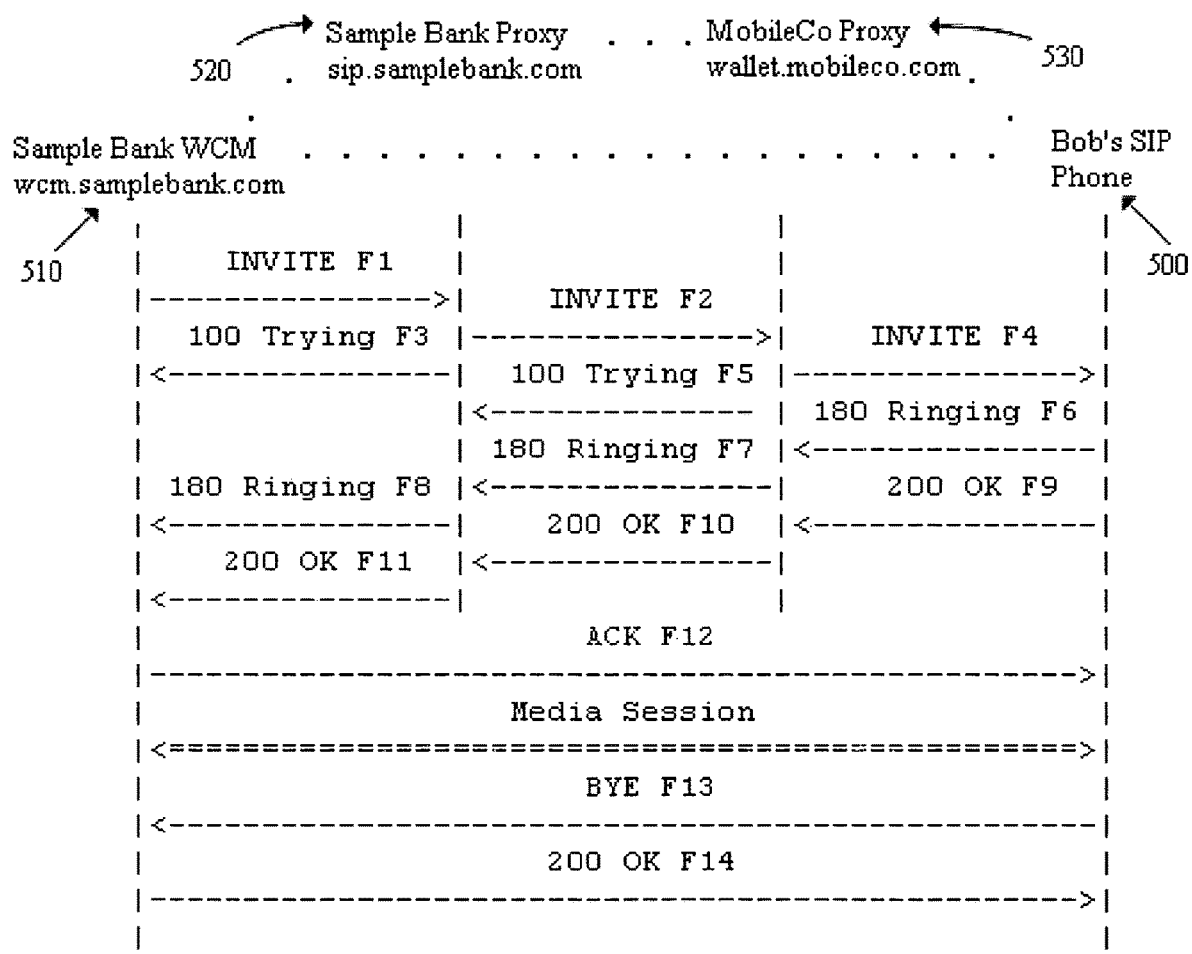
FIG. 4 is an illustration of a typical SIP message exchange between a credential issuer and a fictitious mobile user.

FIG. 4 shows a typical example of a SIP message exchange between a credential issuer (named herein Sample Bank) and a fictitious mobile user named Bob. (Each message is labeled with the letter "F" and a number for reference by the text.) In this example, SIP signaling functionality embedded in the Wireless Credential Manager (WCM) 510 is used to issue Bob a Sample Bank MasterCard on his SIP-enabled mobile device 500 via the Internet. Also shown are two SIP proxy servers that act on behalf of Sample Bank and Bob's mobile operator (MobileCo) to facilitate session establishment. This typical arrangement is often referred to as the "SIP trapezoid" as shown by the geometric shape of the dotted lines in FIG. 4.

WCM 510 may initiate communication with a wallet application on Bob's wireless device 500 through a SIP proxy server on MobileCo's network that also handles voice, instant messaging, and other services.

WCM 510 initiates a "call" to Bob using his SIP identity, a type of Uniform Resource Identifier (URI) called a SIP URI. URIs are defined in Section 19.1 of RFC 3261. The URI corresponding to Bob's wallet application was obtained from the NAPTR record that resulted from the ENUM query performed by WCM 510 on Bob's mobile phone number. It has a similar form to an email address, typically containing a username and a host name. In this case, it is sips:bob@wallet.mobileco.com, where mobileco.com is the domain of Bob's SIP service provider. The Sample Bank WCM 510 has a SIP URI of sips:wcm.samplebank.com.

A call made to a 'SIPS' URI guarantees that secure, encrypted transport (namely TLS) is used to carry all SIP messages from the caller to the domain of the callee. From there, the request is sent securely to the callee, but with security mechanisms that depend on the policy of the domain of the callee.

As previously mentioned, SIP is based on an HTTP-like request/response transaction model. Each transaction consists of a request that invokes a particular method, or function, on the server and at least one response. In this example, the transaction begins with WCM 510 sending an INVITE request addressed to Bob's SIPS URI. The INVITE request contains a number of header fields. Header fields are named attributes that provide additional information about a message. The ones present in an INVITE include a unique identifier for the call, the destination address, the WCM address, and information about the type of session that WCM 510 wishes to establish with Bob. The INVITE (message F1 in FIG. 4) might look like this:

INVITE sips:bob@wallet.mobileco.com SIP/2.0
Via: SIP/2.0/TLS wcm.samplebank.com; branch=z9hG4bK776asdhds
Max-Forwards: 70
To: Bob Smith <sips:bob@wallet.mobileco.com>
From: Samplebank <sips:WCM.samplebank.com>; tag=1928301774
Call-ID: a84b4c76e66710@WCM.samplebank.com
CSeq: 314159 INVITE
Contact: <sips:wcm.samplebank.com>
Content-Type: application/sdp
Content-Length: 142 [0143] (Sample Bank's SDP not shown)

The first line of the text-encoded message contains the method name (INVITE). The lines that follow are a list of header fields. This example contains a minimum required set. The header fields are briefly described below:

Via contains the address (wcm.samplebank.com) at which Sample Bank's Wireless Credential Manager is expecting to receive responses to this request. It also contains a branch parameter that identifies this transaction.

To contains a display name (Bob Smith) and a SIP or SIPS URI (sips:bob@wallet.mobileco.com) towards which the request was originally directed. Display names are described in RFC 2822.

From also contains a display name (Sample Bank) and a SIP or SIPS URI (sips:wcm.samplebank.com) that indicate the originator of the request. This header field also has a tag parameter containing a random string (1928301774) that was added to the URI by the Sample Bank WCM 510. It is used for identification purposes.

Call-ID contains a globally unique identifier for this call, generated by the combination of a random string and the WCM host name or IP address. The combination of the To tag, From tag, and Call-ID completely defines a peer-to-peer SIP relationship between the WCM 510 and Bob and is referred to as a dialog.

CSeq or Command Sequence contains an integer and a method name. The CSeq number is incremented for each new request within a dialog and is a traditional sequence number.

Contact contains a SIP or SIPS URI that represents a direct route to contact the WCM 510, usually composed of a username at a fully qualified domain name (FQDN). While an FQDN is preferred, many end systems do not have registered domain names, so IP addresses are permitted. While the Via header field tells other elements where to send the response, the Contact header field tells other elements where to send future requests.

Max-Forwards serves to limit the number of hops a request can make on the way to its destination. It consists of an integer that is decremented by one at each hop.

Content-Type contains a description of the message body (not shown).

Content-Length contains an octet (byte) count of the message body.

The complete set of SIP header fields is defined in Section 20 of RFC 3261. The details of the session, such as the type of media, codec, or sampling rate, are not described using SIP. Rather, the body of a SIP message contains a description of the session, encoded in some other protocol format. One such format is the Session Description Protocol (SDP) (RFC 2327. This SDP message (not shown in the example) is carried by the SIP message in a way that is analogous to a document attachment being carried by an email message, or a web page being carried in an HTTP message.

Since WCM 510 does not know the location of Bob or the SIP server in the mobileco.com domain, WCM 510 sends the INVITE to the SIP server that serves Sample Bank's domain, samplebank.com. The address of the Sample Bank SIP server (sip.samplebank.com) could have been configured in WCM 510, or it could have been discovered by DHCP, for example. It should be noted that for illustrative purposes the SIP proxy functionality was shown as a being a separate server from WCM 510; in reality the proxy functionality is a part of WCM 510. The proxy component of WCM 510 is an important aspect of this system and the overall methodology.

The Sample Bank SIP server 520 (sip.samplebank.com) is a type of SIP server known as a proxy server. A proxy server receives SIP requests and forwards them on behalf of the requester. In this example, the proxy server 520 receives the INVITE request and sends a 100 (Trying) response back to Sample Bank WCM 510. The 100 (Trying) response indicates that the INVITE has been received and that the proxy is working on behalf of WCM 510 to route the INVITE to the destination. Responses in SIP use a three-digit code followed by a descriptive phrase. This response contains the same To, From, Call-ID, CSeq and branch parameter in the Via as the INVITE, which allows WCM 510 to correlate this response to the sent INVITE.

The sip.samplebank.com proxy server 520 locates the proxy server "wallet.mobileco.com" 530 quite easily as this implementation assumes that the use of a subdomain such as "wallet" is a standard by which WCM 510 can identify a proxy server within the operator's network. In other instances where a subdomain may not be part of the URI that is retrieved from the NAPTR record, the Sample Bank proxy server 520 can identify a proxy server within the operator's network possibly by performing a particular type of DNS (Domain Name Service) lookup to find the SIP server that serves the mobileco.com domain. This is described in RFC 3263. Either way, it obtains the IP address of the wallet.mobileco.com proxy server 530 and forwards, or proxies, the INVITE request there.

Before forwarding the request, the sip.samplebank.com proxy server 520 adds an additional Via header field value that contains its own address (the INVITE already contains the WCM address in the first Via). The wallet.mobileco.com proxy server 530 receives the INVITE and responds with a 100 (Trying) response back to the sip.samplebank.com proxy server 520 to indicate that it has received the INVITE and is processing the request. The proxy server consults a database, generically called a location service, that contains the current IP address of Bob. The wallet.mobileco.com proxy server 530 adds another Via header field value with its own address to the INVITE and proxies it to Bob's SIP enabled mobile phone 500 with the wallet application.

The wallet application on Bob's SIP phone 500 receives the INVITE. The INVITE message received by the wallet application prompts the application to alert Bob of the incoming communication from Sample Bank. The alert mechanism used by the wallet application could use the wireless device's internal capability such as generating a tone or vibrating. In addition to the tone or vibration, the device display may give Bob additional details of the incoming communication from Sample Bank so that Bob can decide whether to accept connectivity with Sample Bank's server for the purpose of receiving the Sample Bank MasterCard credential. Bob's SIP phone 500 indicates this in a 180 (Ringing) response, which is routed back through the two proxies in the reverse direction. Each proxy uses the Via header field to determine where to send the response and removes its own address from the top. As a result, although DNS and location service lookups were required to route the initial INVITE, the 180 (Ringing) response can be returned to the caller without lookups or without state being maintained in the proxies. This also has the desirable property that each proxy that sees the INVITE will also see all responses to the INVITE.

In the next example, the 180 (Ringing) response is routed to the Sample Bank WCM 510. In this example, Bob decides to allow connectivity with the Sample Bank server 510 by pressing a key on his phone (as prompted for by the wallet application). After he presses the appropriate key to accept connectivity with Sample Bank's server 510, his SIP phone 500 sends a 200 (OK) response to indicate that the call has been answered by the wallet application. The 200 (OK) contains a message body with the SDP media description of the type of session that the wallet application running on Bob's SIP phone 500 is willing to establish with the Sample Bank WCM 510. As a result, there is a two-phase exchange of SDP messages: the WCM 510 sent one to Bob's wallet application, and the wallet application sent one back to the WCM 510. This two-phase exchange provides basic negotiation capabilities and is based on a simple offer/answer model of SDP exchange. If Bob did not wish to answer the communication from Sample Bank or was busy on a phone call, an error response would have been sent instead of the 200 (OK), which would have resulted in no media session being established between the wallet application on Bob's phone 500 and the Sample Bank WCM 510. The complete list of SIP response codes is in Section 21 of RFC 3261. The 200 (OK) (message F9 in FIG. 4) might look like this as Bob's wallet application sends it out:

SIP/2.0 200 OK
Via: SIP/2.0/TLS wallet.mobileco.com
;branch=z9hG4bKnashds8;received=192.0.2.3
Via: SIP/2.0/TLS sip.samplebank.com
;branch=z9hG4bK77ef4c2312983.1;received=192.0.2.2
Via: SIP/2.0/TLS wcm.samplebank.com
;branch=z9hG4bK776asdhds;received=192.0.2.1
To: Bob Smith <sips:bob@wallet.mobileco.com>; tag=a6c85cf
From: Samplebank <sips:wcm.samplebank.com>; tag=1928301774
Call-ID: a84b4c76e66710@wcm.samplebank.com
CSeq: 314159 INVITE
Contact: <sips:bob@ 192.0.2.4>
Content-Type: application/sdp
Content-Length: 131
(Bob's SDP not shown)

The first line of the response contains the response code (200) and the reason phrase (OK). The remaining lines contain header fields. The Via, To, From, Call-ID, and CSeq header fields are copied from the INVITE request. (There are three Via header field values—one added by the Sample Bank WCM 510, one added by the sip.samplebank.com proxy 520, and one added by the wallet.mobileco.com proxy 520). Bob's SIP phone 500 has added a tag parameter to the To header field. This tag will be incorporated by both endpoints into the dialog and will be included in all future requests and responses in this communication. The Contact header field contains a URI at which Bob can be directly reached at his SIP phone 500. The Content-Type and Content-Length refer to the message body (not shown) that contains Bob's SDP media information.

In addition to DNS and location service lookups shown in this example, proxy servers can make flexible "routing decisions" to decide where to send a request. In this case, the 200 (OK) is routed back through the two proxies and is received by the WCM 510, which then stops the ringback tone and indicates that the "call" has been answered. Finally, the WCM 510 sends an acknowledgement message, ACK, to the wallet application on Bob's SIP phone 500 to confirm the reception of the final response (200 (OK)). In this example, the ACK is sent directly from the WCM 510 to the wallet application on Bob's SIP phone 500, bypassing the two proxies. This occurs because the endpoints have learned each other's address from the Contact header fields through the INVITE/200 (OK) exchange, which was not known when the initial INVITE was sent. The lookups performed by the two proxies are no longer needed, so the proxies drop out of the call flow. This completes the INVITE/200/ACK three-way handshake used to establish SIP sessions. Full details on session setup are in Section 13 of RFC 3261.

The use of a SIP architecture to locate a mobile end-user and to establish direct communication between the end-points (WCM and wallet application) for the purpose of transferring confidential information (e.g. credentials) is an important aspect of the present invention. The direct connection between the end-points using SIP offers a secure method, without intermediary servers, by which to transmit confidential information.

The media session between the Sample Bank WCM 510 and the wallet application on Bob's SIP enabled mobile phone 500 has now begun, and they can send data packets using the format to which they agreed in the exchange of SDP. In general, the end-to-end data packets take a different path from the SIP signaling messages.

The established session may initially be used to exchange encryption keys and/or other security information. Subsequent to that, the issuer's system will authenticate the mobile user's identity in real-time to ensure that the person on the receiving end is in fact the person that requested the digital credential. The authentication process can be accomplished by the issuer system prompting the user for some cardholder or accountholder authentication information contained within its system, that only the rightful accountholder would have. The user would see such a request for information within the wallet application screen on the device display. This could include a request for such information such as an existing card account number, card expiration date, cardholder name, mother's maiden name, billing address, social security number, account balance, transaction history, driver's license number, or business identification. The issuer could also request a special code or PIN that was mailed to the user in advance of the issuance as a means to further validate identity and ensure non-repudiation. Some of the input information individually, or a combination of certain input information could be used as a decryption key for a credential that is transmitted to the wireless device. Subsequent to the issuer's system validating the user's identity in real-time, the WCM 510 will transmit the credential to the wallet application.

During the peer-to-peer session, either the WCM 510 or the wallet application on Bob's phone 500 may decide to change the characteristics of the media session. This is accomplished by sending a re-INVITE containing a new media description. This re-INVITE references the existing dialog so that the other party knows that it is to modify an existing session instead of establishing a new session. The other party sends a 200 (OK) to accept the change. The requestor responds to the 200 (OK) with an ACK. If the other party does not accept the change, he sends an error response such as 488 (Not Acceptable Here), which also receives an ACK. However, the failure of the re-INVITE does not cause the existing call to fail—the session continues using the previously negotiated characteristics. Full details on session modification are in Section 14 of RFC 3261.

At the end of the communication session (in this example), Bob's wallet application disconnects (hangs up) first and generates a BYE message. This BYE is routed directly to the WCM 510, again bypassing the proxies. The WCM 510 confirms receipt of the BYE with a 200 (OK) response, which terminates the session and the BYE transaction. No ACK is sent—an ACK is only sent in response to a response to an INVITE request. The reasons for this special handling for INVITE relate to the reliability mechanisms in SIP, the length of time it can take for a "ringing" application to be answered, and forking. For this reason, request handling in SIP is often classified as either INVITE or non-INVITE, referring to all other methods besides INVITE. Full details on session termination are in Section 15 of RFC 3261. While the above example shows the wallet application terminating the session first, during actual implementation, the WCM 510 may terminate the session first.

In some cases, it may be useful for proxies in the SIP signaling path to see all the messaging between the endpoints for the duration of the session. For example, if the sip.samplebank.com proxy server 520 wished to remain in the SIP messaging path beyond the initial INVITE, it would add to the INVITE a required routing header field known as Record-Route that contained a URI resolving to the hostname or IP address of the proxy. This information would be received by both Bob's SIP phone 500 and (due to the Record-Route header field being passed back in the 200 (OK)) the WCM 510 and stored for the duration of the dialog. The sip.samplebank.com proxy server would then receive and proxy the ACK, BYE, and 200 (OK) to the BYE. Each proxy can independently decide to receive subsequent messages, and those messages will pass through all proxies that elect to receive it. This capability is frequently used for proxies that are providing mid-call features. While it is not preferred to use any mid-session features for the purpose of issuing, canceling, or updating credentials, there could be reasons for using it which are not discussed herein.

SIP offers a discovery capability. If a user wants to initiate a session with another user, SIP must discover the current host(s) at which the destination user is reachable. This discovery process is frequently accomplished by SIP network elements such as proxy servers and redirect servers which are responsible for receiving a request, determining where to send it based on knowledge of the location of the user, and then sending it there. To do this, SIP network elements consult an abstract service known as a location service, which provides address bindings for a particular domain. These address bindings map an incoming SIP or SIPS URI, sips:bob@wallet.mobileco.com, for example, to an associated IP address of the registering wireless device, 192.0.2.4, for example. Ultimately, a proxy will consult a location service that maps a received URI to the user agent(s) at which the desired recipient is currently residing. According to the present invention, a unique URI may be used to represent a wallet application functioning on a wireless device or server, and it may be mapped it to an IP address in a location service.

Registration is one way that the wallet.mobileco.com server can learn Bob's current location. Upon initialization, and at periodic intervals, the wallet application on Bob's SIP phone sends REGISTER messages to a server in the mobileco.com domain known as a SIP registrar. The REGISTER messages associate Bob's SIP or SIPS URI (sips:bob@wallet.mobileco.com) with the network address currently assigned to his wireless device (conveyed as a SIP or SIPS URI in the Contact header field). While it is stated that the wallet application is performing the registration, a SIP enabled phone (with multiple SIP applications running on it) may register itself and all active SIP applications at once with the registration server. In this example, a unique URI is associated with the wallet application; during actual implementation, the same URI could be used for multiple applications on the same device.

The registrar writes this association, also called a binding, to a database, called the location service, where it can be used by the wallet.mobileco.com proxy. Often, a registrar server for a domain is co-located with the proxy for that domain. It is an important concept that the distinction between types of SIP servers is logical, not physical.

The location service is just an abstract concept. It generally contains information that allows a proxy to input a URI and receive a set of zero or more URIs that tell the proxy where to send the request. Registrations are one way to create this information, but not the only way. Arbitrary mapping functions can be configured at the discretion of the administrator.

Finally, it is important to note that in SIP, registration is used for routing incoming SIP requests and has no role in authorizing outgoing requests. Authorization and authentication are handled in SIP either on a request-by-request basis with a challenge/response mechanism, or by using a lower layer scheme as discussed in Section 26 of RFC 3261. The use of authorization and authentication schemes between the wallet application and the mobile operator's SIP proxy is an important part of the present invention.

The complete set of SIP message details for this registration example is in Section 24.1 of RFC 3261. Additional operations in SIP, such as querying for the capabilities of a SIP server or client using OPTIONS, or canceling a pending request using CANCEL, are addressed in RFC 3261.

Figure 5:
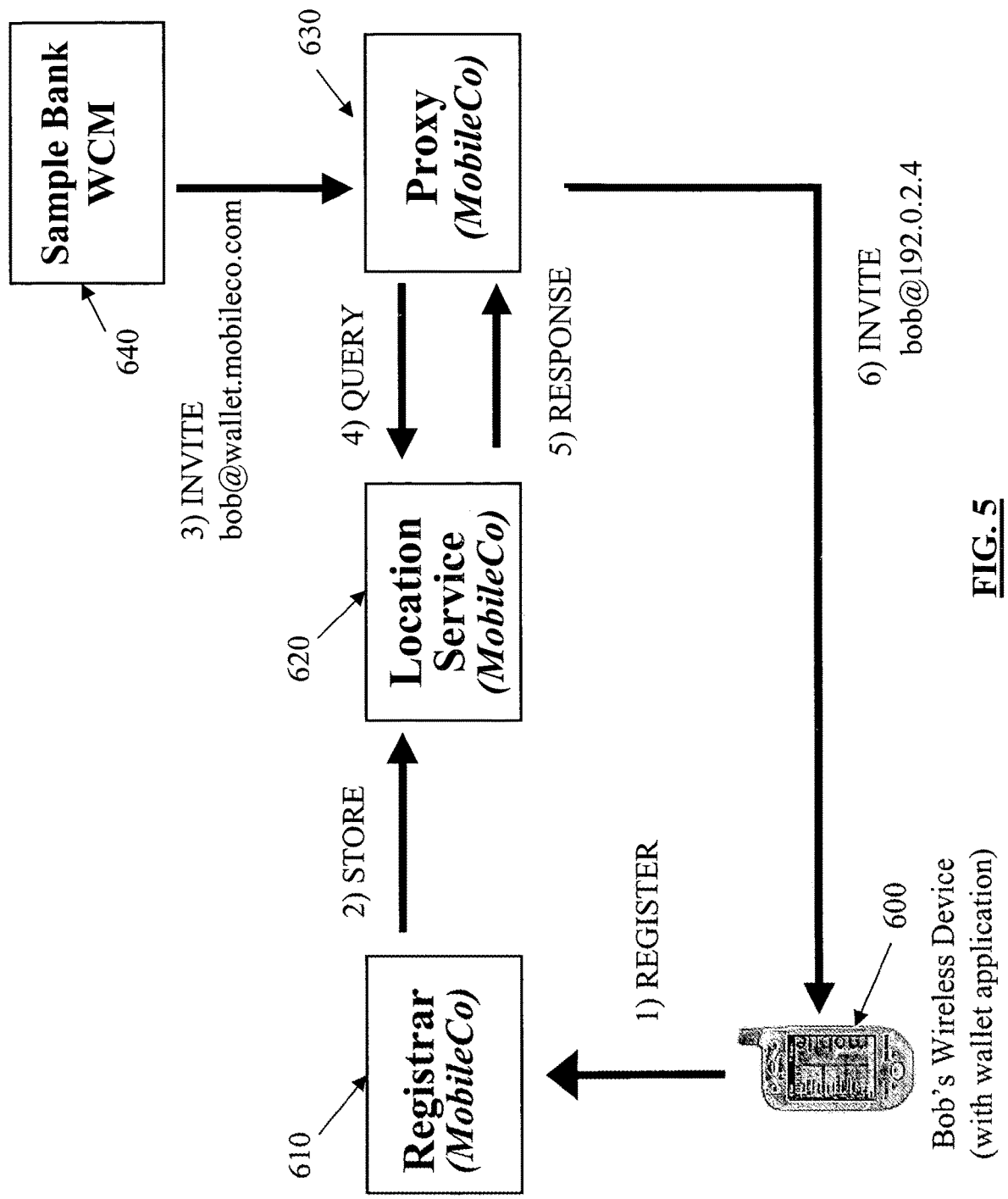
FIG. 5 is a block diagram illustrating the steps in the SIP registration process of a wireless device according to a preferred embodiment of the present invention.

An illustration of the overall registration process is given in FIG. 5. Note that the registrar 610 and proxy server 630 are logical roles that can be played by a single device in a network; for purposes of clarity the two are separated in this illustration. Also note that UAs may send requests through a proxy server in order to reach a registrar if the two are separate elements.

SIP does not mandate a particular mechanism for implementing the location service 620. The only requirement is that a registrar for some domain MUST be able to read and write data to the location service 620, and proxy or a redirect server 630 for that domain MUST be capable of reading that same data. Registrar 610 MAY be co-located with a particular SIP proxy server 630 for the same domain. As noted earlier, in some cases the SIP-enabled wireless device may register itself, thus enabling communication with all SIP-based applications operating on the device.

REGISTER requests add, remove, and query bindings. A REGISTER request can add a new binding between an address-of-record and one or more contact addresses. A client can also remove previous bindings or query to determine which bindings are currently in place for an address-of-record. The SIP compliant wallet application running on the wireless device is capable of handling such REGISTER requests. If a SIP-based wallet application has a unique URI associated with it, and the application is subsequently deleted by the user from the device, the application will remove its own binding as discussed above prior to the deletion.

Presence is a vital aspect of SIP technology. Presence is the notion that the current state of an entity, particularly its communications state, can be exposed and represented in a standardized, sharable way. Entities so represented need not be human or singular. For example a device status, user status, or application status might be captured as a Presence Status (for example "Device Status=Off-Hook", "User Status=Online", or "Application Status=Not Loaded"). Starting with a simple definition of "Online/Offline" status, Presence Status has been extended to include other context information around the status such as disposition (out-to-lunch, away-from the-computer) and activity status (on the phone, idle, etc.).

SIP presence and availability build on the SIP event notification mechanism (RFC 3265) and on the registrar and other servers. Scripts can be set up at the server to route calls based on inspection of the INVITE message. A presence server uses SIP SUBSCRIBE/NOTIFY with a presence event package to gather a User Agent's presence status and send responses to a watcher interested in the presence status of a specific entity.

The next example makes use of the SUBSCRIBE method from RFC 3265 that can be used by a user agent to establish a subscription for the purpose of receiving notifications (via the NOTIFY method) about a particular event. Suppose that in the preceding example, the Sample Bank WCM was informed that Bob's device was off-line. The Sample Bank WCM can then issue a SUBSCRIBE message, indicating that it wants to be informed when Bob is available.

This request is forwarded through the two proxies in our example to a Presence Server. In this example, we assume that the Presence Server logic is co-located with the location service. The Presence Server authorizes subscription by returning an OK message, which is passed back to the WCM. The Presence Server then immediately sends a NOTIFY message with Bob's current status of not signed in, which the Sample Bank WCM acknowledges.

Continuing with the example, at some point in the future, Bob's wireless device signs on by sending a REGISTER message to the proxy in its domain. The proxy updates the database in the location service to reflect registration. The update is confirmed to the proxy, which confirms the registration back to Bob's wireless device. With Bob's new status recorded in the location service, the Presence Service could send a NOTIFY message containing Bob's new status to the Sample Bank WCM. The Sample Bank WCM acknowledges receipt of the notification and can in turn re-try to initiate communication with the wireless application on Bob's wireless device.

The present invention also contemplates a SUBSCRIBE functionality that is compliant with RFC 3265 as well as support for the SUBSCRIBE functionality in a Presence Server to NOTIFY the WCM of a change in status of a wireless device with a wallet application. The SUBSCRIBE functionality is an important feature of the invention since wireless devices may not always be connected to a network and be reachable. This feature allows the WCM to be notified when a wallet application on an end-user device can be re-contacted in order to initiate a peer-to-peer connection for transferring confidential information.

Another unique aspect of the present invention is the use of an Application Status in conjunction with a Presence Service. Application Status could be used for, among other things, to inform a "caller" that the receiving party does not have an application to support the incoming request or media type. This Presence Information can be used to "push" an application to the receiving party over-the-air so the "caller" can establish communication with the recipient in the future. Continuing with the example above, if the Application Status was returned to the Presence Service as "Not Loaded", the mobile operator's Presence Service could initiate a request to a separate server that sends a message to the wireless end-user's handset, asking him if he would like to download the wallet application in order to receive credentials from different issuers such as the one that tried to communicate with his wireless device. If the user agrees, the application can be provisioned on the user's device over-the-air. Once installed, the application can inform the Presence Service of its new status to allow it to inform the Sample Bank WCM that it is ready to communicate. The use of an Application Status in conjunction with a Presence Service and an over-the-air software provisioning system for wireless and wireline devices are important aspects of the present invention. The WCM, the wallet application, and other SIP systems described herein may also support presence as a capability using various SIP extensions such as the SIP Instant Messaging and Presence Leveraging Extensions (SIMPLE).

In order to discover a Registrar, the SIP-based wallet application running on the mobile phone is pre-configured with the appropriate registrar address. The mobile operator will have the ability to change the registrar address over-the-air. In cases where there is a SIP application stack installed on the wireless device, the registrar address may be configured in there.

The following discussion covers security mechanisms and procedures which may be used in a preferred embodiment of the system of the present invention. Since the SIP message structure is a straight derivation from the HTTP request/response model, all security mechanisms available for HTTP (RFC 2617) can also be applied to SIP sessions. The use of MIME containers within SIP messages supports the use of email security mechanisms S/MIME (RFC 2633). And of course similar to a https: URI, a corresponding sips: URI will try to build up a secure transport layer tunnel using TLS (RFC 2246). And last but not least IP security (IPsec) (RFC 2315) can be used as a general purpose mechanism to encrypt all IP based communication right on the network layer.

The major security mechanisms suited for the protection of a SIP session are summarized here. Some or all of these security mechanisms can be used to securely deliver or manage credentials on a wireless device. Support for these mechanisms may be accomplished in the WCM or the wallet application or both. Implementations may support other security schemes as well.

One possible mechanism is HTTP Digest Authentication. The Digest authentication scheme is based on a simple challenge-response paradigm. The digest authentication scheme challenges the remote end using a nonce value. SIP digest authentication is based on the digest authentication defined in RFC 2617. Here, a valid response contains a checksum (by default, the MD5 checksum) of the user name, the password, the given nonce value, the HTTP method, and the requested URI. In this way, the password is never sent in the clear.

Another possible security mechanism is Secure MIME (S/MIME). SIP messages carry MIME bodies. MIME itself defines mechanisms for the integrity protection and the encryption of the MIME contents. SIP may utilize S/MIME to enable mechanisms like public key distribution, authentication and integrity protection, or confidentiality of SIP signaling data. S/MIME may be considered as a replacement for PGP used in RFC2543 to provide means for integrity protection and encryption of SIP messages. To be able to protect SIP header fields as well, tunneling of SIP messages in MIME bodies is specified. Generally the proposed SIP tunneling for SIP header protection will create additional overhead. S/MIME requires certificates and private keys to be used, whereas the certificates may be issued by a trusted third party or may be self-generated. The latter case may not provide real user authentication but may be used to provide a limited form of message integrity protection.

The current document RFC 3261 recommends S/MIME to be used for UAs. Moreover, if S/MIME is used to tunnel messages (described below) it is recommend using a TCP connection because of the larger messages. This is to avoid problems that may arise by the fragmentation of UDP packets. The following services can be realized:

Authentication and Integrity Protection of Signaling Data
Confidentiality of Signaling Data Yet another security mechanism which may be used in accordance with the present invention is based upon SIPS URI (TLS). RFC3261 mandates the use of TLS for proxies, redirect servers, and registrars to protect SIP signaling. Using TLS for UAs is recommended. TLS is able to protect SIP signaling messages against loss of integrity, confidentiality and against replay. It provides integrated key-management with mutual authentication and secure key distribution. TLS is applicable hop-by-hop between UAs/proxies or between proxies. The drawback of TLS in SIP scenarios is the requirement of a reliable transport stack (TCP-based SIP signaling). TLS cannot be applied to UDP-based SIP signaling.

Another security mechanism which may be used in connection with the present invention is IP Security (IPsec). IPsec may also be used to provide security for SIP signaling at the network layer. This type of security is most suited to securing SIP hosts in a SIP VPN scenario (SIP user agents/proxies) or between administrative SIP domains. IPsec works for all UDP, TCP and SCTP based SIP signaling. IPsec may be used to provide authentication, integrity and confidentiality for the transmitted data and supports end-to-end as well as hop-by-hop scenarios. At this time there is no default cipher suite for IPsec defined in SIP. Note: RFC 3261 does not describe a framework for the use of IPsec. Especially, no information is given as to how the key management is to be realized, or which IPsec header and mode is to be used.

In order to provide security implementation (see RFC 3261), various requirements exist. It is intended that the proxy servers and registrars will support TLS, and both mutual and one-way authentication. It is also intended that the WCM and the wallet application will be capable initiating TLS. Proxy servers, redirect servers, and registrars may use a site certificate whose subject corresponds to their canonical hostname. UAs may have certificates of their own for mutual authentication with TLS. All SIP elements that support TLS should have a mechanism for validating certificates received during TLS negotiation; this entails possession of one or more root certificates issued by certificate authorities (preferably well-known distributors of site certificates comparable to those that issue root certificates for web browsers). Further, all SIP elements that support TLS should support the SIPS URI scheme.

Proxy servers, redirect servers, registrars, and UAs may implement IPSec or other lower-layer security protocols. When a UA attempts to contact a proxy server, redirect server, or registrar, the UAC should initiate a TLS connection over which it will send SIP messages. In some architectures, UASs may receive requests over such TLS connections as well.

Proxy servers, redirect servers, registrars, and UAs should implement Digest Authorization, encompassing all of the aspects required in Section 22 of RFC 3261. Proxy servers, redirect servers, and registrars should be configured with at least one Digest realm, and at least one "realm" string supported by a given server should correspond to the server's hostname or domain name.

The WCM and the wallet application should support the signing and encrypting of MIME bodies, and transference of credentials with S/MIME as described in Section 23 of RFC 3261. If a UA holds one or more root certificates of certificate authorities in order to validate certificates for TLS or IPSec, it should be capable of reusing these to verify S/MIME certificates, as appropriate. A UA may hold root certificates specifically for validating S/MIME certificates.

Note that is it anticipated that future security extensions may upgrade the normative strength associated with S/MIME as S/MIME implementations appear and the problem space becomes better understood.

SIP supports the encryption of both message bodies and message headers. The encryption of message bodies makes it more difficult for an eavesdropper to listen in. Also, an uninvited third party, knowing all the Session Description Protocol (SDP) information could guess the real-time transport protocol synchronization source (RTP SSRC) number and send unwanted media to either party, practicing so called "media spamming." Encryption of headers can hide the parties involved in the session. In addition to that, actual session stream can be encrypted as negotiated by SIP.

Depending on the situation, SIP messages between the WCM and the wallet application on the wireless device can carry any supported content types in its payload (e.g. WML, HTML, XHTML, gif, text and others). SIP payload content could include encryption keys, encryption algorithms, forms, user authentication information (e.g. usernames, passwords, PINs, and answers to secret questions), software extensions the issuer wants to register with the wallet application, software updates, electronic credentials, updates to existing credentials, graphics that are part of the credentials, and other such information.

Java applets can be transported as SIP payload, and Java applets running in a mobile phone can use SIP based services in communications. A simple use case would be distributing the wallet application, checking availability for operator support (if downloaded elsewhere), setting up the application, and communicating with credential issuers using SIP. The credentials in turn can be transported using SIP.

Wireless Credential Manager (WCM)

Various details of the WCM 110 of the present invention, in a preferred embodiment thereof, are now presented. The Wireless Credential Manager (WCM) 110 is a carrier-grade platform for real-time electronic credential issuance, management, and authentication. It is ideal for financial institutions, government agencies, and other organizations who wish to securely deliver electronic credentials to a wireless device with an associated E.164 phone number, URI, or other type of Internet-routable address.

Application Engine

The application engine provides access to service logic through a CGI, Servlet, or proprietary interface. The service logic is free to access business logic and databases using, for example, Corba, SOAP, JDBC, or Socket.

The application engine is the core of WCM 110. The application engine is responsible for receiving files and commands from the issuer's user management system, interpreting the information, and acting on it through a variety of functions it has in its library and under its control. For example, the application engine can use the ENUM engine (integrated in the WCM 110) to query DNS servers in order to map a E.164 phone number to network addresses. An integrated DNS resolver can be used for ENUM queries and also to resolve SIP URIs to network addresses.

The application engine can also function as a user agent client (UAC) and a user agent server (UAS) for SIP communication. The UAC initiates requests while the UAS generates responses. As such, the application engine will be capable of operating as both a UAC and a UAS during a session with end-user wallet applications. Further more, the application engine is capable of handling multiple simultaneous sessions with different SIP devices.

The application engine is capable of maintaining state on calls that it initiates or participates in. A minimum call state set includes the local and remote tags, Call-ID, local and remote CSeq header fields, along with the route set and any state information necessary for the media. This information is used to store the dialog information and for reliability. The remote CSeq storage is necessary to distinguish between a re-INVITE and a re-transmission. The application engine UA preferably supports UDP, TCP, TLS, and SCTP transport. The application engine UA also preferably supports SDP (IETF 2327) for media description. Other types of media description protocols can be used in the body and interpreted by the application engine, but SDP support is required per RFC 3261.

The application engine also interfaces with a SIP proxy that is integrated in WCM 110. The SIP proxy may run on the same physical server or separate servers, for load balancing or other reasons. Details of other key components of the WCM under the control of the application engine are outlined below.

ENUM Engine

The ENUM engine in WCM 110 is a standards compliant resolution tool developed based on RFC 3761. ENUM (RFC 3761) is the Internet Engineering Task Force (IETF) standard that defines a mechanism for using the Domain Name Service (DNS) as a tool to "discover" services associated with a telephone number (E.164 number).

WCM 110 automatically processes NAPTR record(s) in DNS wire format into application service, order, preference, and URI fields. WCM 110 correctly parses the NAPTR service fields and dynamically interprets POSIX Extended Regular Expressions. Additionally, WCM 110 provides the DNS message processing and network transport mechanisms required to translate a telephone number into a set of ENUM records. Support is provided for the following feature set:

1. Standard ENUM query—returns all of the ENUM records associated with a given telephone number. The WCM's Application Engine is capable of filtering the results based on application protocol and/or service type.

2. Server-side Extensions—returns subset of the ENUM records associated with a given telephone number based on optional query directives that enable the ENUM service to filter results based on both application protocol and/or service type.

3. POSIX Extended Regular Expressions—matches and substitutes any valid POSIX Extended Regular Expression within the NAPTR record regular expression field.

4. Public/Private Dialing Plans—supports both public and private dialing plans by selectively querying alternate root ENUM domains.

5. Multiple Attempts—retries a query N times.

6. Recursion—provides DNS recursion from WCM 110, eliminating the need for a recursive local DNS server when querying multi-tiered DNS systems.

7. Security—supports Secret Key Transaction Authentication (TSIG).

8. Thread Safe—supports a multi-threaded environment

9. UDP/TCP transport—supports both UDP and TCP connections to allow for efficient retrieval of large sets of DNS records.

10. Larger UDP payload—support for large UDP response payload beyond the default 512 bytes. [RFC 2671]

11. Network Latency Based Server Selection—determines the best performing ENUM/DNS server based on query response time.

12. Caching—caches records for a period of time specified by the Time-To-Live (TTL) field defined for the resource record.

Preferably, WCM 110 provides DNS resolution and update capabilities for the following resource records: A, NS, SRV, NAPTR, SOA, PTR, MX, CNAME, TXT, and HINFO. The following pseudo resource records are also supported: TSIG, OPT, SOA.

RFC 3761 highly recommends the use of DNS security. The WCM ENUM infrastructure supports DNSSEC to address a variety of security issues including impersonation, data tampering and unauthorized access/farming. The use of TSIG enables transaction level authentication using shared secrets. TSIG is lightweight and may be used for authentication on DNS queries. Support for TSIG functionality is built into WCM 110.

Use of the TSIG DNS resource record is specified in RFC 2845. TSIG was developed as a lightweight alternative to using public key encryption technology for DNS authentication. The main function of using TSIG is to establish a trust relationship between two entities using a shared secret key. The TSIG resource record is dynamically generated per ENUM transaction and is contained in the additional data section of the DNS message. TSIG records are never cached. All of the DNSSEC functionality required to implement TSIG with any ENUM system is implemented in WCM 110. The process of utilizing TSIG in an ENUM transaction is through the use of a SIP proxy.

Integrated into WCM 110 is a SIP proxy that interfaces directly with the application engine, which is responsible for setting up or terminating sessions with end-user wallet applications. The SIP proxy sits in the middle of a SIP message exchange, receiving messages and forwarding them. There may be multiple proxies in a signaling path. The proxy server is not really "in the call." The WCM SIP proxy facilitates the two end-points locating and contacting each other. The SIP proxy can be configured to remain in the signaling path or drop out of the signaling path as soon as communication between two end-points is established. The SIP proxy is also able to use the DNS resolver within WCM 110.

Support for Call Processing Language is supported within WCM 110. CPL is a standard scripting language defined by the IETF that described how to process inbound and outbound requests. The CPL language is protocol-neutral and has a language binding for SIP. It is designed to be a simple and safe mechanism suitable for executing user-defined scripts. The SIP proxy is usually separated from CPL interpreter and application logic. Since CPL is a standard, any application can generate CPL and a compliant proxy should understand it WCM 110 preferably provides an easy-to-use GUI to manage server clusters and servlet applications. It supports SNMPv2c for ease of integration with external Operations Support Systems (OSS). WCM 110 provides a comprehensive logging service that enables credential issuers to quickly collect fault and performance data.

The WCM logging service also permits issuers to create, encode, and export communication records (CDRs) with end-user wallet applications for export into user management systems and visibility by issuer customer care departments. WCM 110 supports flexible configuration of CDR extensions, file transfer options, and file naming.

WCM 110 preferably supports the secure transfer of individual encryption keys (obtained from end-user wallet applications during communication) to other user management databases or LDAP servers within the issuer environment. These encryption keys can be called upon by WCM 110 for future communication with a particular end-user's wallet application.

WCM 110 supports authentication, authorization, and accounting of SIP sessions in accordance to RFC 3702. WCM Service Creation Environment (SCE) is comprised of a software developer kit (SDK) coupled with the standards-based, JSR 116-compliant SIP Servlet API. The SIP Servlet API is the interface between the applications and the SIP container, which supports the SIP server roles needed and interfaces with the SIP stack When an incoming SIP message arrives in the SIP container, it uses so-called Servlet Mapping Rules to decide which application(s) need to be invoked. These Servlet Mapping Rules are defined in XML and describe criteria to be met by the SIP message. The applications interact with the SIP server functionality via the SIP Servlet API.

The WCM SDK provides a preloaded set of SIP application building blocks (ABB) that allow issuers/operators to configure WCM 110 to interact with the wallet application for credential management including: i) issuance, cancellation, status change and update; (ii) real-time user authentication during transaction authorization; and (iii) remote wallet The WCM SDK also includes non-SIP application building block connectors (ABB-Cs) that dramatically reduce the effort and knowledge needed to build SIP-based applications within the WCM 110.

In addition to the security protocols supported above, the WCM 110 preferably supports MD5 digest authentication to prevent passwords from being sent across the network in clear text.

WCM 110 supports a number of flexible APIs that allows for WCM 110 to communicate with different issuer systems in real-time or batch mode. The APIs support a number of standard command sets recognized by the application engine. Standard APIs and command sets included with the WCM 110 are for:

Interface to credit card management systems
Interface to debit card management systems
Interface to ATM card management system
Interface to retailer loyalty card
Interface to retailer membership systems
Interface to corporate security access control systems APIs and application logic can be customized using the WCM service creation environment (SCE) discussed earlier. API frameworks supported within the WCM utilize: SOAP/XML, .NET and CORBA. WCM 110 also supports peer-to-peer data integration interfaces to middleware designed for assured delivery, high-volume and secure data exchange. Such middleware interfaces supported include, for example, Sterling Commerce's Connect:Direct. Such an interface to Connect:Direct could be used for receiving the Personalization File from an issuer's card management system and sending systems logs, CDRs, and other confidential information to other issuer systems.

To ensure that a message sent to the system is from a valid source and has not been tampered with, WCM 110 supports message authentication (using the ANSI X9.9 and X9.19 standards for authentication of financial transactions) and Secure Sockets Layer (SSL) encryption A discussion of the architecture of WCM 110 in a preferred embodiment now follows. WCM 110 is designed with a customized, load-balanced, distributed architecture without single points of failure. Incoming/Outbound SIP-based service requests are load balanced across service hosts by service directors. WCM 110 operates in clustered configurations using off-the-shelf server platforms based on Intel x86 and SUN SPARC architectures. It supports carrier grade Linux (CGL), Sun Solaris, and Microsoft Windows 2000 Advanced Server Operating systems. WCM 110 can also be run on AlphaServer systems running Tru64 Unix and Himalaya High End series running NSK Technically, SIP will function across both IPv4 and IPv6 networks. As such, WCM 110 is preferably compatible with IPv4 and IPv6 networks. WCM 110 also supports the following transport protocols: UDP/TCP/TLS/SCTP. WCM 110 also supports multiple domain names. All aspects of WCM 110 are compliant with IETF RFC 3261, 3GPP, and 3GPP2 standards. Embedded in WCM 110 is a compliant SIP application stack that the different components of WCM 110 are built upon. Cryptographic functions supported include:

PIN, MAC and Data encryption keys
Multiple index for all cryptographic keys
Single, double or triple length of all encryption
Single or Triple DES encryption/decryption
Dynamic key exchange
Key thresholds and threshold limits In a preferred embodiment of the present invention a SIP-capable firewall is also included. Some issuers may choose to use the built in firewall capability, while others may have a stand-alone SIP-capable firewall they are using. There are several possible approaches to SIP-capable firewalls. One of the difficulties is that, unlike for, say, HTTP, connections are originated both by hosts inside and outside the firewall. A likely arrangement is that the SIP proxy sits "on" the firewall and relays SIP requests between the Internet and the intranet. This proxy would also open up the necessary ports in the firewall to let data to flow through, for example, using Socks V5.

As an alternative, if a firewall or network address translator (NAT) allows outgoing TCP connections, the inside client can open up a TCP connection to an outside proxy. All outgoing and incoming calls would then be handled by that TCP connection. (The client would still have to use SOCKS or a similar mechanism to convince the firewall to let packets through.)

The following discussion provides information about the Mobile Operator Architecture according to a preferred embodiment of the present invention. The ENUM Provisioner is an application for mobile operators (or other entities) to update ENUM address information in any compatible DNS server that supports dynamic DNS update. The ENUM Provisioner application can be interfaced with a mobile operator's user management system or LDAP server to accept qualified updates to the ENUM database.

The ENUM Update interface supports the following functionality:

Add Records—add 1 or more resource records.

Delete Records—delete 1 or more resource records.

Multiple Operations—perform multiple add and/or delete operations in a single request.

Security—Optional TSIG authentication.

Thread Safe—can be used in a multi-threaded environment.

The ENUM Provisioner interface uses Dynamic DNS (DDNS) protocol [RFC2163] to request updates to an ENUM/DNS service. Update requests typically use TCP connections to communicate with the ENUM service.

The ENUM Provisioner can be used to add NAPTR records to the ENUM database for user's that have enrolled in the mobile wallet service and activated their wallet on the phone. The Provisioner can also be used to add NAPTR records in the ENUM database corresponding to other services associated with E.164 phone number (e.g. voice, instant messenger, etc.). The mobile operator's existing user management system can enforce rules for validating users, activating services, billing, and other functions. Other components of a Mobile Operator's SIP Infrastructure may also include Proxy Servers Registration Server Location Server Presence Server Wallet Software Download or Over-the-Air Provisioning Server (Allows wireless device to download the wallet application OTA LDAP server/user management system Wallet Application The following discussion provides additional details concerning the wallet application of the present invention in a preferred embodiment thereof. The wallet application is a platform capable of securely holding a myriad of different electronic credentials and making them available in a controlled way through specific functions. When loaded on a wireless device, an icon for the wallet application is designed to appear on the main navigation screen. The icon can be used to launch the application.

The open-architecture of the wallet platform allows credential issuers to deploy their own commerce-specific applications called "extensions". Extensions literally "extend" the capability of the wallet platform by enabling a new set of features defined by the credential issuer. Different credentials serve many unique purposes and are not all used in the same way.

For example, when a subway contactless stored value card is waved in front of a reader at the turnstile, the electronic balance is automatically debited from the onboard chip. The rules that govern the functioning of that stored value program and the card's interaction with an external RF reader, are all programmed into the onboard chip.

In the case of a magnetic-stripe credit card, the card is swiped in a POS terminal and magnetically encoded information on tracks 1 and 2 are read and captured by the reader. The data in turn is used to authorize the transaction with the card issuer.

A final example is a grocery store loyalty card with a bar coded account number. At the POS, a cashier scans the bar code and the decoded account number is validated against a loyalty database and then used to apply discounts against the patron's purchase.

These are just a few examples of the types of credentials that can be issued to and stored within the wallet application. Implementing electronic versions of these credentials in the wallet application creates different operating and processing requirements for each credential. Consider the requirements associated with implementing the subway stored value credential through the wallet platform. The logic required to operate the subway stored value credential, the unique message format for communication between the wireless device and a RF reader at the turnstile, unique display messages, an over-the-air reload tool, and other features associated with the stored value credential that a user might see on the wireless device—all need to be programmed into the wallet application. These types of requirements are embodied in mini-programs that operate within the wallet application called "extensions" since they "extend" the capability of the wallet application in order to handle new features and capabilities that are specific to an issuer's credential. These extensions allow credentials to be used in a controlled way through specific issuer-defined functions.

A software development kit (SDK) and API can be made available to credential issuers and other organizations that want to develop extensions for the wallet platform. Extensions can utilize all the features that the wallet platform makes available to it, including such features as access to the device's secure storage, standard display parameters, standard messaging, data format conversions, SIP communication capability, access to device and operating system functions, and other attributes.

A wireless device loaded with the wallet application may come with some pre-loaded extensions. Extensions may reside on the device memory, in an embedded smart card, in a removable storage media, or on a remote server, securely accessible through the wallet application protocols. An extension may communicate with the user, may exchange information with remote servers or it may use other elements of the device hardware or software.

Credit card associations/networks may develop a software extension for the wallet application that governs the interaction between the RFID chip embedded in a wireless device and a reader terminal. A modified version of the "MasterCard Proximity Chip Payment—Online Profile" and the "Visa Specification for Financial Messaging for Contactless Payment" could be embodied in a software extension for the wallet application. The use of such an extension for facilitating credit card transactions using the wallet application is an important part of the present invention. The provisioning of such an extension to a wireless device using a valid E.164 number of URI is also possible. The same extensions could be used by multiple issuing banks.

The actual account information or personal information that is transmitted by the issuer to the wallet application is referred to as the "credential". The actual credential record that is transmitted to the wallet application by the issuer may contain some of the following information:

Name of credential (e.g. United Airlines Mileage Plus Card)
Name and logo of credential issuer
Name(s) and logo(s) of association or network(s) (e.g. Visa, MasterCard)
Account specific information
Account number
Expiration date of credential
Special security information related to credential (e.g. CVV/CVC, CVV2/CVC2, etc.)
"Reader Key" for credential (discussed later in the document)
Identifier for extension to which the credential is associated (When a credential is selected by a user, this identifier is used to launch an extension in the wallet application)
Primary and secondary credential categories Wallet Shell The wallet shell is the core of the wallet platform. The wallet application handles processing of incoming credentials and extensions, the execution of extensions within the wallet framework, controlling access to secure storage, enabling communication with an embedded RF interface or smart card, and facilitating the use of operating system and hardware features such as display and sound.

All user settings are also controlled by the wallet shell. Features that allow users to delete extensions/credentials, change/reset PINs, and change certain preferences are controlled through the shell.

The wallet shell also provides extensions with a standard menu-driven user interface from which to operate. The wallet shell also enables secure communication with external servers via SIP and TCP/IP. The wallet shell also has an embedded ENUM resolver for being able to do DNS queries on valid E.164 phone numbers. This embedded ENUM client is useful for facilitating secure person-to-person, person-to-company, or company-to-company transfers of digital money over-the-air using a wallet extension designed for this purpose. Such an extension could use the ENUM resolver built into the wallet shell to locate the URI for a recipient's electronic wallet to where funds are being transferred. The client ENUM resolver will be designed to submit DNS queries on the mobile operator's network; the IP addresses of the DNS server(s) could be pre-programmed in the wallet shell or could be discovered dynamically. A mechanism by which a user could transfer funds to another user by using a valid E.164 number, and establishing a peer-to-peer SIP connection is available through the present invention.

Wallet Application

Mobile transactions can be performed in three environments: local, remote, and personal. Each environment has its own mobile commerce services and characteristics that may require specific technologies. A wallet application on a wireless device that enables transactions in all three environments will provide the greatest utility to users. Electronic credentials issued to a user and stored in the wallet application can be used in all three environments.

Local Environment

In a local—or proximity—environment, the consumer is in the vicinity of a reader device that is connected to a point-of-sale (POS) terminal or some other type of computer system. Most day-to-day proximity transactions today use a card or token with information encoded in a variety of media types including magnetic stripe, bar code, chip, and embossed or printed data. A mobile device with a wallet application can serve as a replacement for single-purpose cards and tokens. During a proximity transaction, the wireless device can transmit payment, identification, or other confidential information to a reader using the short-range transmission capability of the wireless device (e.g. RF). For example, a wireless device loaded with a wallet application, that also has an integrated RFID chip can simply be waved slowly in close proximity to a reader device to facilitate a transaction. Similarly, a wireless device that uses infra-red to transact with a reader requires that the user point the infra-red beam to a reader device.

Personal Environment

In a personal environment, mobile transactions are conducted on the user interface of another device and augmented by security, connectivity, information, and other functionality provided by the user's wireless device. For example, during a transaction—a point-of-sale device may establish secure connectivity with the user's wireless device and poll it for a list of user-defined payment methods that the user can select from using the user-interface of the POS system. The implication is that the user's wireless device can act as a repository of information that can be securely accessed by another device during a transaction.

The wallet application will support peer-to-peer connectivity to a device in close proximity. Connectivity between the wireless device and the reader/POS terminal could be made via 802.11a/b/g, Bluetooth, or other RF protocols. Connectivity could initially be established by exchanging encryption keys via RFID that allow the devices to establish connectivity via an alternate channel securely so no other device can listen in to the communication. Keys could also initially be exchanged via infra-red technology.

One advantage of establishing peer-to-peer connectivity with a POS terminal is that it allows for a bi-directional exchange of data where a user may be prompted on his wireless device for various types of preferences, questions, or other data input in sequence. Transactions where there is a stream of data that goes in both directions can benefit from this type of peer-to-peer session using any number of protocols.

Another advantage of establishing peer-to-peer connectivity with a POS terminal for example is that the user can use the terminal's display and input mechanism instead of on the wireless device to interact with his electronic wallet. The larger display and input mechanism of the external device may make it easier for the user to make selections. In personal environment transactions, credential data is transmitted from the wireless device to a merchant/organization using the short-range communication protocols mentioned.

The personal environment capability of the wallet application could also be used to issue credentials to the device while the user is present in an issuer's site. For example, if a user is present in a bank branch and is requesting a digital credential for his mobile wallet, the credential could be issued in the manner described above. For example, if a user wants a digital debit card, the user may be prompted by a bank employee to bring his wireless device in proximity of an RFID reader, which will send a command to the wallet application signifying that it is going to receive a new credential via Bluetooth. The bank system and the wireless device may exchange encryption keys via RF in order to establish a secure Bluetooth connection with the bank network (the process for establishing Bluetooth connectivity is similar to what is outlined later in the Wallet Transfer section).

Remote Environment

In a remote—or online—environment, transactions are conducted with a remote server over a wireless network. For example, a remote transaction using a wireless device can be conducted over the Internet with a browser on the wireless device. In such transactions, the wireless device's user interface (UI) is of paramount importance. The UI must relay all relevant information to maintain the user's trust and ensure usability of the services. Remote transactions range from online purchases and banking to more impulsive activities like downloading digital content.

Wallet Main Menu

The main menu of the wallet application contains 6 primary modules in a preferred embodiment:

Credential Selector
Profile Selector
Profile Creator
Digital Receipts
Log Viewer
Wallet Settings
Application Background A wireless device running a wallet application as described herein will serve as a replacement for single-purpose cards and tokens that typically fill people's wallets and purses. The wallet application is designed to facilitate transactions in a proximity, personal, and remote environment using the device's short-range or long-range transmission capability.

The wallet application is specifically designed to store several types of electronic credentials. Electronic credentials are organized in the wallet application using a hierarchical categorization scheme that makes finding credentials visually easy for the end-user. The top level of the hierarchy includes primary categories. The primary categories are broad descriptors of the different types of information that the wallet application can store. Under the primary categories are sub-categories, which provide additional specificity for the types of credentials that can be found there. Sub-categories may not always be present. Credentials can be mapped directly under a primary category or to a sub-category. Sub-categories are particularly useful when a large number of credentials are present under a primary category and need to be organized based on some further classification.

The wallet application has several primary credential categories that are pre-programmed in the wallet application. These pre-programmed primary headings are listed below with examples of the types of credentials that one might find in each:

Payment Methods—Credit, debit/ATM, stored value, electronic check, and RFID payment methods may be registered with the wallet application Loyalty Cards—Grocery store discount cards, airline frequent flier programs, hotel loyalty programs, and other loyalty programs are included in this category Membership Cards—Personal memberships to video rental stores, libraries, and other organizations Access Cards—Electronic keys for offices, apartments, parking garages, cars, and other secure facilities E-Tickets & Passes—Electronic tickets for sporting events, concerts, shows, transportation, and other purposes may be issued to the wallet application.

Coupons & Certificates—Electronic coupons and certificates that can be used at specific locations, that typically have a fixed value, and expiration date for usage Identification Cards—Driver's license, government identification, school or university ID, and other pieces of identification Personal Information—Name, billing address, shipping address, home phone number, business phone number, fax number, social security number, and date of birth. Electronic business cards could also be stored.

The presence of all the above primary categories to classify different credentials within the wallet application is possible according to the teachings of the present invention. The use of sub-categories under the primary categories is also possible as is the presence of credentials directly under a primary category or under a secondary category.

Sample sub-categories are represented in the example credential tree below. The credential tree may be used to visually present information in the wallet application.

Payment Methods
Credit
   Sample Bank MasterCard XXX4321
   CapitalOne Visa XXX1234
   Home Depot Card XXX9865
   Gap Card XXX5432
   ExxonMobil Card XXX4564
Debit/ATM
   Sample Bank XXX5432
Stored Value
   Starbucks S-Value XXX9876
Electronic Check
   Sample Bank Checking XXX7654
RF Tokens
   Speedpass XXX3456

An issuer of credentials may specify the primary category and secondary category (if applicable) that a particular credential should be linked to in the wallet application's credential tree; this information can be specified in the credential issuance record that is sent by the issuer to the wallet application on the wireless device. Standardized codes or category names may be used in the credential record that allows the wallet application to link newly received credentials to pre-existing categories contained in the credential tree.

If a credential is received by the wallet application containing a primary and/or secondary category that does not yet exist in the credential tree, the wallet application will add the primary and/or secondary category automatically before linking the credential to it.

Primary categories in the credential tree can be automatically organized in alphabetic order or based on frequency of usage, with the most used primary categories at the top of the list for easy access. These organization schemes may be user defined options in the wallet application, or may be set a certain way by the application itself. The same organization schemes would also apply to secondary categories and the credentials themselves.

All primary and secondary categories should appear in the credential tree, regardless of whether there are credentials contained within them. Under this embodiment, primary and secondary categories that have credentials contained within them may be visually distinguished in the device display using any number of methods such as bold text, the use of icons, color coding, or some other visual means. Primary and secondary categories that do not have credentials may in turn be represented using different distinguishing features such as muted text (lightened), the use of icons, separate color coding, or other visual means.

Under another embodiment of the wallet application, the user may be allowed to create their own credential tree by naming all primary and secondary categories and linking newly received credentials to the categories. Users may have a repository of recommended category names within the wallet application that they can opt to use. Further, under this embodiment, users will also have the ability to rename categories, delete categories, and move credentials from one category to another.

The credential tree is the primary basis by which credential information is organized in the wallet application. The credential tree represents the entire embodiment of all primary categories, secondary categories, and credentials registered in the wallet application. Certain screens in the wallet application may display the entire credential tree, or only certain components of it as necessary. The credential tree provides a visual hierarchy which is useful for (a) allowing users to make quick selections of specific credentials for use in a transaction (via the "Credential Selector" feature described later), and (b) for managing their credentials and wallet settings in the application.

The following discussion provides further information regarding the interaction between a wireless device and a reader. If the wallet application UI, and the wireless device itself are overly complex and difficult to use, people will not want to give up their traditional wallet or purse filled with a variety of single-purpose cards and tokens. Completing a time-sensitive transaction such as a grocery store POS purchase or a ticket purchase at the subway turnstile requires a wallet application and device that minimizes the key strokes a user has to make, but at the same time provides for a high degree of user control and security over confidential account information.

Several features of this invention serve to minimize the key strokes a user has to make in searching for, selecting, and transmitting a credential to a reader. One such feature of this invention is the use of a credential-specific "reader key". The key is sent with an electronic credential record to a wireless device during the issuance process. The same reader key is programmed in all reader devices employed by an organization. In the case of an RFID reader, the key is transmitted from the reader to the wireless device's RFID chip during a proximity transaction. The receipt of the key by the RFID chip in the wireless device may initiate the automatic launch of the wallet application resident on the device, and the transfer of the key to the application. The key is subsequently received by the wallet application and is used as a search string by the application to locate a specific credential for transmission back to the reader via the device's RF capability.

The "reader key" is especially useful to organizations that are both issuers of electronic credentials and also acceptors of those credentials. An example would be a grocery chain that has a WCM for issuing electronic loyalty cards to mobile devices, and is also setup to accept those credentials via RFID readers installed at POS terminals in its stores. The grocery chain would program the reader key into all its RF readers so that the key is transmitted during a proximity transaction to the RFID chip embedded in a wireless device. During the issuance process of a digital loyalty card, the grocery chain sends the reader key along with the loyalty credential to an end-user's wireless device. The wallet application stores the "reader key" with the electronic credential to which it is linked. When transmitted to the wireless device from the reader, the key is used by the wallet application as a search string for locating the linked credential. If a matching key is found within the wallet application, the corresponding loyalty information will be transmitted to the reader from the wireless device via RF.

Employing a reader key in the manner described allows a reader device to automatically capture specific credential information from a wireless device without the end-user having to scroll through different screens within the wallet application and pressing multiple buttons on his device. The sequence of events outlined above should occur in less than a second, in order to minimize the amount of time a user has to hold his wireless device in proximity to the RF reader.

The key that is injected into the reader may be encrypted prior to injection. As such, an encrypted key could be transmitted from the reader to the wireless device, and decrypted by the wallet application on the wireless device using a decryption key that was previously sent by the credential issuer during issuance or through some other process. The reader key can be any length, be in any format (e.g. plain-text, ASCII, binary, etc.), and employ any type of encryption algorithm. The key may also be included as part of a "handshake" message and/or "challenge" message (associated with challenge/response technology that is frequently used with RFID) transmitted from the reader to the wireless device. They key could also be transmitted before or immediately after a "handshake" and/or "challenge" message.

It should be noted, that readers will be capable of storing and transmitting multiple "reader keys" that can be used to poll wireless devices for different credentials during a single transaction. The wallet application in turn will be capable of receiving and processing multiple incoming reader keys. Keeping with the grocery chain example above, communication between the POS reader and the wireless device might involve sending two separate keys; one key that requests a loyalty card, and a second key that requests valid coupons or certificates stored on the wireless device. As discussed, multiple keys may be used to poll for separate credentials in a wallet application.

The loyalty credential and the coupons can be retrieved automatically (without requiring the user to pre-select these credentials for transmission) since the key for each of these items would be mapped to the credentials in the wallet application. It should be noted that if the wallet application receives two keys from the reader, but only one of the corresponding credentials exists in the wallet, only that credential would be transmitted to the reader.

The reader may transmit multiple keys as part of the same message to the wireless device, or each key could be sent in separate messages sequentially. The same applies for transmission of multiple credentials from the wireless device to the reader. While a large number of keys could in theory be transmitted from the reader to the wireless device, a very large number of keys will likely increase the amount of time it takes to make the initial transmission, for the wallet application to search for multiple credentials, and for the credentials to be transmitted to the reader. The use of a large number of keys may simply require the user to hold the wireless device in front of the reader for a longer period of time while the processing that was described above takes place.

An organization that is issuing multiple types of credentials, may also choose to use the same "reader key" for each credential type it issues. During the issuance process, an issuer can simply send the same reader key with different credentials it is issuing via the WCM. The wallet application in turn will map the same key to multiple credential records stored within. If that particular key is received by a wireless device during a transaction, the wallet application will identify all the credentials linked to it, and will proceed to send them all to the reader as separate consecutive records or one message containing all records.

"Reader keys" also need not be organization-specific. The same key could be embedded in readers used by multiple organizations to poll for the specific credentials. In such cases, the "reader key" may be securely shared amongst organizations to facilitate the injection of the key into reader devices. During a transaction, a credential being transmitted from the wireless device to the reader could be sent along with the same key that was initially transmitted by the reader to the device; this could be done as a way for the reader and related computer systems (e.g. POS equipment) to identify the type of credential (e.g. loyalty card versus coupons).

The credentials transmitted from the wireless device to the reader may be encrypted using the issuer's encryption key (that may have been provided during the issuance process or through other means). The encrypted credentials could in turn be decrypted by the reader itself, within a central host system, or by other systems employed by the acceptor of the credentials.

Certain payment methods such as subway stored value cards may be organization specific and be the only payment method accepted; as such, a subway operator may employ reader keys to facilitate a rapid payment system with wireless devices.

In a preferred embodiment, a successful transmission of credentials from the wireless device to a reader would result in a tone being sounded by the device. A separate, but distinguishable tone may also be used to signal an unsuccessful transmission of credential data from the wireless device to the reader that may require the user to again place the device in front of the reader for a re-transmission attempt of the same credential. The wallet application will use the wireless device's integrated hardware and software capability to generate such tones.

A successful transmission of credentials from the wireless device to a reader may also result in a visual acknowledgement on the device display. The wallet application message will confirm the successful transfer of specific credentials to a reader device; the actual credentials that were transferred will be listed in the message to inform the user of what confidential information was transmitted. The user can close the acknowledgement message by pressing a wallet application designated button such as "OK", or doing nothing while the message times-out and is automatically closed. A set time-out period will be programmed into the application. If the message times-out, the device will return to its normal state.

Data in the wallet application is encrypted and protected with a special wallet PIN code which is set by the wireless device owner during the setup of the application. The PIN is used to authenticate the user to the application. PIN-entry is required to access stored credentials and change any application settings or preferences. PINs can be any length, and be comprised of any combination of upper or lower case letters, numbers, and special characters as provided for by the wireless device itself. While this document references the use of PIN codes throughout, wireless device's with embedded biometric technologies could use a fingerprint in lieu of a PIN code to authenticate a user to the wallet application. The default security setting in the wallet application is that PIN-entry is required before the wallet application can be "opened" and any credentials transmitted to an external device.

A user can at their own discretion, choose to designate certain credentials within the wallet application to be used without requiring entry of the wallet application PIN. Registered credentials that can be designated by the user as not requiring entry of a wallet PIN are those that have a "reader key" associated with them. Credentials with a "reader key" associated with them will be flagged as such in the wallet application to help a user identify them.

A user may be willing to assume a slight risk by designating certain credentials for PIN-less use since the benefits of speed and convenience are important to them. Rapid payment at the subway turnstile is an example of where the benefits of speed and convenience may outweigh the risks associated with designating a stored value credential on a wireless device for PIN-less use, leaving open the possibility that a fraudster could steal the device and use the stored value purse. Each individual will have their own risk tolerance and as such will want the flexibility to designate specific credentials in their wallet as requiring advance PIN-entry and others to function without the prior input of the wallet PIN.

Credentials that are marked by users as not requiring PIN-entry will be automatically selected within the wallet application based on the "reader key" that is received, and transmitted to the reader during a proximity transaction (the process is described above). Successful transmission of credentials to a reader in a PIN-less mode are confirmed by the device sounding a tone and displaying a message on its display as previously described.

The PIN-less option for certain credentials that have a "reader key" associated with them allows users to complete time-sensitive transactions by simply passing their wireless device in front of a reader without any further key entry. As such, a simple "wave" of the device in front of a reader can result in a completed transaction in about a second or less.

The use of "reader keys" by issuers and acceptors is optional. In the event that reader keys are not employed, the user of the wireless device will be required to pre-select all the credentials he wants to transmit to a reader prior to placing his device in proximity of the reader during a transaction. A "Credential Selector" in the wallet application allows for one credential or multiple credentials to be selected from the credential tree (described earlier) for transmission to a reader device. Users can scroll through the credential tree and select credentials by using the visual navigation system of the wallet application and designated buttons on the wireless device for making selections. The credential tree as it appears in the "Credential Selector" screen may provide visual information about the credentials to aid a user in the selection of specific credentials. Individual credential records may display information such as:
Name of credential (e.g. United Airline Mileage Plus Card)
Name and/or logo of credential issuer
Name(s) and/or logo(s) of association or network(s) (e.g. in the case of bank cards)
Account number (e.g. could be full account number, partially masked account number, or fully masked account number)
Indicator showing if the credential has a "reader key" associated with it
Indicator showing if the credential has been flagged for use without the wallet PIN The credential information represented in the "Credential Selector" screen is information that is received from each issuer during the issuance process. A standard record layout for credentials issued via the WCM will allow issuers to customize what information is reflected in the credential tree, and in turn how it is represented in the "credential selector". Once the user completes making his selection(s) in the "Credential Selector", the wallet application is ready to transmit the credential(s) via its RFID interface. When the wireless device is placed in proximity to the reader, the selected credential(s) are automatically transmitted by the RFID chip in the wireless device to the reader.

After confirming a successful transmission involving multiple credentials selected via the Credential Selector tool, the wallet application will ask the user (via a display message) if he wants to create a profile with links to the credentials that were recently used for future use. Creating a profile with the credentials that were used will save the user time during future transactions with the same organization; in the future, the user only has to select the saved profile (in the "Profile Selector") instead of selecting multiple credentials manually prior to a transaction. Profile names can be customized by the user to help with identification during future transactions. The use of profiles is discussed further in the next section. Under one embodiment, only primary and secondary credential categories that contain credentials will appear in the credential tree that appears in the Credential Selector.

The wallet application also has a feature whereby a user can create and store different profiles in advance, instead of after a transaction (as described above). The Profile Creator allows a user to link multiple credentials (stored in the wallet application) to a single profile for use at specific organizations that may be frequented. This way a user only needs to select one profile prior to initiating a transaction, and not multiple credentials via the "Credential Selector" tool described earlier. Once a user has selected a profile, the user can place the wireless device in proximity to a reader, and the RF chip in the device will automatically transmit all credentials linked to that profile.

A profile list within the wallet application will automatically be organized in alphabetic order or based on frequency of usage, with the most used profile at the top of the list for easy access. These organization schemes may be user defined options in the wallet application, or may be set a certain way by the application itself. As example, an individual profile for a grocery chain may contain links to a payment method such as a Visa card, a loyalty card, and electronic coupons. The number of credentials that can be linked to a profile is not limited in any way (other than by storage and other hardware constraints imposed by the device). The wallet application may enforce certain rules for profiles, such as only allowing one payment method to be linked per profile; other rules could include, only allowing one retailer's coupons/certificates to be linked to a single profile, or not allowing any other primary credential type to be linked to a profile that contains an access card. These are only examples of possible rules that may be enforced by the wallet application.

Because of the sensitive nature of information stored in the wallet application, user's want to ensure that they have complete control over the transmission of information to an external reader such as at a retail point-of-sale. This is especially important for wireless devices that have an embedded RFID chip for short-range transmission. While RFID cards automatically exchange information with a reader when held in close proximity, users require a greater sense of control when using an RFID-enabled wireless device that contains multiple pieces of confidential information.

One embodiment of this invention involves the incorporation of a single button embedded on the wireless device that can be used to activate the wallet application and to control the transmission of information to an external device via RFID (or some other short-range communication mechanism). A credential with a "reader key" and the PIN-option turned off could be read from a wireless device in someone's pocket by a fraudster carrying a reader that comes in close proximity to the device. As such, the existence of a button in an RFID-enabled wireless device that controls activation of the wallet application and transmission of credentials via RF could eliminate a similar fraud risk. Under one design, when the "wallet button" is pressed and released, the wallet application launches the wallet application and enables communication via the RFID interface in the device; RF communication might be enabled for a period of 30 seconds during which time the device should be placed in proximity of the reader to allow for transmission of a credential that has a "reader key" and is approved for PIN-less transactions. In the event that the device is not placed in proximity of the reader during the 30 seconds, the application will disable RF communication and the application may shutdown or go into its normal dormant state. (The actual time that the RF communication is enabled by pressing the "wallet button" may be shorter or longer than 30 seconds.)

The "wallet button" may have two functions. In addition to being pressed & released prior to a quick PIN-less transaction as described, the button could also be used as a short-cut for the user to launch the wallet application without using the wireless device's operating system functions used to launch resident applications. To summarize, pressing the "wallet button" and releasing it could enable RF communication for 30 seconds, and also launch the application so the user can interact with it if needed. As such the application is ready to communicate with a reader, and simultaneously prompts the user for his Wallet PIN. If a PIN-less transaction takes place during the 30 second window, the device alerts the user as described earlier through sound/vibration and messaging. Separately, if the user wants to open the wallet application to select credentials or make changes to settings, the user can simply enter his wallet PIN when prompted.

Under this embodiment, the wallet button may also need to be pressed/released in order to effectuate a transaction that was initiated through the Credential Selector or Profile Selector options previously described. In these cases, the appropriate credential or profile is selected, but the user is prompted to press and release the "wallet button" in order to enable RF communication on the device.

In the discussion herein, the "wallet button" is pressed and released in order to open a 30 second window whereby RF communication is enabled. As an alternative, RF communication may only be enabled during the period while the button is pressed down; as such, the user would be required to hold the button down while bringing the device in proximity to the reader in order to effectuate the transfer of his credential from the device to the reader via RF.

Figure 6A:
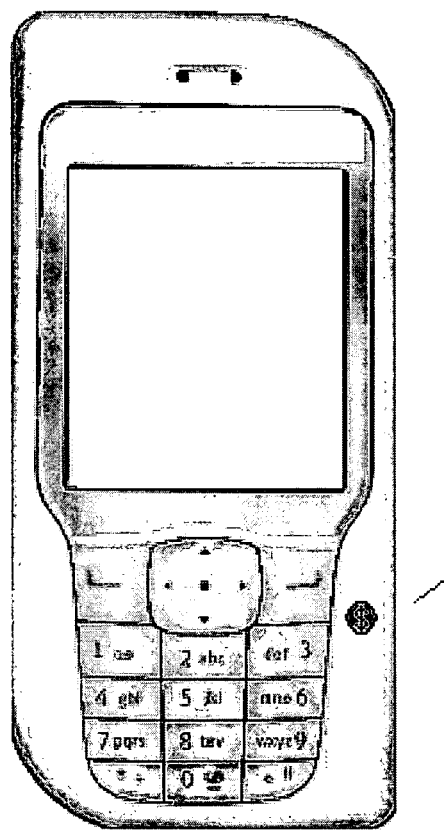
FIGS. 6(a) and 6(b) are graphical representations showing examples of where a "wallet button" might be situated on a wireless device according to a preferred embodiment of the present invention.
Figure 6B:
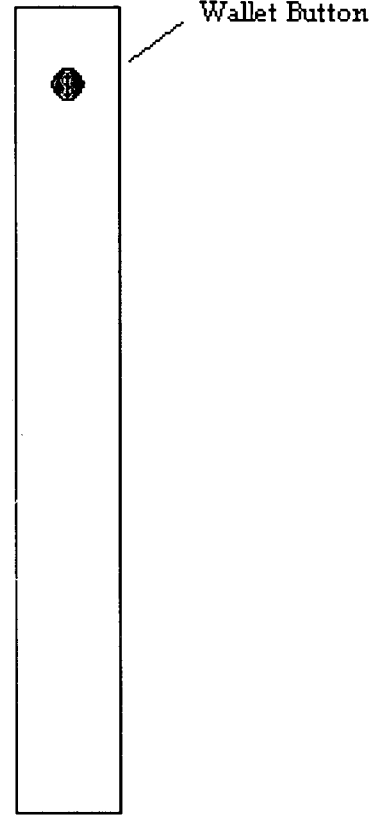

FIGS. 6(a) and 6(b) are graphical representations showing examples of where a "wallet button" might be situated and how it might appear on the device. FIG. 6(a) shows the "wallet button" on the front side of the device, while FIG. 6(b) shows the "wallet button" on the side of the wireless device.

In another embodiment of this invention as illustrated in FIGS. 7(a) and 7(b), three "hot buttons" will appear on the wireless device. The buttons are labeled as follows:
Credit
Debit/ATM
QuickWave According to this embodiment, a user could use the "Wallet Settings" functionality in the wallet application to link his favorite/preferred credit card to button 1, and his favorite/preferred debit/ATM card to button 2. Button 3, labeled above as "QuickWave", allows a user to transmit any PIN-less designated credential that has a "reader key" associated with it to a reader during a transaction.

Pressing buttons 1 or 2 could in addition to transmitting a payment method, also transfer a PIN-less credential that has a "reader key" associated with it—provided that the reader sent the key in its initial communication with the wireless device.

The use of the three "hot buttons" above is intended as a way for a user to quickly transfer certain frequently used credentials to a reader during a transaction. Graphical representations of how the three "hot buttons" may be situated on the wireless device are shown in FIGS. 7(*a*) and 7(*b*).

Pressing buttons 1 or 2, may prompt the user to input a PIN before RF communication can be enabled. As such, a user may be required to input a PIN and click "OK" to enable RF communication for a 30 second window. Alternatively, the user may be required to input his PIN, click "OK" to initiate PIN verification, and upon positive confirmation be prompted to hold down either button 1 or 2 while placing the device in close proximity to a reader. The press/release or hold down scenarios would also apply to button 3.

The wallet application-specific buttons as described above can be any size, shape, or color on the front of the mobile device, on the back of the device, or on any side of the device. (The front of the device is typically the side with the display and keypad.) The button or buttons may also have iconic or text representations either on them or next to them in order to signal their function. In cases where there are multiple buttons associated with the wallet application, the buttons may appear on the device close together or be in different parts of the device.

A discussion of issuer PINs and related security techniques according to various preferred embodiments of the present invention now follows. Certain credential issuers such as financial institutions may require that users validate their identity during a transaction by providing a PIN that was established with or set by the financial institution.

Presently, with various bank card transactions, PINs are verified either online with a bank host computer system, or verified offline against security data onboard the card as in EMV "chip & PIN" transactions. The present invention supports both of these PIN-verification schemes.

In the case of offline PINs, an issuer may issue a credential to a wireless device and send a PIN code for that credential to the user via an alternative channel such as e-mail or regular mail in order to ensure non-repudiation. The PIN may serve as a decryption key for the credential itself and may also be required for every transaction with that credential. Since the credential is designated as using an offline PIN, the wallet application will prompt the user for an issuer PIN each time the credential is selected for use. The entered PIN would in turn be verified against security information that was transmitted during the credential issuance process.

For credentials where an issuer PIN needs to be prompted for on the wireless device for each transaction, the wallet application will only prompt for the issuer PIN when that credential is linked to a "hot button" (as described earlier). As such, the "hot button" functionality can alleviate the need to enter both a "wallet PIN" and an "issuer PIN", as the issuer PIN is sufficient to validate the user's identity. A financial institution may have specified via settings in the credential issuance record that a temporary PIN assigned by the financial institution be changed to a user designated PIN when it is first received. PIN changes for credentials that have issuer PINs will be handled securely through the wallet application.

Other financial institutions may send a PIN to the user via an alternative channel in order to allow the user to decrypt and "activate" the credential, but may not require the PIN for use with every transaction; these financial institutions may specify in the credential issuance settings that the wallet PIN must always be prompted for.

Other credential issuers may issue a credential to a wireless device, require the wallet PIN with every transaction, but also prompt the user for an issuer PIN (or PIN set with the issuer) on the POS terminal during each transaction. The POS terminal may know to prompt for a PIN based on a card BIN number for example.

As such, some issuers may not require the wallet PIN to be prompted for, since the user will be prompted to enter an issuer PIN on the POS terminal that will be authorized on-line. In cases where such credentials are linked to a "hot button", the user will not be prompted for a PIN on the device, but will be prompted for an issuer PIN on the POS terminal.

Another type of PIN verification scheme for credentials stored in the wallet application is unique to the system of the present invention. This on-line verification technique utilizes the over-the-air (OTA) PIN handling and processing capability of the wallet application and the WCM (at the issuer location). The OTA PIN verification scheme is useful for credentials that are authorized online, and require a PIN in order to validate the user's identity. A discussion of this unique aspect of the present invention now follows in connection with FIG. 8. The unique aspect of this invention is that the credential information that is transmitted from the wireless device to an RF reader 820 reaches the issuer for an online authorization via one network path (comprised of one or more networks), while the PIN request and response traverse a completely different network path (comprised of one or more networks). The separation of credential data from the actual PIN data over separate networks provides a more secure way to authorize transactions.

Figure 8:
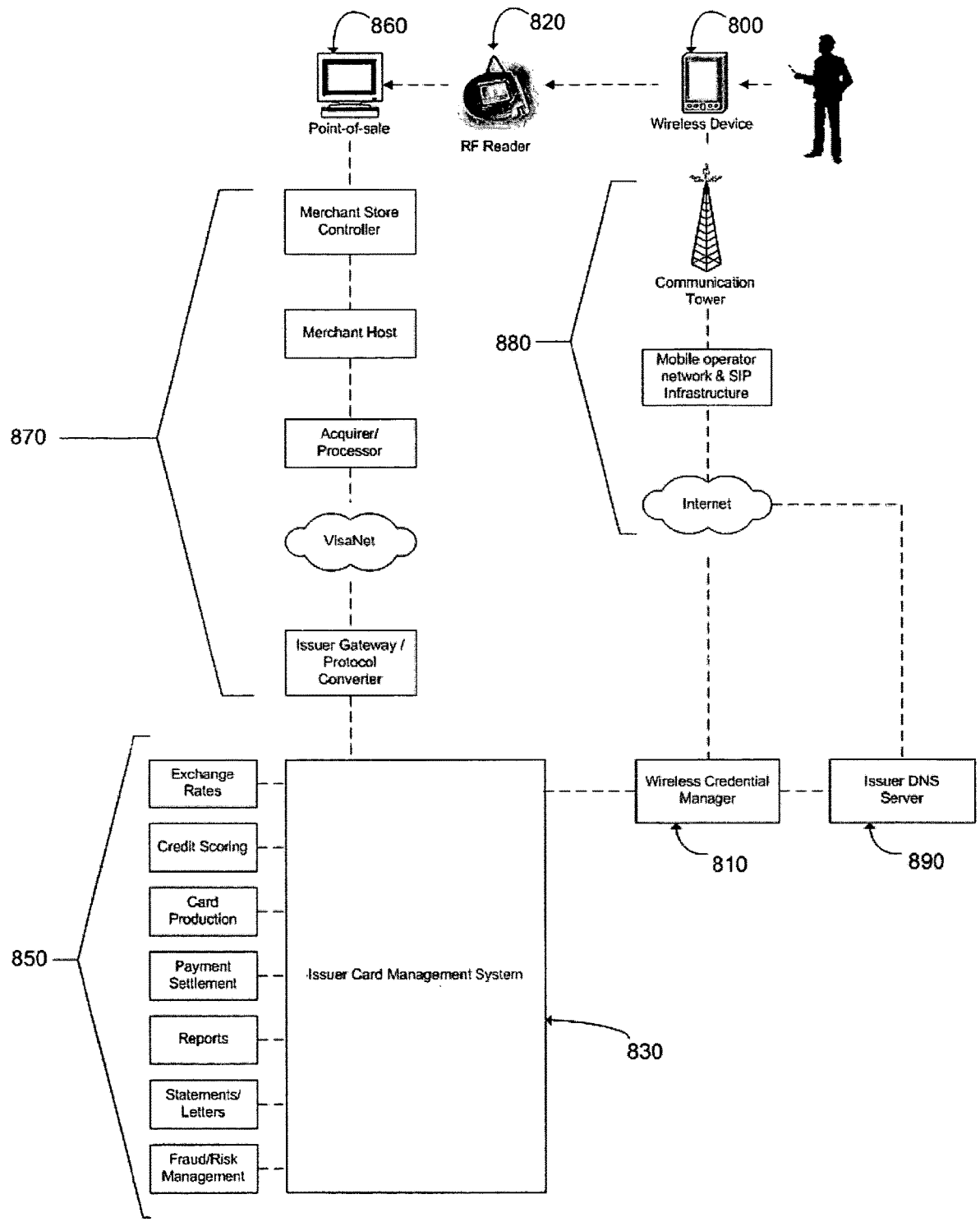
FIG. 8 is a diagram illustrating the over-the-air PIN verification scheme of the present invention.

As can be seen in FIG. 8, a first transmission path of an electronic credit card authorization request 870 includes, for example, a merchant store controller and merchant host system, an acquirer/processor network, a private network such as VisaNet, and an issuer gateway. Using these components, point of sale terminal 860, via RF reader 820 can be used to capture and transmit an electronic credential from a wireless device for online authorization. The second transmission path as shown in FIG. 8 is via WCM 810 using the Internet and wireless link 880 and issuer DNS server 890 and is used to deliver a PIN request to wireless device 800 and to receive a user-input response from wireless device 800.

An issuer that has deployed WCM 810 for issuing credentials to wireless devices can also use it for implementing over-the-air PIN verification. WCM 810 can be used to handle over-the-air PIN verification for electronic credentials issued using WCM 810 and also physical card/token based credentials such as magnetic-stripe cards that require enhanced PIN protection using this method. Either way, the issuer must generally make some modifications to its existing card management system. Specifically, accounts in the card management system 830 that have OTA PIN verification turned on, are flagged as such. The issuer's card management system 830 is preferably modified to allow incoming authorization requests associated with a flagged account to undergo additional processing after the underlying account status and other information (e.g. credit limits, velocity rules, etc.) have been checked. These checks are performed in connection with various processes 850 running in connection with the issuer cardholder system.

Authorization requests associated with accounts that are in good status and are qualified for an "approval" based on issuer defined criteria, will be held until a PIN request is sent to wireless device 800 and the entered PIN is validated by the issuer's host.

After the issuer's card management system 830 has validated that the account is in good status and is qualified for "approval", a PIN request is generated by the system and sent to WCM 810 via a real-time interface along with information relating to the transaction and certain account information. (If the account is not in good status or does not qualify for an "approval", a denial message would be sent through the network(s) to the origination point.) The PIN request message sent to WCM 810 should include fields such as the name of the organization that originated the authorization request, location ID from where the request originated (e.g. a store address), date/time of authorization request, transaction amount being authorized (or purpose of transaction if a non-financial transaction), transaction ID, last four digits of account number, credential type (e.g. Visa Credit Card), issuer name, and the E.164 mobile phone number retrieved from the credential holder's account (in Application Unique String format as defined earlier). There must be a valid E.164 mobile phone number in the account record in order to enable OTA PIN verification with a credential.

WCM 810 receives the PIN request message containing the above information. WCM 810 uses the E.164 number to perform an ENUM query. WCM 810 then retrieves and parses NAPTR records received from the query as previously described herein. The NAPTR record associated with a wallet application or service is selected and used to initiate peer-to-peer SIP communication between WCM 810 and the wallet application on wireless device 800 via the Internet and mobile operator's wireless network 880. The incoming message may automatically launch the wallet application or under another embodiment, it may always be running on the device. After exchanging session information, encryption keys, and other pre-requisite messaging required to establish secure, real-time connectivity—WCM 810 will send a standard formatted PIN request to the wallet application that contains information such as the name of the organization that originated the authorization request, location ID from where the request originated (e.g. a store address), date/time of authorization request, transaction amount being authorized (or purpose of transaction if a non-financial transaction), transaction ID, last four digits of account number, credential type (e.g. Visa Credit Card), and issuer name.

The wallet application in turn receives the properly formatted PIN request, and launches a PIN verification screen that displays the information received in the request. The user is prompted on screen to enter his PIN in order to authorize the transaction described. The user can input his PIN as requested using the key input capability of the wireless device 800. After the user enters his PIN and presses an application-designated button to submit the PIN, the actual PIN or a PIN Offset is transmitted in an encrypted manner to WCM 810. WCM 810 in turn transmits the received information in real-time with the transaction ID to the issuer's card management system 830 for verification (the transaction ID is sent as a way to match the response with the original authorization request that is pending in the card management system 830). The card management system 830 validates the PIN or PIN offset and if it matches the information in the account record, a positive authorization response (approval message) is sent back to the point-of-sale through the same path the authorization request was received 870.

Upon validating the PIN or PIN Offset, the card management system 830 may also send an approval confirmation back to WCM 810 using the transaction ID as the only identifier. WCM 810 which is still maintaining its peer-to-peer session with the wallet application will send the approval to the device 800, which will result in an approval message and/or tone being generated by the wallet application on the device 800 (see FIG. 9). Once the wallet application receives a PIN approval message, the wallet application can terminate the SIP session (under another embodiment, the WCS could instead terminate the SIP session).

In the event that the user initially entered and submitted the wrong PIN, the issuer's card management system 830 would in turn have sent back an "invalid PIN" message to WCM 810 in order to notify the wallet application on wireless device 800 and request a second PIN entry by the user. The number of allowed PIN attempts would be controlled by the issuer card management system 830. PINs submitted for online verification as described above, are not retained or stored in the memory of wireless device 800. Credential issuers may allow PINs to be comprised of any combination of upper or lower case letters, numbers, or special characters.

A credential issued to the wireless device 800 could be labeled by an issuer as using over-the-air, real-time PIN verification so the wallet application is aware of this information. Such a code would allow the wallet application to recognize that such credentials do not require a wallet PIN to be input by the user when linked to a "hot button" and accessed from there.

The use of a real-time PIN-verification system as described has several advantages. One advantage is that PINs can be entered directly into the user's wireless device 800, alleviating the need for an external terminal that has a PIN-pad. Further, online PIN verification also gives certain credential issuers a stronger means by which to validate a person's identity during a transaction. For example, card-based credentials that are validated today based on a signature match with the signature on the back of the card are open to fraud. PINs offer a better identity validation alternative to signatures, and are in many international jurisdictions considered to be legal electronic signatures. While the above description calls for the use of over-the-air PIN verification, it should be noted that biometrics could also be used in lieu of PINs, while still falling within the scope of the present invention. For example, a user may be prompted to scan his fingerprint using an integrated scanner in the wireless device 800 instead of inputting a PIN as described earlier.

One use of the over-the-air PIN verification is with credit cards. Credit card transactions in North America and many other parts of the world require nothing more than the signature of the card account holder to complete a "card present" transaction. Implementing online PIN verification for credit cards at the POS would be a monumental task today, as it would involve the reprogramming or retrofitting of millions of terminals with PIN pads, costly software development to retailer transaction processing systems, and changes to the way credit card transactions are processed by card acquirers/networks/associations/issuing banks. The over-the-air PIN verification system offers an alternative to the costly retrofitting and reprogramming that would be required to implement PIN verification at the POS, similar to the way online debit cards work today. The over-the-air PIN verification system could be implemented with only the issuer having to make changes to its own systems.

As an example, assume that Sample Bank deploys a WCM on its network and interfaces it to its credit card management system. Sample Bank could begin offering an innovative credit card product that provides consumers with enhanced protection against fraudulent credit card transactions. The MasterCard credit card product offered by Sample Bank could provide online PIN validation via a registered wireless device on every transaction. Sample Bank could offer the over-the-air PIN verification feature for electronic cards issued to wireless devices, and also for traditional magnetic-stripe cards that typically require a signature. In both cases, the retailer POS would process the credit card transaction as it normally would. The difference is that changes within Sample Bank's card management system will allow the incoming authorization request to perform a PIN validation through the WCM before it sends an approval/denial back through the card network. Credit card issuers like Sample Bank could decide to allow users to opt-in to this feature or the feature can be standard with specific card products.

Assume that a wireless user has an electronic Sample Bank MasterCard credit card stored in the wallet application that is setup for OTA PIN validation. The user selects the electronic card for use in a proximity transaction at a grocery store, and the credential information is transmitted to a reader via RF as described earlier. The POS at the grocery store will switch the transaction to its central host, which in turn will recognize that this is a MasterCard credit card and switch it to the MasterCard network (either directly or through an acquirer/processor depending on configuration). MasterCard in turn switches the authorization request to Sample Bank which is the card issuer. Sample Bank's gateway receives the authorization request, and passes the transaction to its card management system for approval. The card management system checks the account status using the normal validation process it follows for credit card authorizations. One of the novel aspects of the present invention is that Sample Bank has implemented a new credit card product with OTA PIN verification. As such, a flag in the credit card customer account record signals to the credit card management system that an authorization approval cannot be sent back to the retailer POS until an Over-the-Air PIN verification is completed.

As such, the card management system looks up the card member's registered E.164 phone number for his mobile device. The card management system in turn submits a real-time OTA PIN validation request to the WCM to which it is interfaced. The request contains information such as the name of the grocery store that originated the authorization request, location ID from where the request originated (e.g. a store address), date/time of authorization request, transaction amount being authorized, transaction ID, last four digits of account number, credential type (e.g. MasterCard Credit Card), and issuer name/logo (e.g. Sample Bank MasterCard). The WCM initiates an ENUM query on the E.164 phone number, retrieves and parses the appropriate NAPTR record, and attempts to establish a peer-to-peer session with the wallet application on the wireless device using the URI.

Figure 9:
FIG. 9 is an example screen shot of a PIN Approval Request displayed by the wallet application according to a preferred embodiment of the present invention.

The wallet application on the wireless device receives the PIN Approval Request and uses the device's internal capability to generate a tone which signals to the user that he should look at the device display. The wallet application displays the PIN Approval Request received from Sample Bank, and prompts the user to enter his PIN in order to approve the transaction. FIG. 9 is a sample of what a PIN Approval Request that is displayed in the wallet application might look like.

Once the user enters his PIN and presses a button to submit it, the encrypted PIN or some transformed PIN information (derived from the PIN) is transmitted to the WCM, which forwards it to Sample Bank's card management system for validation. If the PIN is valid, the card management system sends an authorization response back to the retailer POS using established processes. The card management system may in turn send an approval message to the WCM for transmission to the user's wallet application (the peer-to-peer session with the user may still be opened for this to take place). Once the user receives the approval message on his wireless device, the WCM may terminate the SIP session.

One important aspect of OTA PIN validation is that is requires that the wireless device and the wallet application running on it to be in good working order. It also requires that the wireless device have signal coverage to be able to send and receive information via the Internet. In the event that the WCM cannot reach the wallet application on the wireless device, and establish communication for PIN validation, the WCM will send a "not available" code back to the issuer card management system in order for it to send a "decline" response back to the retailer's POS system (there are a number of different decline codes an issuer could use here that are standardized by the card associations and payment networks).

Under another embodiment of this invention, the dual network processing path utilized for transactions involving OTA PIN verification as described above, could be used to prompt a user for certain preference information on his wireless device 800 during a transaction. For example, Sample Bank may create an innovative payment product (herein called the "Wallet Account") that links together multiple payment accounts such as a credit account, a debit account, and a stored value account under a single account number. The Wallet Account number could utilize a Visa, MasterCard, American Express, Discover, Diners, or other network/association Bank Identification Number (BIN) range that allows Wallet Account transactions to be authorized by a retailer's POS systems the way credit/debit card transactions are 870. When a Wallet Account transaction reaches Sample Bank's Card Management System 830 for authorization, Sample Bank's system 830 will discern that the account number corresponds to a valid Wallet Account which has a credit, debit, and stored value account linked. Using the user's E.164 number stored in Sample Bank's Card Management System 830, the Card Management System will send a message to the user's wireless device 800 to request a PIN (as described earlier) and to ask the user to specify his choice of using one of the linked credit, debit, or stored value accounts for completing the transaction. This request for payment preference traverses the same network path as the OTA PIN verification request described earlier, and traverses the Internet and mobile operator network 880. Based on the user's payment preference input into wireless device 800, Sample Bank's Card Management System 830 can authorize and apply the transaction to the appropriate account. This example illustrates that requests for user preferences or other information during a transaction can traverse a completely different network path (comprised of one or more networks) than the original online authorization via one network path (comprised of one or more networks).

Also illustrated is the fact that OTA PIN requests can be coupled with requests for user preferences or other information.

Up to this point, only proximity transactions using a short-range interface such as RFID have been discussed. The wallet application is also equipped to be used for remote transactions with servers connected to the Internet. It is envisioned that payment credentials sent by issuers to the wallet application will have data stored in ECML format to facilitate Internet payments via the wallet application. While the same data may be transmitted via RFID in one format, Internet payments may be made in ECML format.

ECML stands for Electronic Commerce Modeling Language. It is a specification, developed and maintained by the Internet Engineering Task Force (IETF), that provides a standard set of hierarchically organized, payment-related information fields in an XML syntax that will enable automated software, such as the mobile wallet discussed herein, to supply and query for needed data in a uniform manner.

Electronic commerce frequently requires a substantial exchange of information in order to complete a purchase or other transaction. With ECML, this task can be more easily automated. The wallet application, employing ECML can assist in conducting online transactions by storing billing, shipping, payment, preference, and similar information, and by using this information to automatically complete the data sets required by interactions. ECML is an existing Internet standard, already commonly used in online shopping. Thus, Internet merchants can easily adapt their e-business to the mobile context. ECML is a structure, not a protocol. It is security-mechanism independent and can be integrated to other transaction protocols and security elements when available.

The wallet application may be used for remote payments as follows. First the consumer browses a merchant's online service on the wireless device and selects the items to buy. To pay for the purchases, he selects "wallet payment" and receives a payment request, i.e., a payment data form that must be filled in. When the cursor is in an empty field of the payment request, the consumer can simply press the "wallet button" on the device to launch the wallet application, or the user can launch the application through the operating system. When launched, the user will be prompted to enter his wallet PIN code. The user can then choose the "credential selector" option from the wallet menu. Once the user has selected the payment method he wants to use and clicks "OK", the wallet application will detect the ECML fields in the open browser and will automatically populate the fields with data from the wallet application. The user is directed back to the browser and can check the information that has been entered into the form before accepting the order.

In some circumstances the wallet application may require the user to provide a credential specific PIN to complete the transaction. In other cases, the user may be prompted for a PIN during the authorization process with his issuing bank (see OTA PIN verification process above). In yet another case, a merchant may require the consumer to digitally sign the payment; after accepting the order, the consumer may receive a signing request and can sign the payment with his/her personal digital signature PIN. This last option requires a security module (SIM/WIM) in the terminal. The merchant may then send the consumer an acknowledgement and a digital receipt of the successful payment via methods that will be described later.

The wallet application can also be used to complete web-based transactions made through a personal computer. A computer that has an RFID reader embedded or attached to it through a USB, serial, or some other type of port, could be used to capture payment and other personal information from the wireless device in ECML or other formats in order to populate fields in a form. The process would be similar to what is described above.

The data stored inside the wireless device is encrypted and protected with the wallet PIN code (or other biometric security information), which is used to allow the user access to the application. Security for remote transactions is provided by the browser on the wireless device itself. A number of server authentication and data encryption protocols may be employed to secure credentials and other confidential information such as Wireless Transport Layer Security (WTLS), Transport Layer Security (TLS), and Secure Socket Layer (SSL). Wireless Identity Module (WIM) could be used for digital signatures enabling authenticated payments. With server authentication and digital signatures, mobile transactions are even more secure than transactions on the fixed-line Internet.

The wallet application is capable of receiving digital receipts from merchants. Digital receipts are electronic equivalents of paper receipts. They work as the payer's record of a payment transaction that has taken place during a proximity, personal, or remote transaction using the wallet application. Similar to a paper receipt, they contain information such as the transaction amount, date/time of the transaction, merchant name, payment method used, and sometimes details of what was purchased. The receipt functionality makes it possible to have a record of the payment before a physical receipt can be delivered, or in cases where a physical receipt is not used at all.

The receipt support in the wallet application will follow the MeT receipts specification. The MeT specification is a mobile optimized strict subset of the Association for Retail Technology Standards (ARTS). The MeT receipts specification can be found at: http://www.mobiletransaction.org/

The wallet receipt functionality makes it possible for the merchant in a mobile electronic transaction to send a receipt to the wallet application via a number of methods. The wallet application supports receipts by listing "application/vnd.met.receipt" as a supported MIME type. The MIME type is used both in identifying an incoming receipt data object and in publicizing the support for receipt data type in certain message headers (e.g. HTTP, SIP, SMTP, etc.). The received receipts are stored, if the user selects to store them, in the wallet application. The wallet application protects the user's privacy by requiring a PIN code to be entered before the receipts can be accessed through the wallet application's main menu. The Receipt menu option provides a central point for the user to access the receipt data.

Receipts from a merchant can be sent to the user's wallet application on the wireless device via several methods as discussed herein. Under one design, the user's E.164 phone number for the wireless device is transmitted to the merchant with the credential information during an RF transaction. The wallet application would have the ability to learn the E.164 phone number of the device on which it operates through the device's operating system, or directly from the SIM card which may contain certain device settings and attributes like the E.164 number. A phone number field would be specified in the credential transmission record that is transmitted from the wireless device to the POS reader (or to a server in the case of a remote transaction). Under this embodiment, the merchant's system receives the E.164 phone number of the device that initiated the transaction. The merchant could use the number in conjunction with a WCM deployed at the merchant's site to issue digital receipts to the wallet application. The merchant would have a WCM setup to interface with its central transaction processing system. The retailer's transaction processing system would temporarily hold the E.164 number received with the credential during an authorization request that originated at the POS.

Assuming the credential in this example is a MasterCard credit card, the retailer transaction processing system would switch the transaction out to MasterCard (directly or through a merchant acquirer) and onto the issuing bank for approval. Assuming an approval comes back from the issuing bank to the retailer transaction processing system, the retailer transaction processing system can issue a receipt request for the transaction to the WCM to which it is interfaced. The receipt request sent to the WCM from the transaction processing system might be sent concurrent to an approval message being sent from the transaction processing system to the POS. The receipt request that the transaction processing system sends to the WCM would include the E.164 number that was temporarily retained, along with specific information about the transaction that would appear on the digital receipt in the display of the wireless device running the wallet application. Once the transaction processing system sends the receipt request to the WCM, the E.164 number that was retained, is purged.

The WCM will use the E.164 number contained in the receipt request to perform an ENUM query, retrieve the NAPTR record for the user's wallet application/service, and use the appropriate URI to establish peer-to-peer SIP connectivity with the wireless device to deliver the receipt. The use of the "application/vnd.met.receipt" MIME type in the message would allow the SIP stack on the wireless device to know that the message relates to the wallet application. The wallet application in turn will recognize the MIME type and know that the message is a digital receipt. The wallet application will alert the user to the arrival of the message containing the digital receipt by displaying a message on the device display and possibly sounding a tone (or some other sound) using the device's internal functions. The wallet application will register the digital receipt with the Digital Receipts folder. The actual receipt record will be stored in the secure storage memory in the device and can be accessed via the Digital Receipts viewer in the wallet application.

The reason for using peer-to-peer SIP delivery for transmitting receipts to the wallet application is for the merchant to be able to guarantee and confirm delivery of the receipt. Merchants may be required to ensure that consumers receive a digital receipt in order to comply with laws, payment association regulations, or other types of mandated rules. SIP provides a means by which to ensure that a message was received by the wallet application. Further, the use of a SIP peer-to-peer session provides a higher degree of privacy and security than other messaging protocols that could be used instead.

Upon successful delivery of a digital receipt to the wallet application, the WCM is notified by the wallet application during the peer-to-peer session that it has received a properly formatted receipt. The WCM can log all receipts and delivery confirmations to a separate server for archiving. The archived data may be used by the retailer to satisfy audit requirements related to its compliance with any laws or rules around receipts.

In the event that the wireless device is turned off or does not have network coverage at the time the WCM attempts to deliver a digital receipt, the WCM can use the SUBSCRIBE feature of the SIP protocol to be notified when the wireless device is available for communication. The WCM can attempt to deliver the message when it receives notification that the end-user device is available again.

The description above assumes that there is a standard E.164 phone number field in the transmission record layout. An alternate approach would be to embed the phone number within certain fields part of the credential itself. For example, certain implementations of contactless credit cards today (e.g. MasterCard PayPass) involve the transmission of track 1 and track 2 data from the card chip to the RF reader. The track 1 and track 2 data captured from the chip is analogous to data encoded on magnetic-stripe credit cards. What is being proposed here is the incorporation of a E.164 number into one of the track 1 or 2 fields. The retailer system would need to know the location of the E.164 number within the data format in order to be able to extract it for use by its own systems and the WCM.

An alternative approach to delivering receipts would be for the retailer to send them using their standard SMTP server. Under this embodiment, the WCM or another system could be used to do an ENUM query on the E.164 number, receive the appropriate NAPTR record, and use the wallet application/service URI (in an e-mail format such as bob@wallet.mobileco.com) to send an SMTP message to the wallet application which would be configured to receive SMTP messages. Under this embodiment, the wallet application would allow for incoming SMTP messages, and would recognize the "application/vnd.met.receipt" MIME type in the message as being a digital receipt. The body of the message would be encoded with the contents of the receipt. The SMTP message would comply with the MeT Receipt XML Schema. The wallet application under this embodiment would also comply with the MeT Receipt specifications. In a personal transaction as discussed before, the receipt could be sent as part of the same peer-to-peer session that was used to initiate and complete the transaction. Electronic receipts could also be sent to wireless devices by the credential issuer instead of the merchant as described as above.

If a user keys in the wrong wallet PIN code (or incorrect biometric identification if used in lieu of PIN codes) three consecutive times, the wallet application will not function for a period of 10 minutes. If the user forgets his PIN, the wallet can be reset by the user with a general reset code, which will be available in the wallet application user guide or from the mobile operator. The wallet reset function will result in the user losing all credential information, confidential information, and user preferences stored in the wallet application's secure storage area. The user would in turn have to go through a re-issuance process with each credential issuer in order to restore the lost credentials.

Under one embodiment, the wallet application will require the user to establish a secret question and answer before the application is used for the first time. This will allow the user to reset his wallet PIN, by being given the secret question, and being prompted for the answer to the secret question. Upon successfully answering the secret question, the user will be given the chance to select a new PIN to replace the one that was forgotten.

Under another embodiment of the invention, after some number incorrect PIN attempts, the wallet is permanently locked, but the information within the wallet is retained. Under this design, the user is presented with two options after the ninth failed PIN attempt. The first option allows the user to completely wipe out the contents of the wallet and select a new PIN code. Under the second option, the user is given the ability to go through an online authentication process with each issuer in order to validate his identity and account information. Once the user has successfully re-validated his identity with each issuer, the wallet application will prompt the user for a new wallet PIN.

Entering the new wallet PIN will provide the user with access to all the wallet's functionality and credentials that were successfully validated with the issuer. The online access to the issuer's systems for this re-validation process are provided through capability within the wallet application. The wallet application opens up a SIP connection to the issuer's WCM and sends a standard handshake/key exchange message in order to establish secure communication (An Internet address for each issuer's WCM and encryption key may be registered in the wallet application as part of each credential record). The wallet application sends a message alerting the issuer's WCM that the user needs to re-authenticate his identity due to a PIN lockout. The WCM contacts the appropriate issuer system with the information, and the issuer system responds back with a message that requires the user to re-assert his identity by providing some information that only he would know. This request is relayed by the WCM to the wallet application, and may include a request for such information as the user's account number with the issuer, his social security number, date of birth, mother's maiden name, driver's license number, or a variety of other information.

The user enters the information into the form, and the information is relayed by the wallet application to the issuer's system through the WCM. Once the user's identity has been established with the issuer, the issuer sends a code to wallet application to confirm that the user has re-asserted his identity and that it is ok to re-activate the credential on the device. The wallet application in turn terminates the session with the issuer's WCM. Upon completion of the first validation, the wallet application contacts the next issuer whose credential is stored in the user's wallet. The same process is repeated to re-assert the user's identity. The information that is requested by one issuer to re-assert an identity will likely be different than others as each issuer has different security measures in place, and different methods by which to validate a person's identity.

Once the user has re-asserted his identity with the final issuer, the wallet application will prompt him for a new PIN code. The wallet will prompt for dual entry to ensure proper input. Once the user logs in with the newly selected PIN, the user will see all the credentials for which he re-asserted his identity online directly with each issuer. Any credentials where the user was not able to re-assert his identity with the issuer will be deleted from the wallet storage. Once the user logs in with his new PIN, certain wallet settings will also be unlocked and restored to their former position.

The wallet application may have a feature whereby it automatically polls a server managed by a mobile operator, software developer, or other party for upgrades to the wallet application. The application may need to be upgraded from time-to-time to support new features or implement new security measures. The wallet application will in turn poll a server connected to the Internet at an interval that may be pre-defined in the application. If the software finds an upgrade, the wallet application will notify the user, and ask the user if he wants to complete the upgrade. If the user says "OK", the application will proceed to download the software and initiate the upgrade on the wireless device. All credentials, confidential information, and settings will be saved and be available in the upgraded version. The upgrade process, may use digital certificates to authenticate servers from where software is being downloaded, and also to verify the authenticity of the software itself.

Credential issuers will have the ability to remotely cancel credentials, re-issue credentials, or manage credentials in other ways on a wireless device. During the initial issuance process, credential issuers will send a unique "credential issuer key" along with the credential they are issuing to the wallet application. This key is unique to every credential that the issuer sends out. During the issuance process, the key is stored in the wallet application's secure storage area with the credential itself. The key must be contained in the first message of any communication with the wallet application. In another embodiment, the key is contained in every message from the issuer to the wallet application. The presence of the credential issuer key in the initial message sent from the issuer to the wallet application allows the wallet application to recognize that the message is authentic and from one particular issuer.

As such, the credential issuer can use the key to connect to a wallet application and make certain changes to the credential it previously issued. It should be noted that the "credential issuer key" only gives the issuer access to managing the credential that it issued and no other organization's credential and no other settings on the wireless device. Any initial message from an issuer that does not contain a credential issuer key that matches a key stored in the wallet application, will not result in communication being established between the two end-points.

The issuer can use the key to make changes to a credential in the wallet application. Examples of changes could include, a change to the credential's expiration date, a change in the credentials account number, or a change in the account holder name associated with the credential. In such cases, the issuer can connect to the wallet application with a valid key, make the appropriate changes to the stored credential, and then prompt the wallet application to display a notification message on the device display of the change that was made (a tone may also sound from the device to alert the user of the change). Under another embodiment, the issuer may connect to the wallet application with a valid key, a notification message will appear stating what change the issuer will perform to a credential, the user will be prompted to approve the change, and the change will only be made once the user provides his consent; after the change has been completed, a confirmation message will be displayed in the wallet application.

Under certain circumstances, the credential issuer can also use the key to initiate communication with the wallet application and make changes without the user's knowledge (no display messages or tones being generated). This feature is especially useful if a wireless device is lost/stolen and the owner of the device wants to have a credential deleted. Under such a scenario, the user might call the issuer or go on the issuer's web site to report his wallet device as being lost/stolen. Upon receiving the request, the issuer would send a message with the credential issuer key to its WCM in order to establish communication with the wallet application for the purpose of deleting the credential. If the wireless device is turned on and has network coverage, the issuer could connect to it through the WCM and issue a lost/stolen command to have the credential deleted. The wallet application on the user's device could delete the credential without alerting a fraudster through display messages or tones being generated.

If a user's wallet device is lost/stolen, notifying each credential issuer individually may be a long and tedious process for the user. As such, the wallet application may also have a feature whereby a mobile operator will be able to connect to the wallet application and issue a command to purge all its contents.

During the setup process of the wallet application, a mobile operator will issue a unique "mobile operator key" to each wallet application device. The key is stored in the wallet application, and is used by the operator to reset the wallet application remotely in the event that the device is lost/stolen, and to manage other wallet settings like (SIP proxy server addresses, DNS server addresses, etc.).

A user who has recently lost his wallet device could contact the operator via phone or log in to the operator's web site to notify the operator online. The operator would authenticate the identity of the user by asking him a series of questions on the phone or on the operator's web site. Once the user's identity is confirmed, the user can provide his consent to have the operator delete the contents of the wallet application remotely.

The operator, using a WCM would connect to the device using the "mobile operator key", and issue a command to purge all contents of the wallet application. This can be accomplished without a fraudster knowing that the operator has connected to the device and has issued a command to purge all confidential wallet data and has locked the application. In order for the operator to connect to the device and issue the purge command, the device needs to be turned on and must have signal to the wireless network. In the event that the device is not reachable by the mobile operator's WCM, the operator can use the SUBSCRIBE function in the SIP protocol in order to be notified when the device is network accessible.

The "mobile operator key" can only be used by the mobile operator to issue a purge command to the wallet application, and manage specific settings in the application that relate to how the application interacts with the operator's network and SIP infrastructure. The key does give the operator access to any credentials or other confidential data stored in the application.

There may be instances where a user wants to change wireless devices, and requires the ability to transfer his wallet credentials and contents from his current device to a new device. The user may accomplish this using a feature in the wallet application that allows stored credentials and other confidential information to be securely transmitted to another wireless device using the short-range transmission capability of both devices (e.g. Bluetooth, infra-red, etc.).

The user would first login to his existing wallet application using his PIN or biometric ID. From the settings menu, the user would choose the "secure wallet transfer" option. The user might be given the ability to select which short-range transmission capability to use for communication with the new device (in case the device supports different types). For this example, we will assume that the user selects Bluetooth. The wallet application on the existing device will display a randomly generated 20 digit key that the user will be required to enter in the wallet application on the new device in order to authenticate the existing device and wallet. The user will be required to perform the following steps before peer-to-peer communication can be established between the two devices:

1. The user turns on the new wireless device (which is pre-loaded with the latest version of the wallet application).

2. The wallet application is launched. As the user has never used the wallet application on the new wireless device, launching the wallet application will ask the user if he is wants to setup a new wallet, or is transferring a wallet from another device.

3. The user selects that he is transferring a wallet from another device.

4. The user is asked to enter the 20 digit key that is currently displayed on his existing wireless device (from where the credentials will be transferred). The user inputs the 20 digit key exactly the way it appears on the existing device display. Upon submitting the key, the new device displays a message stating that it is ready to connect via Bluetooth.

5. On the existing wireless device, the user is asked to press a designated key as soon as the new device is ready for communication. The user presses the designated key, which enables its Bluetooth interface. It is assumed that Bluetooth security is implemented by the wallet application using preset security mode 3 with authentication and encryption.

6. The existing device is now prepared to discover the new Bluetooth enabled device.

7. The existing device performs a Bluetooth inquiry and gets a response from the new wireless device.

8. As part of the Link Manager Protocol (LMP) channel set-up, the existing device demands authentication of the new device.

9. The new device detects that it does not have any previous link key with the new device.

10. The Bluetooth pairing is requested.

11. The existing device prompts the new device for the passkey that was input by the user.

12. The passkey is sent from the new device to the existing device and is validated.

13. A key exchange is performed between the new device and the existing device. A link key is derived that is shared between the existing device and the new device.

14. The new link key between the existing device and the new device is stored in nonvolatile memory in both devices.

15. The existing device authenticates the new device.

16. The new device authenticates the existing device.

17. The existing device and the new device perform an encryption key exchange.

18. The LMP set-up is now complete. The existing device and the new device encrypt all data they exchange from now on.

19. The wallet application on the devices automatically switch the devices out of pairing mode so they no longer accept any new inquiries or pairing requests.

20. At this point, both wallet applications will not allow any external connections while the two devices are communicating.

21. The user will be prompted on the new device for the wallet PIN associated with the existing device. Once the correct PIN has been entered, the contents of the wallet on the existing device will begin transferring to the new device.

22. The wallet application on both devices will show a visual representation of the data transfer occurring from the existing device to the new device. The picture will show the existing device on the left and the new device on the right of the screen, and a repeating animation of an arrow moving from the existing device to the new device. The arrow represents the data movement. A dynamic bar at the bottom of the screen will show the percentage completion of the data transfer.

23. In the event that the transfer is interrupted for any reason, the process must be started from the beginning (no data will be retained on the new device in the event of an interruption).

24. Upon completion of the data transfer, the new device will acknowledge with the existing device that all data has been transferred.

25. The existing device will purge all credentials and data stored in the wallet application, will notify the new device of the purge, and will reset the application.

26. The new device will be notified on screen that data on the old device was purged.

27. The reset of the wallet application on the old device will terminate the Bluetooth session. All encryption keys related to the Bluetooth session will be discarded.

28. The user will now be able to log into the wallet on the new device with his existing PIN.

The transferred credentials cannot be used until the wallet application sends a transfer notification to each credential issuer and receives an acknowledgment back. After the transfer of information between the devices is completed, a notification is automatically sent to each credential issuer with specific information related to the new device to which the credentials were transferred. These notifications must be sent before the credentials can be used. The notification to the credential issuer could contain, for example, the new device's Media Access Control (MAC) address, a unique code assigned to most forms of networking hardware. The address is permanently assigned to the hardware, so credential issuers may use the MAC address as a way to confirm that future communication from a specific user's wallet application is originating from a registered device. Credential issuers in this case would retain the MAC address for the wallet device in its user database, and validate the MAC address contained in future communications from the wallet application against the address stored in its database for that user. Communications with incorrect MAC addresses will be rejected by the issuer's system. Other information that could be sent as part of a notification message from the wallet application to the credential issuer includes a new E.164 phone number (if the new device has a newly assigned number) and a new randomly generated encryption key for each credential issuer (used by credential issuers to encrypt information being sent to the wallet application—could be one key for all issuers or unique keys for each issuer depending on the design).

Credential issuers may also want to re-authenticate the user's identity in order to allow a credential to be activated on the new device; this may involve the issuer's system establishing a peer-to-peer SIP session (via the WCM) to prompt the user for specific information that only he knows. The user in turn would be required to input the requested information into the wallet application interface in order to authenticate themselves and have the credentials re-activated. The credential issuer may also use the peer-to-peer session to re-issue any encryption keys that were issued to the last device.

The wallet application has two logging features that can be accessed through the wallet main menu "Log Viewer" option. First, the wallet application will log all transactions made in proximity, personal, or remote mode. The log will display information such as date/time, name of retailer/organization, location ID, list of credentials used in the transaction, and purchase price (if transaction had a financial component). The purpose of this log is to allow a user to see what credential and personal information was shared with a third-party. User's need to be able to verify sometimes what personal information may have been shared during a specific transaction. This viewer allows the user to go back and view up to 6 months of transactions. In the case of financial transactions, the log entries will also have links to digital receipts (which are stored separately in the wallet application). Digital Receipts will be linked to log entries based on date/time stamp and credential matches (other criteria could also be used—for example, under one embodiment, the device generates a unique transaction ID which is transmitted with the credential to the merchant during each transaction. This ID could be contained in the digital receipt, and used by the wallet application to link the digital receipt with the log entries).

The second logging feature registers all credential changes in the wallet application. This feature logs all new credentials, changes to credentials, and credential cancellations. Up to 1 year of data could be retained. The purpose of this log is to give users the ability to go back and see when credentials were first issued and when issuers made other changes. This log captures, date/time, credential, and description of activity/change made by issuer. The log viewer will allow the user to sort log entries based on any of the column headers.

Under one embodiment of the present invention, the secure storage of the wallet application resides on a remote network-connected storage device managed by the mobile operator or a "wallet service provider". Based on this design, the wallet application registers an external wallet storage service as an "extension" within the wallet application on the wireless device. The external storage may be a standard application extension that is automatically registered when the application is first launched and setup by the user. The external storage is used to store credentials, personal information, and some wallet settings. The external storage performs two basic functions: storage and retrieval of information registered in the user's wallet application.

The wallet application may have a pre-programmed address of a secure and trusted storage server. During the wallet application setup process, the application may contact the storage server to create a profile. The mobile operator or service provider may request some personal information to authenticate the identity of the user in order to create a storage profile for the user's wallet. During the storage setup process, the storage server will establish a valid username/password for the wallet application to automatically access the storage area; the username and password may be system generated or could be user defined during the storage profile setup.

The wallet application and storage service will exchange encryption keys for secure communication. The communication keys are used to encrypt all messages between the wallet application and the storage server. New communication keys can be dynamically generated for each communication session, or the same keys can be used for a set period of time before they are automatically changed.

Credentials will be issued to the wireless device in the manner previously described in this document with only a slight modification to where the credentials actually get stored. When an issuer's WCM opens a peer-to-peer SIP connection with the wallet application on the wireless device, the wallet application will have an open connection maintained to the secure storage service. Any credentials that are issued to the wireless device will be transparently transmitted to the storage service where they will reside. The connection between the wallet application and the storage service could utilize an application protocol such as HTTP, SIP, or others. Any data transmitted to the storage service will be registered with the wallet application first; the registration of credentials, personal information, and other confidential data within the wallet application allows the wallet application to display headers for information in storage without having to retrieve it online; the registration process also allows the wallet application to call specific data from storage based on the assigned registration ID for the data object in storage.

Under this embodiment, whenever the wallet application is launched on the device and a user logs in with his valid PIN, a real-time connection is initiated between the wallet application and the storage service. The wallet application automatically authenticates itself and gains access to the stored credentials. The user is then free to use the wallet menu to select stored credentials or profiles to facilitate a transaction. The Credential Selector and Profile Selector screens will show credentials and profiles in storage; if a user selects an appropriate credential for use, the credential information is securely transmitted to the wireless device and temporarily made available for use by the device's RFID interface. No credential data or settings are retained in memory of the wireless device after a transaction is completed. Under this embodiment, even electronic receipts, logs, and other information registered with the wallet application are stored in the external storage service, and made available for use by the wireless device.

Under another embodiment of this invention, information stored in the external storage service is not registered with the wallet application. Under this design, headers describing the stored information, and the information itself—are retrieved in real-time from the storage device.

The following discussion provides details concerning the architecture of the IETF, 3GPP, and 3GPP2-compliant SIP wallet application that is intended to function on a wireless device. As opposed to the situation in 2G networks, in 3G and in traditional IP networks it will be very unlikely that wireless terminal vendors will invent and implement all key applications. Operators and third-party developers are keener than ever to provide their own customized applications.

This type of development is made possible by opening some of the APIs on the terminal. Opening these API functionalities on the JAVA side for example has the advantage that applications can be run in a secure environment. Furthermore, applications can be provisioned to the terminal using an over-the-air mechanism in a secure and controlled way. One additional advantage is that the APIs will be available regardless of the underlying operating system.

A SIP Client API provides access to the basic services of a SIP stack. The most essential services are sending and receiving SIP messages, creating registrations, and forming and tearing dialogs initiated by INVITE and SUBSCRIBE. A SIP Client API is appropriate for applications like the wallet application disclosed herein, that intend to use SIP for managing communication sessions, subscribing to events, and sending stand-alone SIP messages.

One such API is known as JSR180, the SIP Application Programming Interface (API) for Java 2 Micro Edition (J2ME) which completed its final release in October 2003 as part of the Java specification process. The Java platform is seen as a base for many new innovative SIP applications. JSR180 can also be deployed on a MIDP 2.0 platform. The Mobile Information Device Profile (MIDP) is a key element of the Java 2 Platform, Mobile Edition (J2ME). When combined with the Connected Limited Device Configuration (CLDC), MIDP provides a standard Java runtime environment for today's most popular mobile information devices, such as cell phones and mainstream personal digital assistants (PDAs).

Another SIP API is the SIP Client API Specification (Version 1.0; Jul. 5, 2004) that is valid for all platforms running Symbian OS v7.0s. The SIP Client API requires the SIP Codec API (v1.0) that provides services for encoding/decoding SIP headers and their fields. Both the Java and Symbian APIs mentioned above allow multiple applications on the same device to use the SIP stack simultaneously. The function calls of the API are synchronous. An application must implement a set of callback functions, which the SIP Client API can use to pass events to the application.

The SIP-based wallet application described herein is intended to be developed for both of the environments described, and could also be built for other environments such as BREW, Palm, PocketPC, and Linux. The wallet application will utilize a SIP API framework operating on the device. The use of other SIP APIs (other than those mentioned above) with other operating systems or programming environments is also possible according to the teachings of the present invention.

SIP identity is a logical identity (address-of-record), a type of Uniform Resource Identifier (URI) called a SIP URI. SIP identity is frequently thought of as the "public address" of the user (see RFC 3261, 6 definitions, p. 20).

A wireless terminal that supports SIP is typically configured for one user at a time (SIP provider settings). This means that the SIP system uses that address-of-record (URI) as the identity when communicating to other identities. Now, it is very likely that there will be several applications that want to share the same SIP identity. For example, audio/video, instant message/presence, game applications, and a wallet application as disclosed herein. On the other hand, some applications can use their own SIP identity (for that particular service), which does not share the same SIP properties.

When sharing the same identity, the issue falls to the decisions on how the SIP requests are routed to the User Agents (applications). This functionality is specified in SIP Working Group (http://www.ietf.org/html.charters/sip-charter.html) as callee's capabilities and caller's preferences. The implementation should follow the framework and parameters specified in the final specification of the SIP working group.

When sharing the same identity (address-of-record) the terminal has to know where the incoming request is routed. To do this it can use the MIME type tag carried in a special header (e.g. Accept-Contact). Each application is mapped to a certain MIME type. For example, Java SIP API provides a way to utilize this functionality as is specified below.

To allow the Java SIP API to share the system SIP identity or use the application's own identity, the following rules are defined when the SIP server connection is opened with Connector.open( ):

| Connector SIP URI | SIP Identity | Request Routing |
|---|---|---|
| 1 sip:5080[type="application/wallet"] | Use dedicated port 5080 Use identity set by the requests on port 5080 to this application SipConnectionNotifier. | Route all incoming SIP If the optional MIME type feature tag "application/wallet" is set route only the requests with the matching tag. |
| 2 sip:;type="application/wallet" | Share system SIP port Share system SIP identity | Route incoming SIP requests with MIME type feature tag "application/wallet" to this SipConnectionNotifier |
| 3 sip: | Use dedicated port Use identity set by the | Route all incoming SIP selected by the system requests to the selected port to this SipConnectionNotifier application |

RFC 2046 defines a top-level MIME "application" media type to be used for discrete data to be processed by some type of application program. This information must be processed by an application before it is viewable or usable by a user. Such applications may be defined as subtypes of the "application" media type. Examples of two subtypes are: "octet-stream" and "PostScript".

In general, the top-level media type is used to declare the general type of data, while the subtype specifies a specific format for that type of data. Thus, a media type of "application/wallet" is enough to tell a user agent that the data relates to an application on the wireless device, and further to the Wallet Application which will be mapped to the specific MIME type.

According to RFC 2046, the subtype of "application" will often be either the name or include part of the name of the application for which the data are intended. While the above example uses the "wallet" subtype for the Wallet Application, another subtype that conforms with the requirements for MIME application sub-types can be used.

Any application program name cannot be used freely as a subtype of "application". RFC 2048 defines registration procedures which use the Internet Assigned Numbers Authority (IANA) as a central registry for such values. Provided that the media type meets the requirements for media types and has obtained approval that is necessary, the author may submit the registration request to the IANA, which will register the media type and make the media type registration available to the community.

Profiles may be shared with other applications. A profile is a collection of data necessary for providing required SIP registration behavior. A profile stores the following main parameters:

The user-friendly name of the service provider

The type of the profile, for example, 3GPP R5 IMS, IETF, or a proprietary profile type The user's registered public name (SIP Address Of Record, AOR)

The access provider identifier of the used Internet Access Point (IAP)

The address of the SIP registrar server, with optional connection and security parameters The address of the SIP proxy server, with optional connection and security parameters Compression and security preferences An indication of whether the profile is to be always automatically registered or only when it is used by an application Any number of extension parameters stored as key/value pairs The SIP-based Wallet application can share the same profile as other applications, and thus the same registration. This functionality may be built into the Wallet Application or could rely on an API. For example, the SIP Profile API Specification (Version 1.0; Jul. 5, 2004) provides a SIP registration service for applications. In order for the Wallet Application to use this API, the SIP Client API for the Symbian OS v7.0s is needed as well.

The behavior of the registration service depends on the profile type used. There are different profile types for different standards, for example, 3GPP R5 IP Multimedia System, Internet Engineering Task Force (IETF), and proprietary standard types. At any given time, zero or more profiles of any profile type may exist. Each profile has a one-to-one correspondence with one SIP registration. The user of the API can be unaware of the details of the registration process and can ignore state changes of the access point connection during SIP registration.

The SIP Profile Agent subsystem stores the SIP profiles in the persistent storage. As mentioned before, these profiles hold information necessary for providing required registration behavior. The SIP profiles can be managed with the SIP Settings UI (Application for end the user to add/update/remove SIP profiles), or they can be managed with over the air (OTA) configuration (by the SIP service provider).

All aspects of the WCM are preferably compliant with IETF RFC 3261, 3GPP, and 3GPP2 standards. EMV-Compliant—The wallet application should meet standards defined by card organizations. The wallet application should comply with ISO standards for Personal Identification Number (PIN) management and security in open networks (ISO/TR 9564-4:2004)

Cryptographic functions supported include:

PIN, MAC and Data encryption keys

Multiple index for all cryptographic keys

Single, double or triple length of all encryption keys

Single or Triple DES encryption/decryption

Dynamic key exchange

Key thresholds and threshold limits

Under another embodiment of this invention, the user sets up a "wallet account" with a mobile operator or "wallet service provider". The server-based wallet account allows a user to store credentials, personal information, and other confidential information in the electronic wallet, which the user can access through a number of channels using a minimum of two registered tokens. The server-based wallet system described at this point has all the same functionality of the wallet application described above (operating on a wireless device), but allows a user to access the entire "electronic wallet" from virtually any Internet-based channel such as a wireless device, a PC, or point-of-sale terminal.

Based on the design disclosed herein, the user would be required to provide a E.164 number for a wireless device in order to establish the wallet account on a server hosted and managed by the wallet service provider. The wallet server uses the E.164 number as an access token and may also use it as a master account number. The user would also be required to establish a username and password/PIN for web access to the account (the username and password/PIN are also tokens). The server-based wallet application allows a user to register other tokens that can be used to gain access to the account through various means. For example, biometric information such as fingerprints, iris, voiceprints, facial recognition, and hand geometry can be registered through a trusted service provider of the wallet service. A magnetic-stripe card, an RFID-based device, a bar-coded card, or other similar devices could also be registered as valid tokens that can be used for accessing the server-based wallet.

The number of tokens and the types of tokens required to access the wallet are dependent on the access methods available to access the wallet. For example, a POS terminal equipped with a fingerprint scanner and a numeric key input device, would only require a user to provide a valid E.164 phone number and a fingerprint in order to access his electronic wallet as disclosed herein. This example of two-factor authentication is sufficient to securely access a person's wallet at the point-of-sale. Similarly, a POS system that has an RFID reader and a numeric key input device, may require the user to wave a registered RFID token, provide a E.164 number (which could be transmitted by the RFID token or entered by the user manually), and enter his wallet PIN. This example would be considered three-factor authentication if the E.164 number is not encoded in the RFID device and must be entered manually by the user.

The encoding of a E.164 number in an RFID-based device, magnetic-stripe card, bar coded device, or other similar device—that is used as an access token for an electronic wallet is disclosed herein. The E.164 number encoded in the access token may be transmitted to a reader along with other information such as a wallet account number, a unique device ID, and a variety of encryption information (that could be validated with the reader and/or with the wallet server).

In contrast to the design detailed earlier in this document, the mobile operator or wallet service provider will populate the ENUM address information differently; under the previous design, the URI in the NAPTR record associated with the wallet service pointed to the wireless device (with the E.164 number). Based on this design, there are two URIs for the E.164 number that are associated with the wallet service. One URI points to a wallet server (managed by the operator or a wallet service provider). The other URI points to the wallet application that resides on a wireless device.

As an example, the following NAPTR records might be received for an ENUM name query on a particular E.164 mobile number (+1-202-555-1234) that was used to setup a wallet account:
$ORIGIN 4.3.2.1.5.5.5.2.0.2.1.e164.arpa.
IN NAPTR 100 10 "u" "E2U+sip" "!^.*$!sip: bob@mobileco.com!".
IN NAPTR 103 10 "u" "E2U+walletserver" ^.*$!sips: 12025551234@walletserver.com!".
IN NAPTR 104 10 "u" "E2U+walletapp" "!^.$!sips: bob@wallet.mobileco.com!".

The "E2U+walletserver" and "E2U+walletapp" enumservices would be registered as described before. The use of the "E2U+walletserver" enumservice as a selection mechanism for a wallet-based server, and the "E2U+walletapp" enumservice as a selection mechanism for a wallet-based application on a wireless device is provided. While the examples above uses the theoretical "walletserver" and "walletapp" Types, the actual label that is registered with the IANA for the purposes described could be different.

As before, a user that requests an electronic credential will provide the issuer with a valid E.164 number for his wireless device. The issuer's WCM will perform an ENUM query on the E.164 number based on the steps outlined before. The difference in this embodiment is that the issuer WCM will look for a NAPTR record associated with the "walletserver". The registered 'E2U+walletserver' enumservice will function as a selection mechanism for the WCM when choosing one NAPTR resource record from another. The WCM will use the corresponding URI to establish a secure peer-to-peer connection with the wallet server using any number of protocols including SIP. After exchanging encryption keys, initial communication from the WCM to the wallet server will contain the E.164 number. The wallet server will check to see if the E.164 number is associated with a valid account on file. If it is, the wallet server will send back an acknowledgement to the WCM while performing an ENUM query on the E.164 number to obtain a NAPTR record for the "E2U+walletapp" service. The wallet server will use the resulting URI to initiate a peer-to-peer SIP session with the wireless device (while still maintaining the connection with the issuer WCM).

The wireless device, loaded with "wallet client software", allows a user to utilize the remote wallet functionality and access the credentials stored on the wallet server. The wallet application together with the wireless device on which it operates, allows the user to communicate in real-time with the credential issuer during the issuance process. As the credential is ultimately being issued to a remote server, the use of the wireless device allows the user to be located and contacted in real-time by the issuer in order to authenticate the user's identity before completing the issuance. In essence the issuer's WCM is communicating with the wireless end-user through the wallet server using the SIP protocol. The wallet server would have an integrated WCM of its own to facilitate communication with end-user wireless devices and issuers. Provided that the wireless user validates his identity for the issuer, the issuer will send the digital credential to the wallet server, where it will be stored. All new credentials or credential changes may be registered in the wallet client software on the wireless device; this way the wireless device doesn't need to access the server every time the user wants to scroll through lists of credentials, profiles, or other information. Alternatively, the wireless device could read all credential header information from the server as described earlier.

This server-based design makes it easier for users to change wireless devices, as the user only needs to change the E.164 number that is linked to the wallet account on the server. In the event that the user's wireless device is lost/ stolen, the user can simply log into his wallet profile through the wallet service provider's secure site, and temporarily restrict the use of credentials stored in the wallet.

This design also offers a flexible solution for user's to gain access to their credentials in their digital wallet without the use of a wireless device. For example, in one scenario, a user making a purchase at a grocery store may be prompted at the point-of-sale for his E.164 phone number and his fingerprint. The grocery chain's IP-enabled POS system will capture the E.164 number and biometric information, and forward them to a WCM connected to the grocery chain's network. The grocery chain's WCM will be used in this case to facilitate a transaction with the wallet server where the user is registered. The WCM will perform an ENUM query on the E.164 number using a DNS server on the grocery chain's network, retrieve a NAPTR record that corresponds to the appropriate wallet service (e.g. "E2U+walletserver"), and use the URI in the NAPTR record to establish a secure peer-to-peer session via the Internet to the wallet server. The WCM and the wallet server may exchange encryption keys using established methods for doing so over the Internet prior to exchanging any confidential information. After the key exchange, the WCM will send the wallet server the E.164 number and the biometric information (fingerprint data) that was captured at the POS. The wallet server will validate that the E.164 number is associated with an account on record that is in good standing. If the account is valid and in good standing, the wallet server will validate the biometric information against information stored in the account. If the biometric information matches, the wallet server will transmit a menu showing all the credential types that are in the customer's wallet. This menu corresponds to the primary credential categories in the hierarchy that was previously discussed in this document. The customer could for example select "payment methods" and then see the secondary hierarchy (credit cards, debit cards, stored value cards, etc.). Credentials will be displayed under the secondary categories. Credential listings will be displayed with some of the follow information:
Name/logo of issuer
Name/logo of association (e.g. Visa, MasterCard)
Last 4 digits of account number Indicator showing whether the payment method is for business/personal use Using the POS display and input device (could be a touch screen interface), the user can select the appropriate payment method to complete the transaction. The user will be able to select multiple credentials stored on the wallet server for the transaction. For example, a payment method, loyalty card, and electronic coupons could all be selected. Once the user completes his selections, he will be prompted to signal his intention to complete the transaction. The credentials are then securely transmitted from the wallet server to the grocery chain's WCM which routes them to the POS system for processing. Once the POS system processes payment and completes the transaction, the POS (or a related system in the chain's network) sends a confirmation with a digital receipt to the grocery chain's WCM. The WCM transmits the digital receipt to the wallet server and then drops the connection to the wallet server. The digital receipts are made available to the user by logging into the wallet service provider's secure site using the username and password/PIN that was created. A user may choose to also receive receipt notices from the wallet server via e-mail or on his wireless device using the methods and protocols previously described, Short Message Service (SMS), or some other type of messaging protocol.

As mentioned earlier, the wallet server will have an integrated WCM. The wallet server will also have access to a secure storage apparatus, high-performing database infrastructure, and front-end web architecture that allows users to manage/maintain their accounts online through a standard web browser.

Embodiments of the invention include technical benefits of providing for the convenient, efficient, and secure distribution of credentials into wireless devices such that only those authorized to conduct the transactions may do so and only to the extent of their authorization. Other benefits include providing for the secure importation of financial and other personal information into wireless devices. Other benefits include providing a system and method through which credential issuers can securely and rapidly target specific wireless devices for the distribution of the appropriate credentials.

Additional technical benefits of embodiments of the invention include providing an overall system and processing methodology through which financial transactions can be conducted in a secure context without the need for credit cards, tags, tokens or other physical embodiments of currency or the authority to conduct a transaction.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A computing device comprising:
   a display screen;
   at least one wireless transceiver that wirelessly communicates with at least one external electronic device;
   a biometric characteristic reader that reads a biometric characteristic of a user; one or more processors; and
   at least one memory device having stored therein:
      a plurality of electronic credentials linking to personal information and account number of the user,
      biometric information of the user, and
      a plurality of applications that are executed by the one or more processors, the plurality of applications including at least one wallet application comprising a plurality of extensions, where the at least one wallet application, when executed by the one or more processors, causes the computing device to perform operations of:
   receiving a reader key of an electronic credential from the at least one external electronic device,
   receiving, from the biometric characteristic reader, the biometric characteristic of the user,
   performing an authentication by comparing the biometric characteristic of the user to the stored biometric information of the user,
   in response to the authentication being successful based on a result of the comparison, selecting the electronic credential from the stored plurality of electronic credentials using the reader key,
   executing an extension, among the plurality of extensions, using an extension identifier associated with the selected electronic credential, and
   wirelessly transmitting the electronic credential to the at least one external electronic device using the extension.

2. The computing device of claim 1, wherein the biometric characteristic reader reads a fingerprint of the user.

3. The computing device of claim 1, wherein the at least one memory device includes a secure storage that stores the plurality of electronic credentials.

4. The computing device of claim 1, wherein the computing device downloads the plurality of electronic credentials wirelessly from a credential issuing server via a data network and stores the plurality of electronic credentials in the at least one memory device.

5. The computing device of claim 1, wherein the plurality of electronic credentials link to one or more of data associated with a credit card account, a debit card account, a stored value card account, an automated teller machine card account, a bank account, a payment token card account, a membership card account, a loyalty card account, an access card account, an identification card account, a driver's license, an e-ticket, a pass, a coupon, or a certificate.

6. The computing device of claim 1, wherein the one or more processors store the plurality of electronic credentials in the at least one memory device in a format that marks but links to a user's payment account number and that includes a same number as a bank identification number (BIN) associated with at least one of a payment card issuer or a payment network.

7. The computing device of claim 1, wherein the biometric characteristic reader reads the biometric characteristic of the user based on a launching of the wallet application.

8. The computing device of claim 7,
   wherein the computing device provides a prompt to the user to input data via the biometric characteristic reader based on the launching of the wallet application, and
   wherein the biometric characteristic reader becomes operable to read the biometric characteristic of the user after providing the prompt.

9. The computing device of claim 1, wherein the computing device provides at least one of a tone or a visual message on the display screen to confirm performance of a transaction with the at least one external electronic device.

10. The computing device of claim 1, wherein the computing device wirelessly communicates with the at least one external electronic device by accessing a data network via the wireless transceiver.

11. The computing device of claim 10, wherein the computing device wirelessly communicates with the at least one external electronic device by accessing an Internet as a form of the data network.

12. The computing device of claim 1, wherein the computing device receives from a merchant system a response message indicating one of approval or rejection of a transaction.

13. The computing device of claim 1, wherein the at least one wallet application further causes the one or more processors to transmit to the at least one external electronic device a transaction authorization request message including one or more of billing information or shipping information in a format readable by the at least one external electronic device.

14. The computing device of claim 1, wherein the at least one wireless transceiver includes one or more of a network transceiver that communicates with a cellular communications network, a short-range radio frequency (RF) transceiver to communicate with an external RF device, a near-field communication (NFC) module, or an infra-red transceiver.

15. The computing device of claim 1,
wherein the at least one wireless transceiver includes a near-field communication (NFC) module including an NFC antenna, and
wherein the NFC module transmits the electronic credential to an NFC reader of the at least one external electronic device to initiate a transaction with a merchant system based on the NFC antenna of the computing device being within an RF range of the NFC reader.

16. A method comprising:
storing, by at least one processor of a computing device in at least one memory device of the computing device, a plurality of electronic credentials that link to personal information and an account number of a user, biometric information of the user, and a plurality of applications, the plurality of applications including a wallet application comprising a plurality of extensions;
storing, by the at least one processor of the computing device, biometric characteristics in the at least one memory device of the computing device;
communicating wirelessly, by at least one wireless transceiver of the computing device, with at least one external electronic device;
receiving, by the at least one wireless transceiver from the at least one external electronic device, a reader key of an electronic credential;
reading, by a biometric characteristic reader of the computing device, a biometric characteristic of the user;
performing an authentication by comparing, by the at least one processor of the computing device using the wallet application, the read biometric characteristic of the user with the stored biometric information;
in response to the authentication being successful based on a result of the comparison, selecting, by the at least one processor of the computing device using the wallet application, the electronic credential from the stored plurality of electronic credentials using the reader key;
executing, by the at least one processor of the computing device using the wallet application, an extension, among the plurality of extensions, using an extension identifier associated with the selected electronic credential; and
transmitting, by the at least one wireless transceiver of the computing device using the wallet application, the electronic credential to the at least one external electronic device using the extension.

17. The method of claim 16, wherein the biometric characteristic being read is a fingerprint of the user.

18. The method of claim 16, wherein the electronic credential is stored in a secure storage of the at least one memory device.

19. The method of claim 16, further comprising:
wirelessly downloading, by the at least one wireless transceiver of the computing device, the electronic credential from a credential issuing server via a data network; and
storing the electronic credential in the at least one memory device.

20. The method of claim 16, wherein the electronic credential is linked to one or more of data associated with a credit card account, a debit card account, a stored value card account, an automated teller machine card account, a bank account, a payment token card account, a membership card account, a loyalty card account, an access card account, an identification card account, a driver's license, an e-ticket, a pass, a coupon, or a certificate.

21. The method of claim 16, wherein the electronic credential links to a user's payment account and includes a same number as a bank identification number (BIN) associated with at least one of a payment card issuer or a payment network.

22. The method of claim 16, further comprising:
launching, by the at least one wireless transceiver of the computing device, the wallet application to initiate a transaction; and
reading, by the biometric characteristic reader of the computing device, the biometric characteristic of the user based on launching the wallet application.

23. The method of claim 22, further comprising:
generating, by the at least one wireless transceiver of the computing device, a prompt that requests the user to provide an input to the biometric characteristic reader based on launching the wallet application; and
reading, by the biometric characteristic reader of the computing device, the biometric characteristic of the user based on a detection of a response to the prompt.

24. The method of claim 16, further comprising providing, by the at least one wireless transceiver of the computing device, at least one of a tone or a visual message on a display screen to confirm performance of a transaction.

25. The method of claim 16, further comprising wirelessly communicating, by the at least one wireless transceiver of the computing device, with the at least one external electronic device by accessing a data network.

26. The method of claim 25, further comprising wirelessly communicating, by the at least one wireless transceiver of the computing device, with the at least one external electronic device by accessing an Internet as a form of the data network.

27. The method of claim 16, further comprising receiving, by the at least one processor of the computing device from a merchant system, a response message indicating one of approval or rejection of a transaction.

28. The method of claim 16, further comprising:
transmitting, by the wallet application from the computing device to a merchant system, a transaction authorization request message including billing information and shipping information in a format readable by the merchant system.

29. The method of claim 16, wherein the at least one wireless transceiver includes at least one of a network transceiver that communicates with a cellular communications network, a short-range radio frequency (RF) transceiver that communicates with an external short-range RF device, a near-field communication (NFC) module, or an infra-red transceiver.

30. The method of claim 16, further comprising:
transmitting, by a near-field communication (NFC) module via an NFC antenna, the electronic credential to an NFC reader of an external electronic device to initiate a transaction with a merchant system based on the NFC antenna of the computing device being within an RF range of the NFC reader.

31. The method of claim 16, further comprising:
displaying, by a display screen of the computing device, transaction information corresponding to a transaction between the computing device and the at least one external electronic device; and
reading, by the biometric characteristic reader of the computing device, the biometric information of the user based on the displaying of the transaction information.

\* \* \* \* \*